(12) United States Patent
Solomon

(10) Patent No.: US 6,842,674 B2
(45) Date of Patent: Jan. 11, 2005

(54) METHODS AND APPARATUS FOR DECISION MAKING OF SYSTEM OF MOBILE ROBOTIC VEHICLES

(76) Inventor: Neal Solomon, P.O. Box 21297, Oakland, CA (US) 94620

( * ) Notice: Subject to any disclaimer, the term of this patent is extended or adjusted under 35 U.S.C. 154(b) by 0 days.

(21) Appl. No.: 10/422,051

(22) Filed: Apr. 22, 2003

(65) Prior Publication Data

US 2004/0030451 A1 Feb. 12, 2004

Related U.S. Application Data

(60) Provisional application No. 60/374,421, filed on Apr. 22, 2002, provisional application No. 60/404,945, filed on Aug. 21, 2002, and provisional application No. 60/404,946, filed on Aug. 21, 2002.

(51) Int. Cl.[7] .................................... G06F 17/00
(52) U.S. Cl. ................ 701/23; 701/200; 73/178 R; 342/350
(58) Field of Search .................... 701/23, 36, 200, 701/1; 73/178 R; 342/350

(56) References Cited

U.S. PATENT DOCUMENTS 5,758,313 A * 5/1998 Shah et al. ............. 455/456.2
6,338,011 B1 * 1/2002 Furst et al. .................. 701/1

* cited by examiner

Primary Examiner—Thomas G. Black
Assistant Examiner—Olga Hernandez
(74) Attorney, Agent, or Firm—Townsend and Townsend and Crew LLP

(57) ABSTRACT

In a swarm weapon system, decision-making processes are described for the organization of mobile robotic vehicles (MRVs). After MRV drone sensor data is provided to a lead MRV, an initial decision is made by the lead MRV as a result of the selection of a winning simulation that provides the best opportunity for success of a mission. Once this decision is made, actions are organized for the MRVs, which provide feedback for the continuation of the process until the mission is completed.

5 Claims, 81 Drawing Sheets

Coordination & Targeting by Swarms

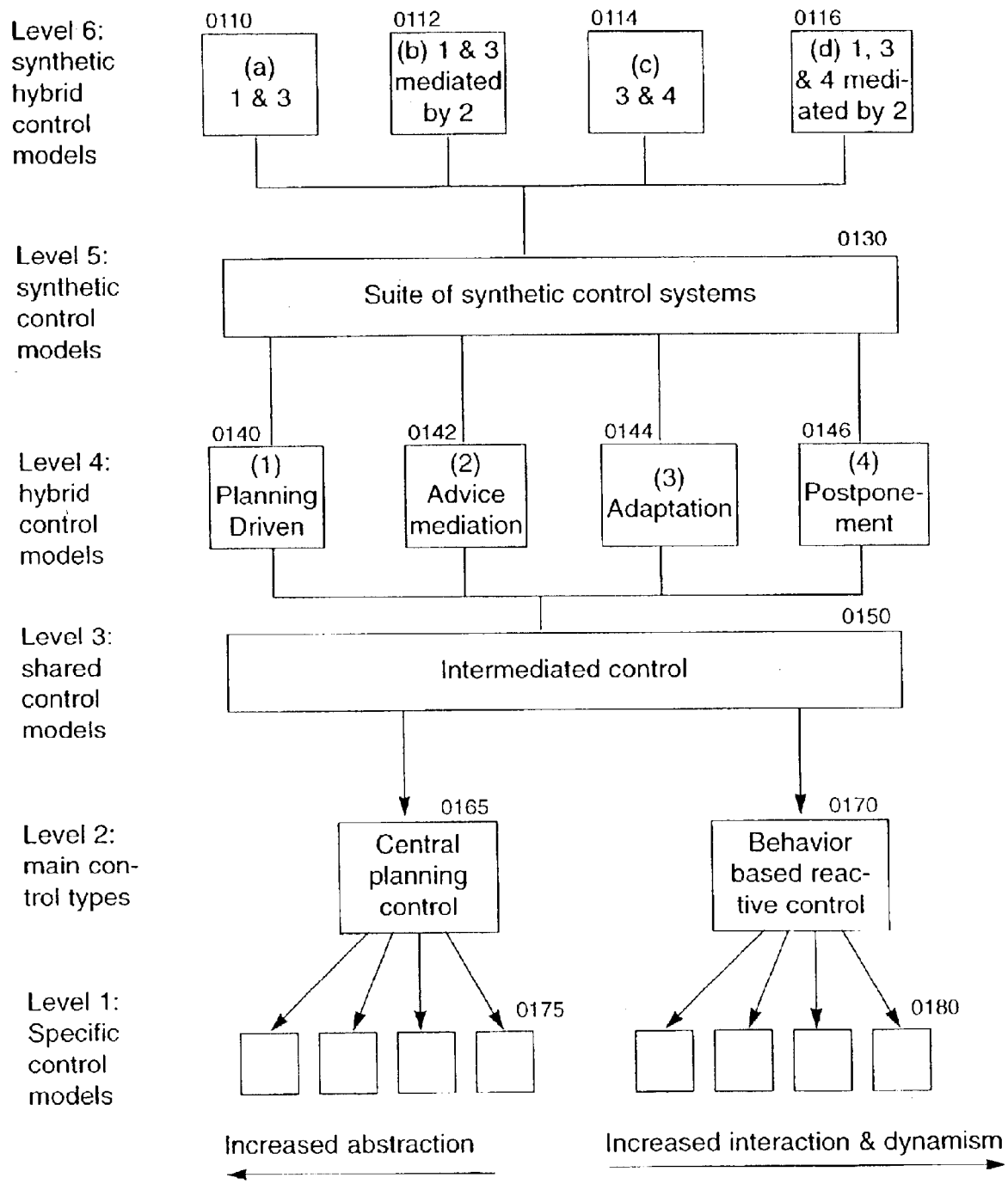

Fig 2: Distributed Network Processing
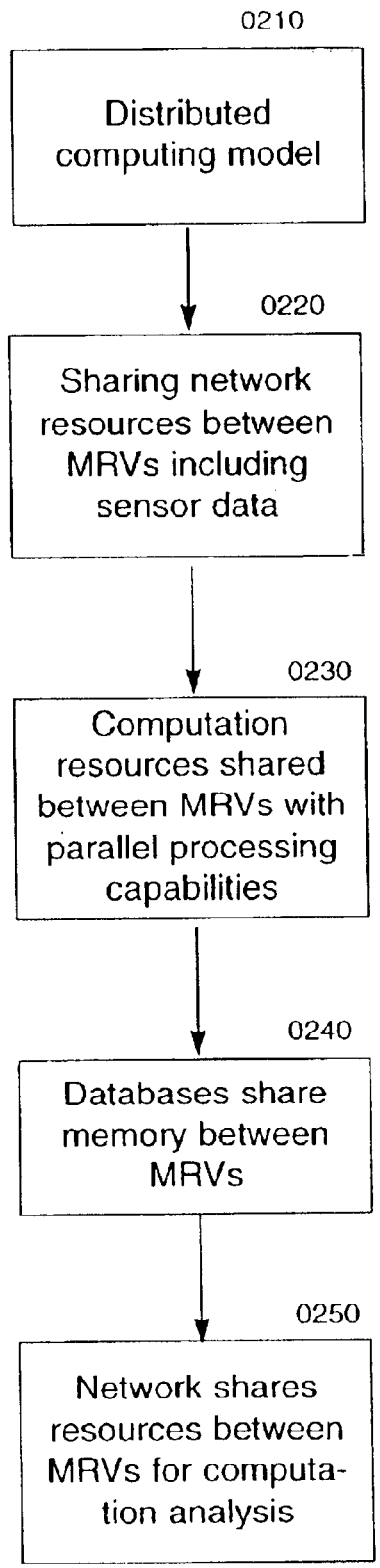

Fig 3: Swarm Operating System
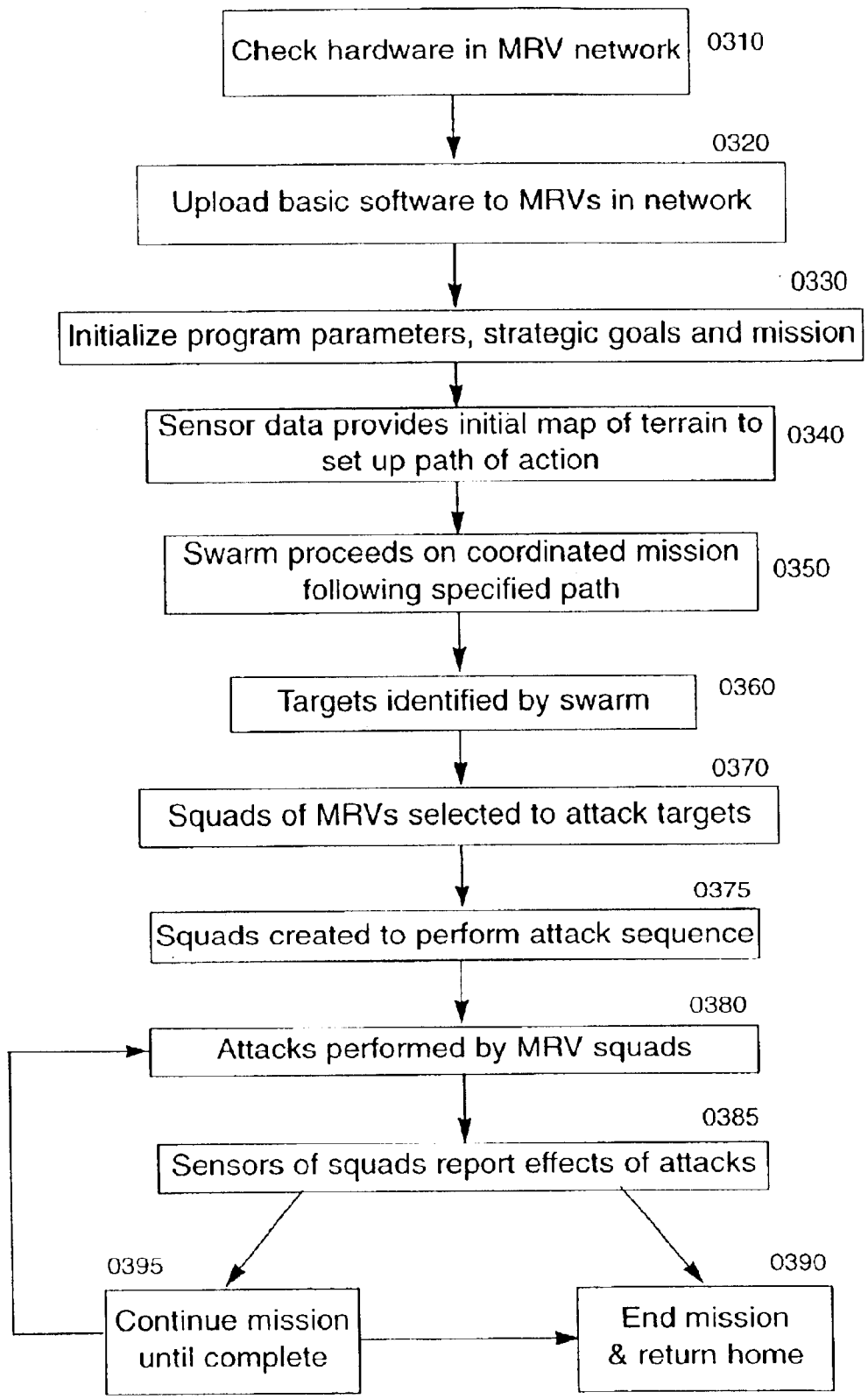

Fig 4: System Equilibria
(A)
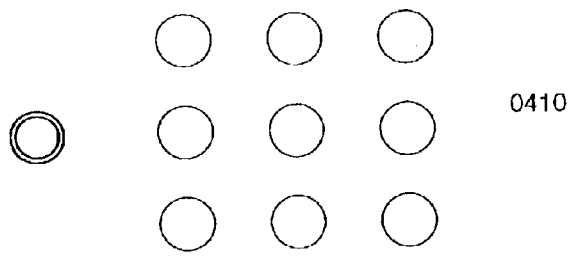
0410
Stable squad in formation
(B)
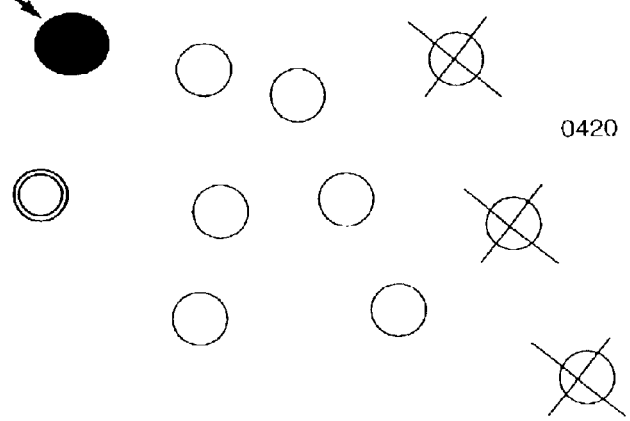
0420
External shock introduces disequilibrium
(C)
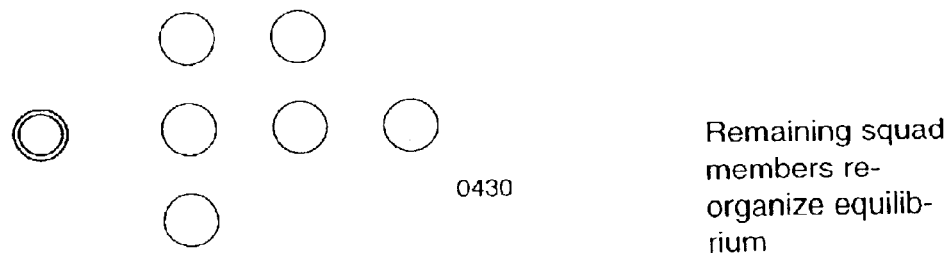
0430
Remaining squad members reorganize equilibrium Fig 5: Coordination & Targeting by Swarms
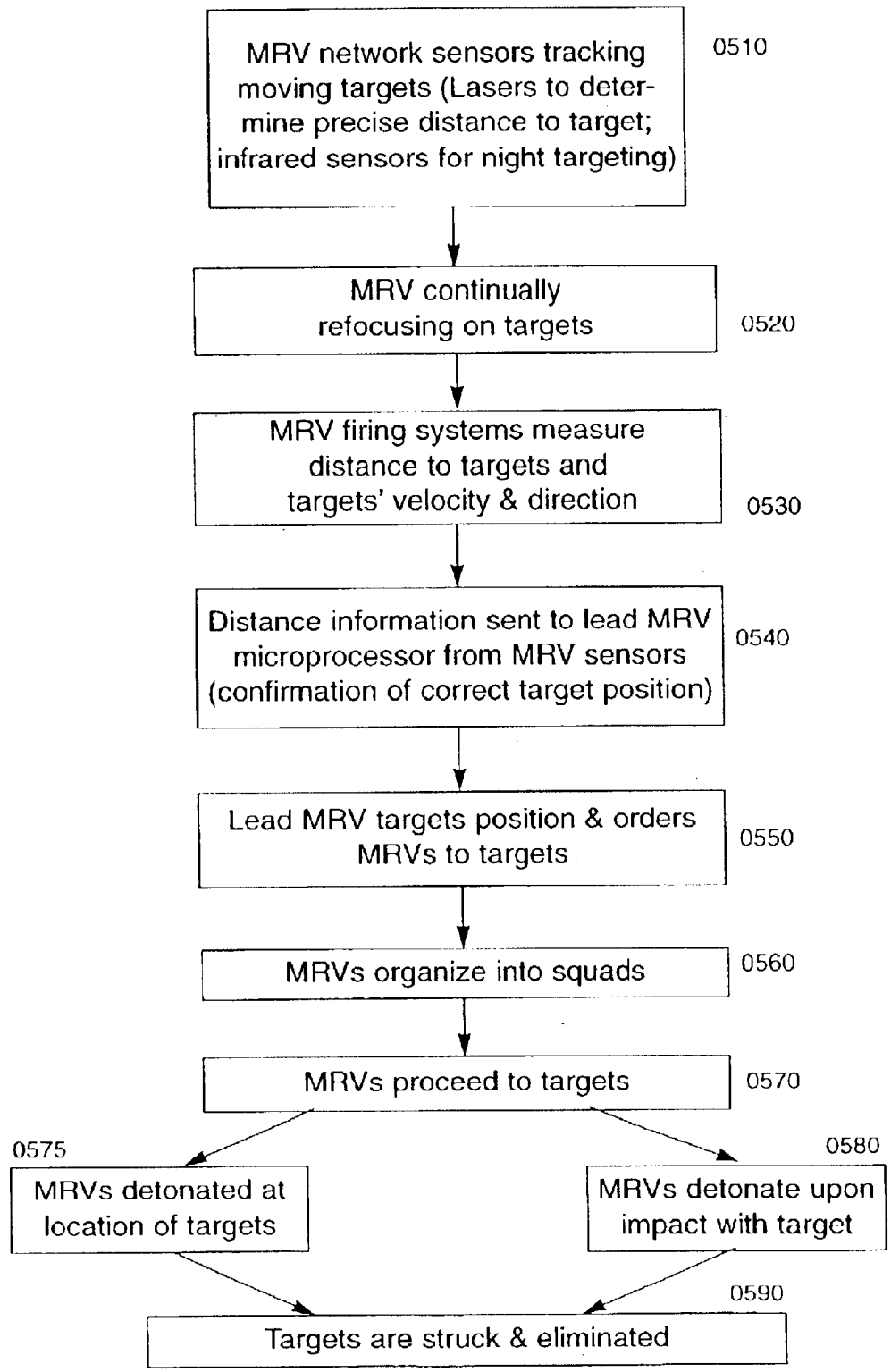

Fig 6: Calculus of Groups of MRVs
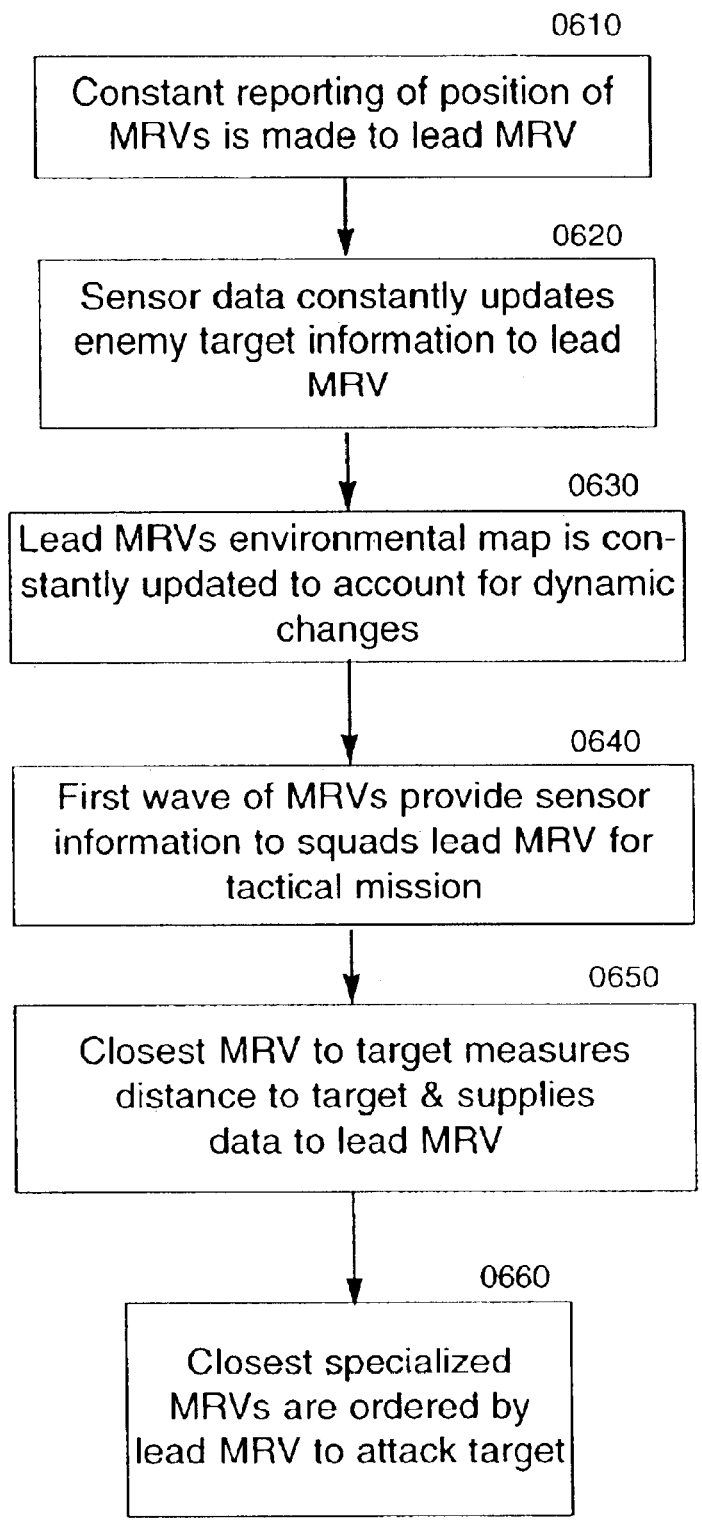

Fig 7: Dynamic Travelling Salesman Problem (TSP)
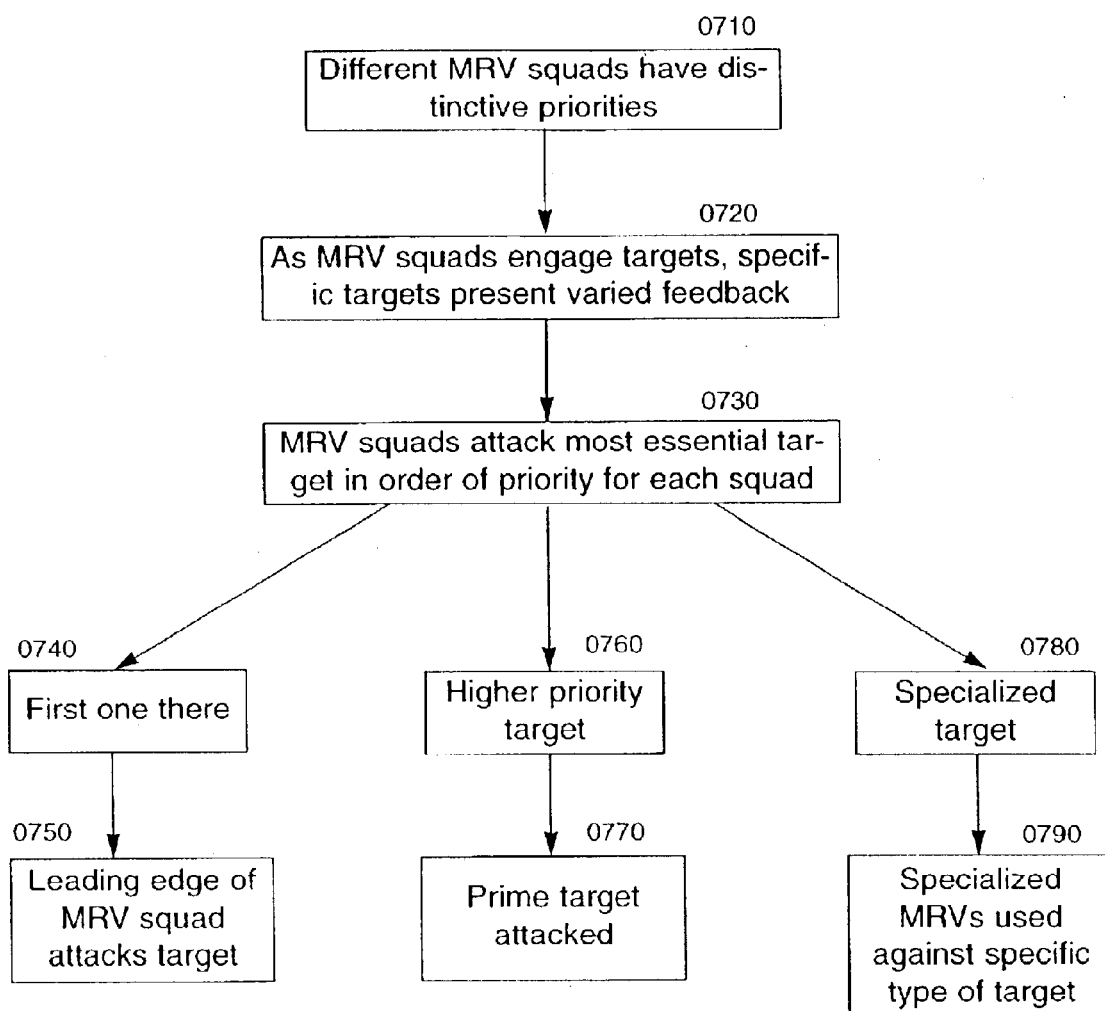

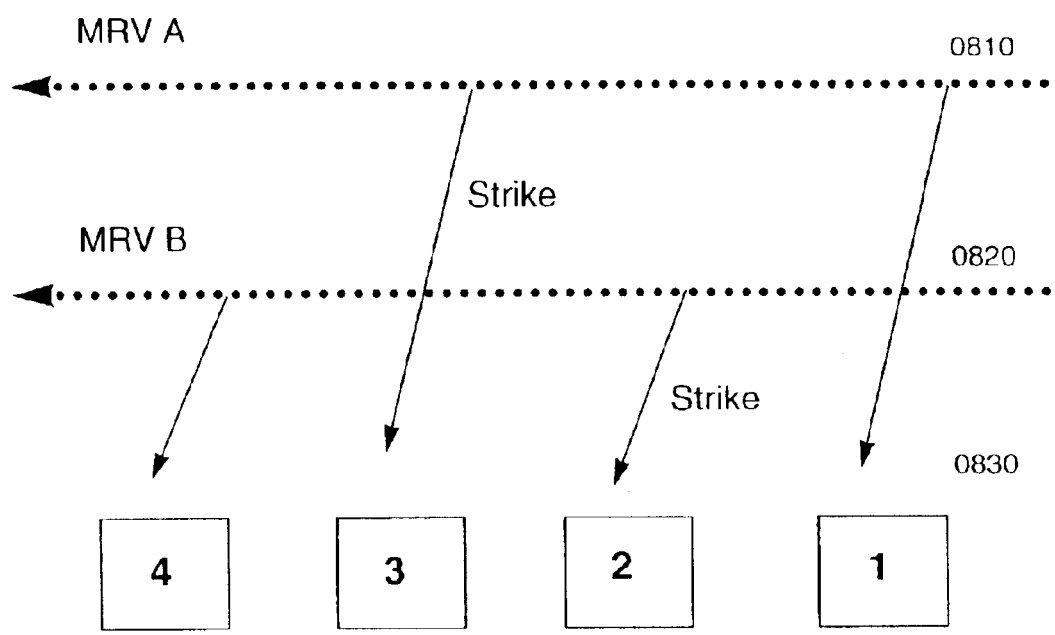
Fig 8: Map of Dynamic TSP

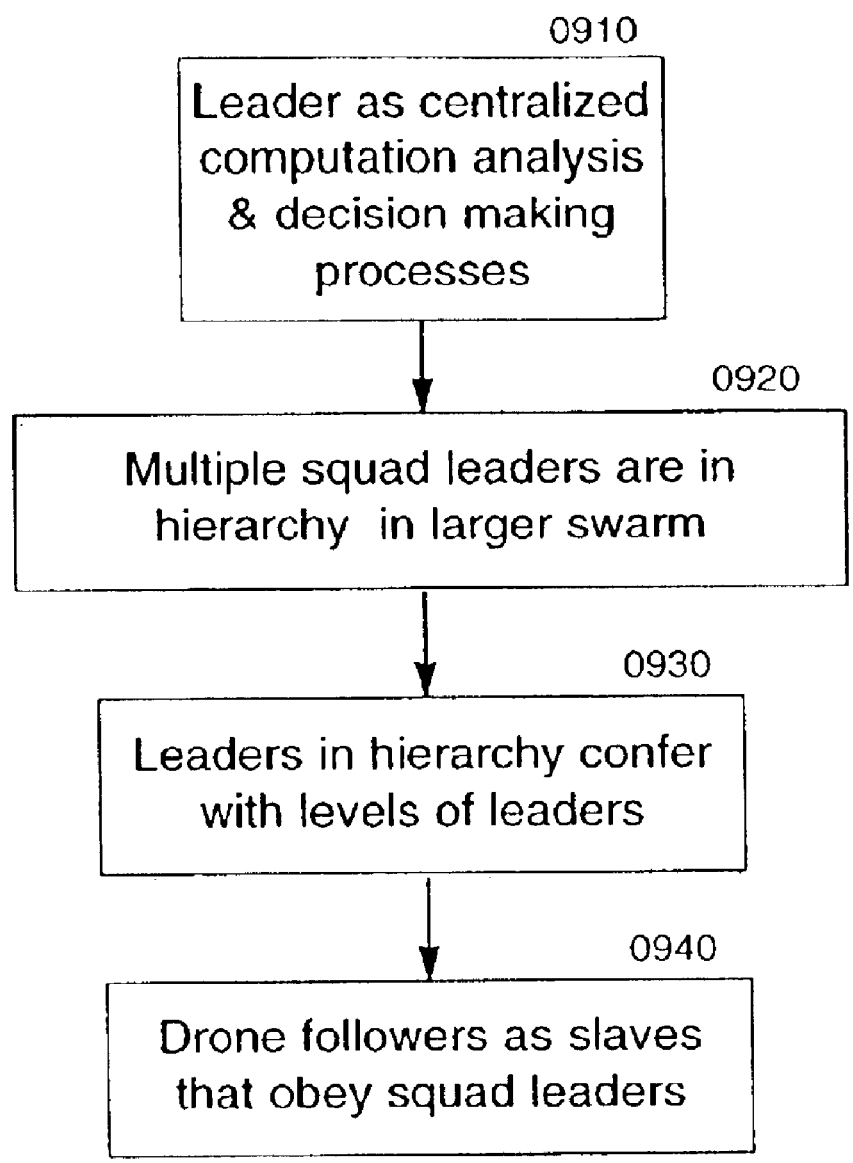
Fig 9: Hierarchy Model: Leader-Followers

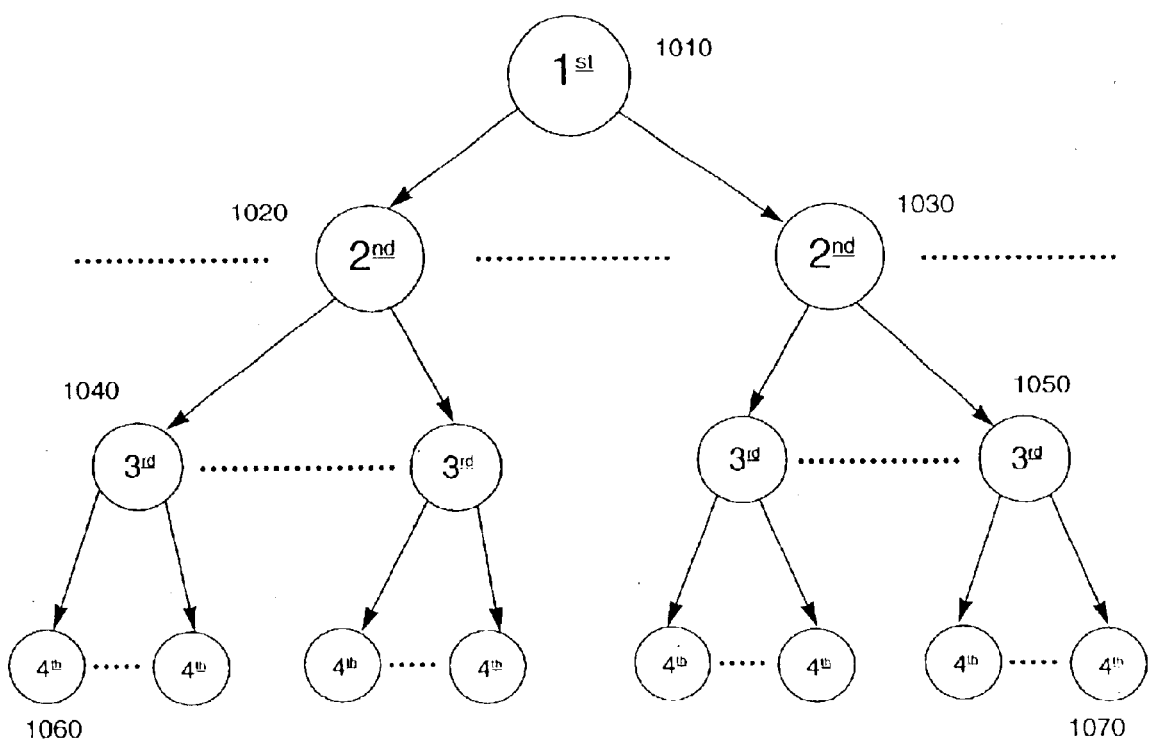
Fig 10: Leadership Hierarchy Architecture

Fig 11: Asymmetric Inter-MRV Negotiation
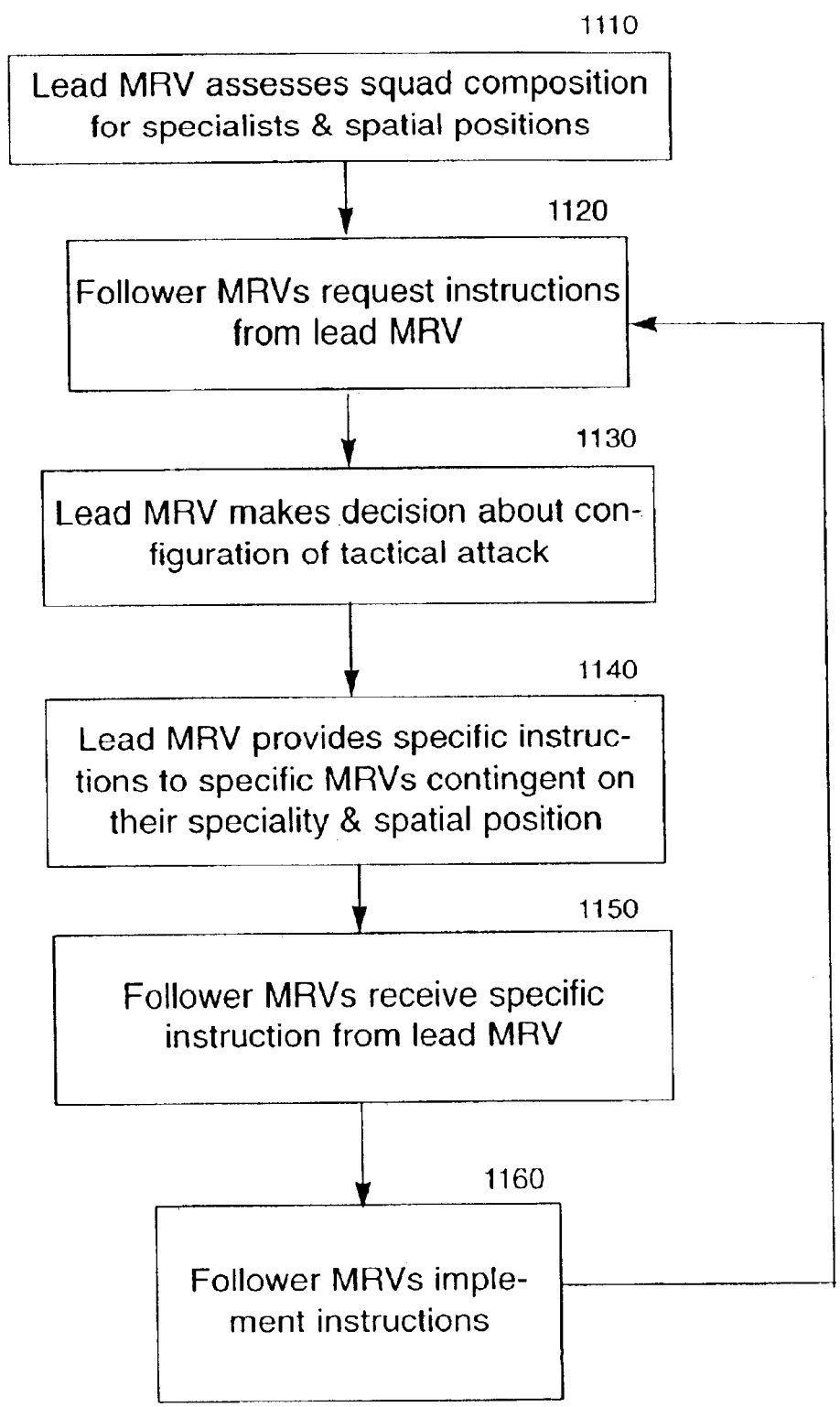

Fig 12: MRV Leader Substitution
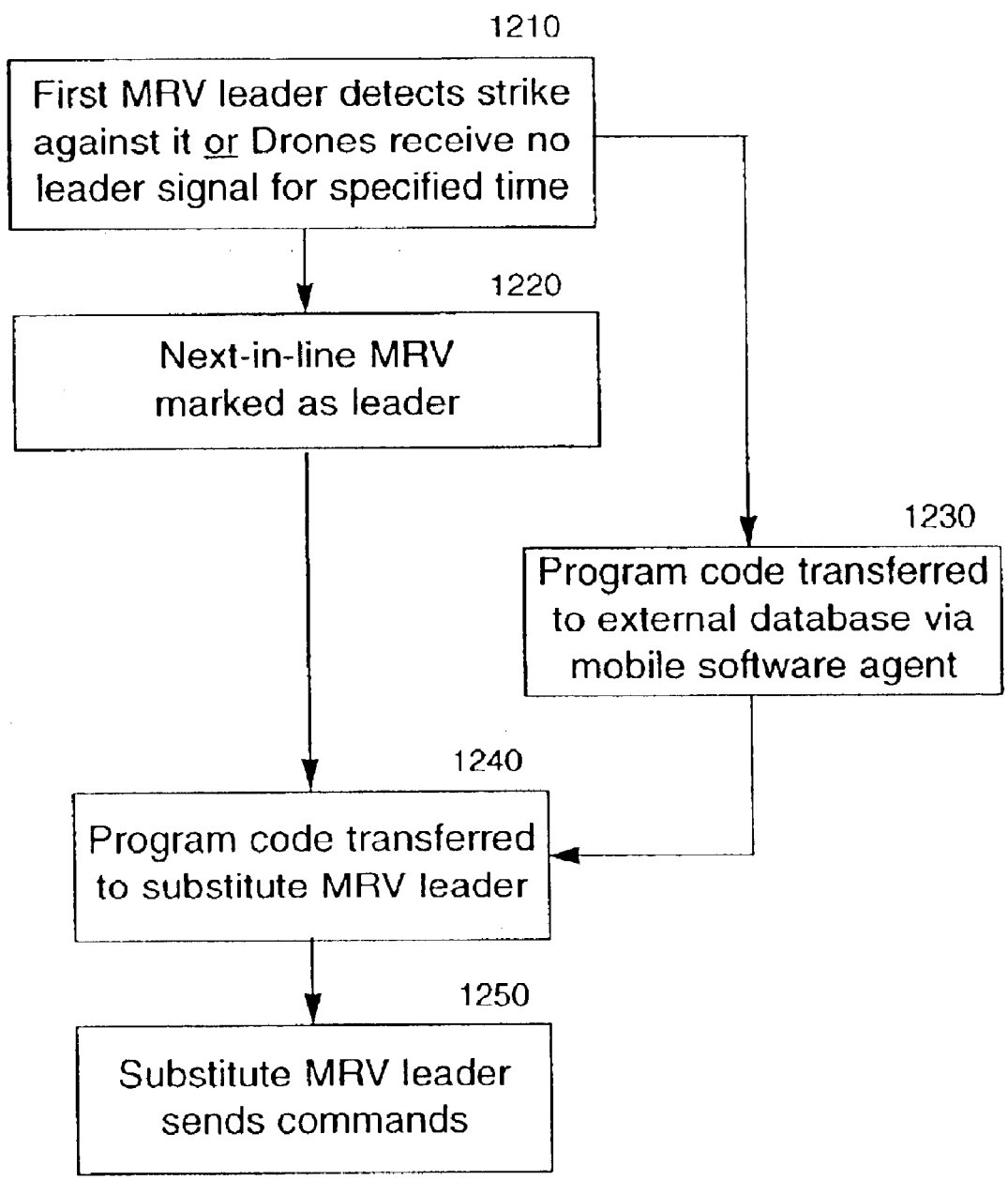

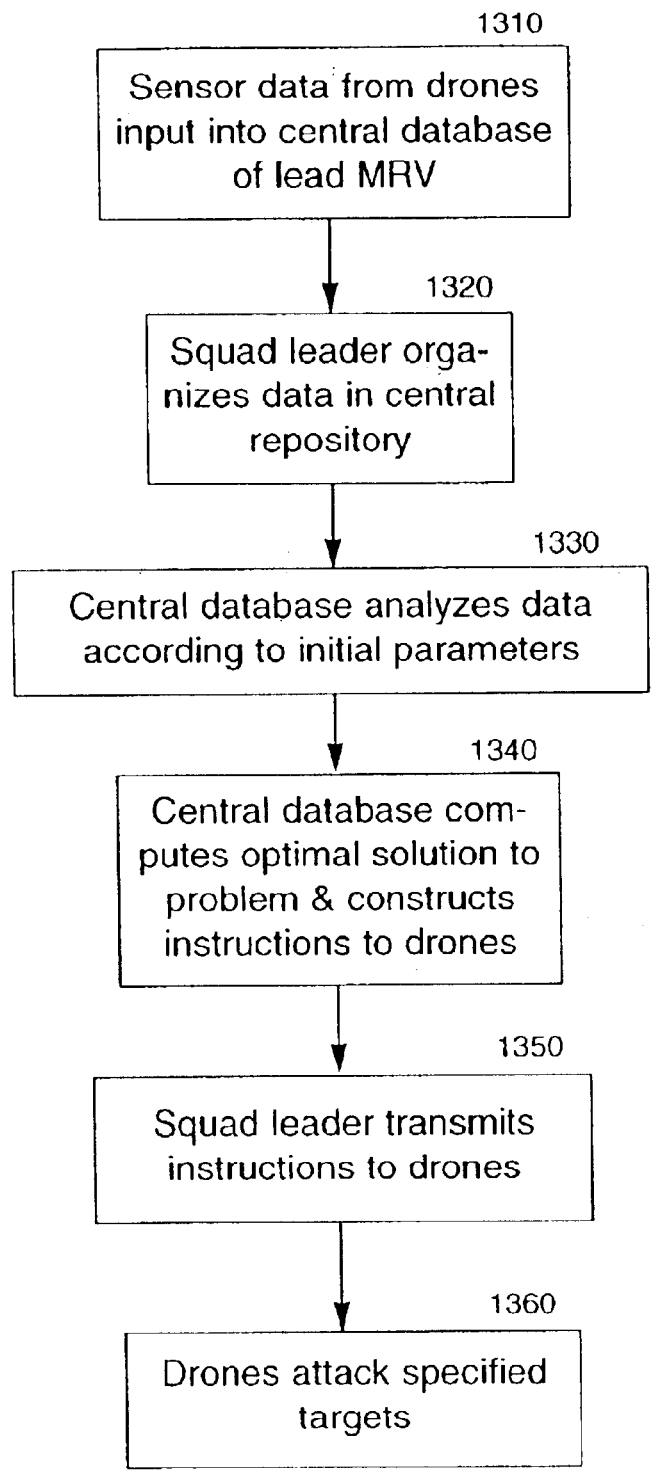
Fig 13: Central Blackboard

Fig 14: Representation of Swarms on Central Blackboard
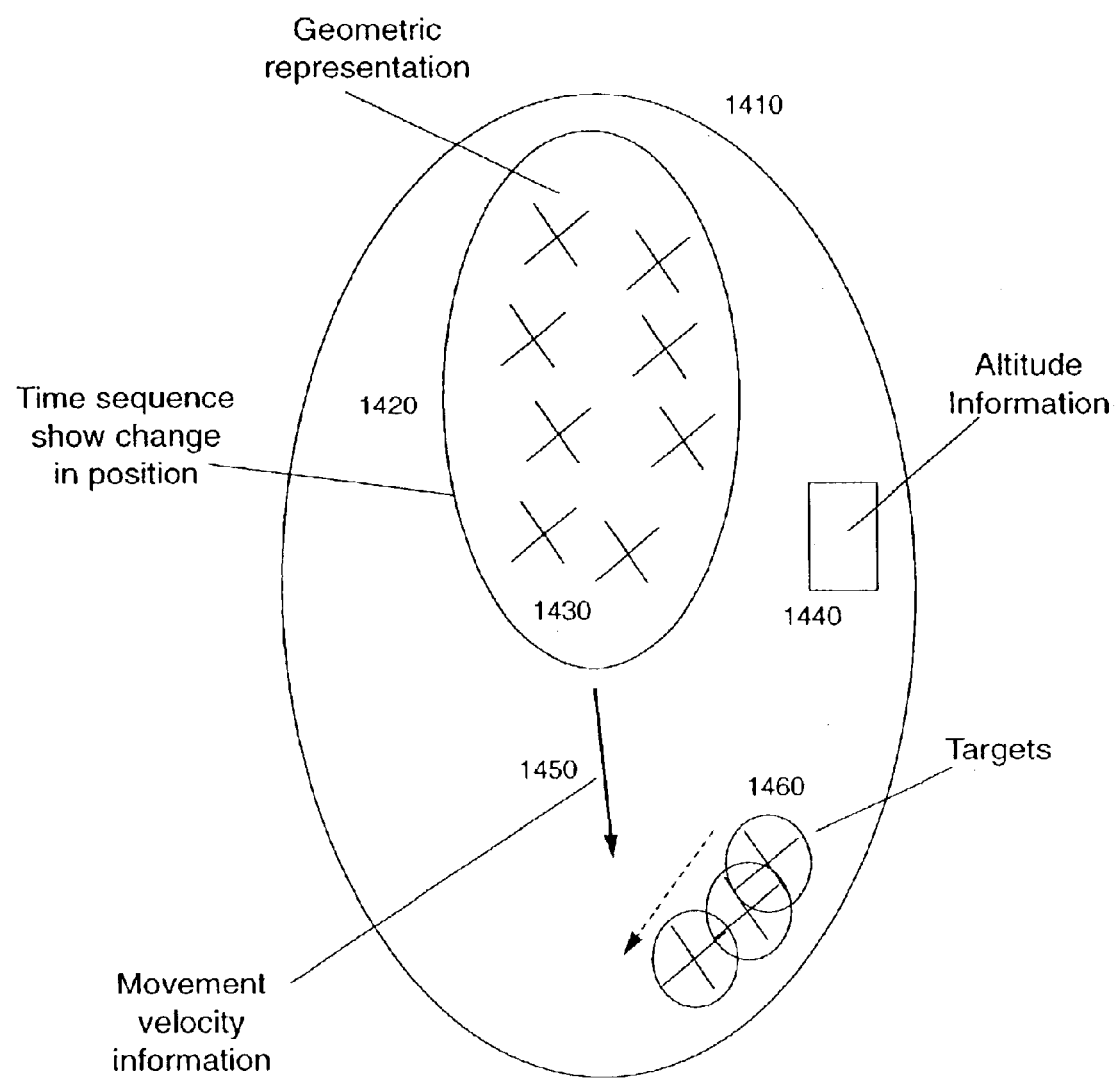
2D representation of battle theatre

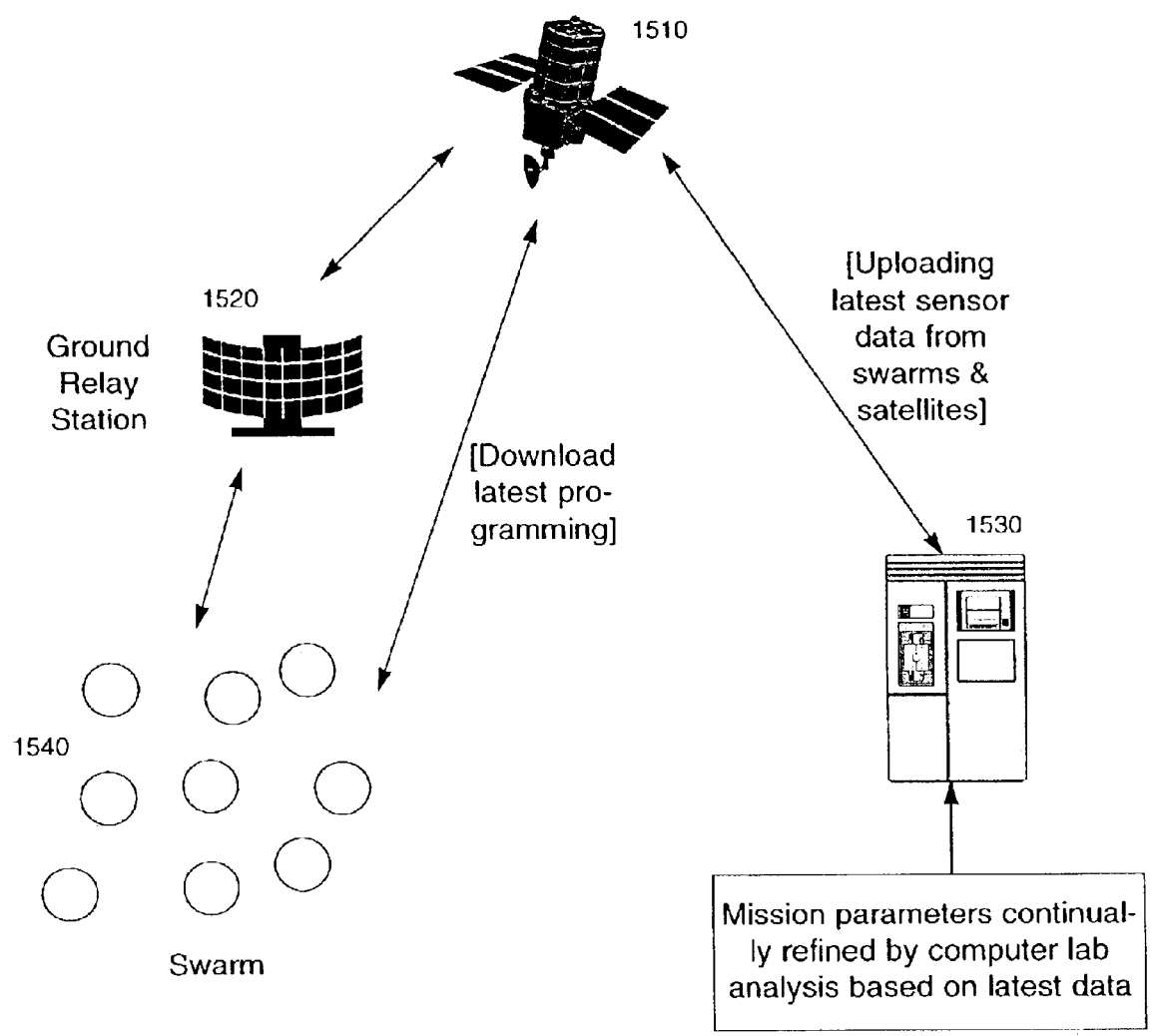
Fig 15: External Computation Resources

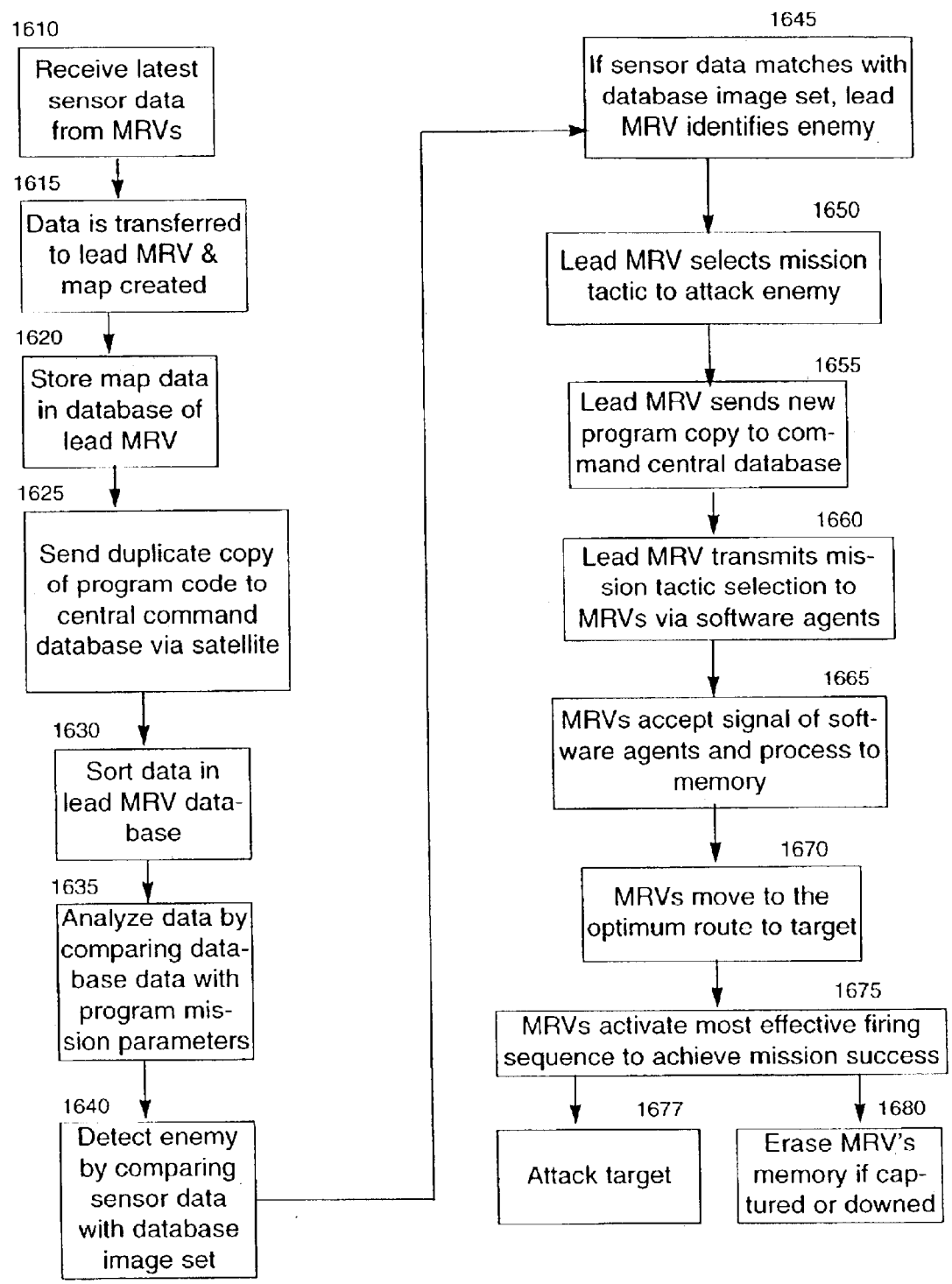
Fig 16: MRV Database Inter-relations

Fig 17: Behavior Based Control System
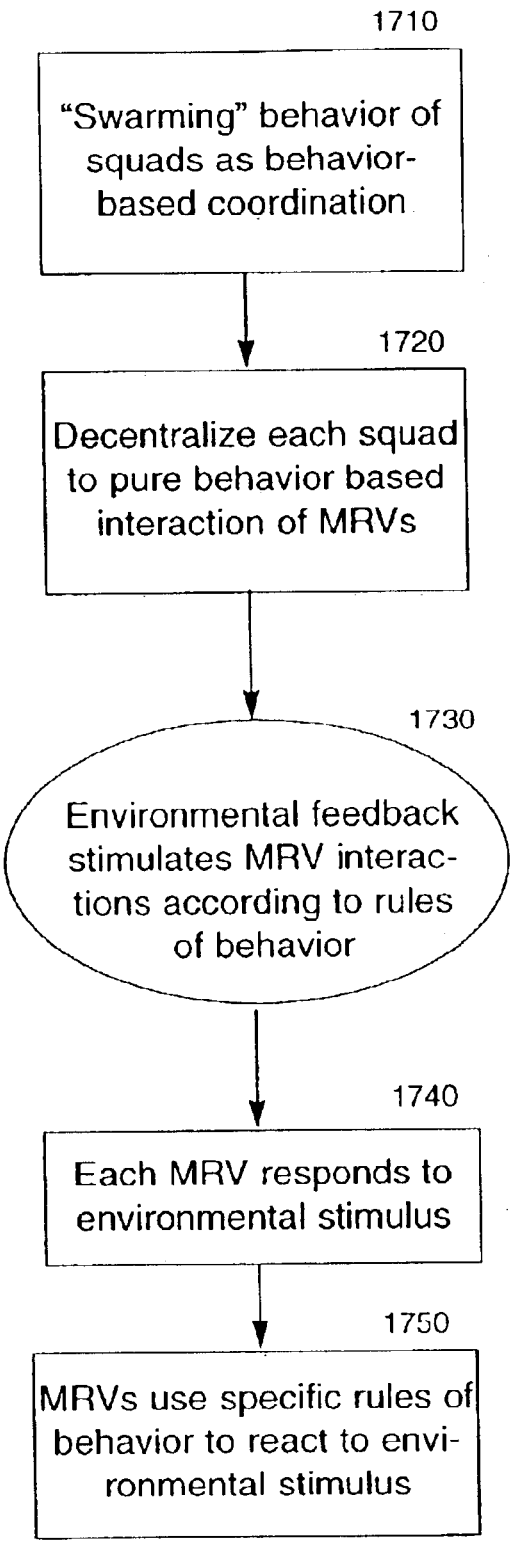

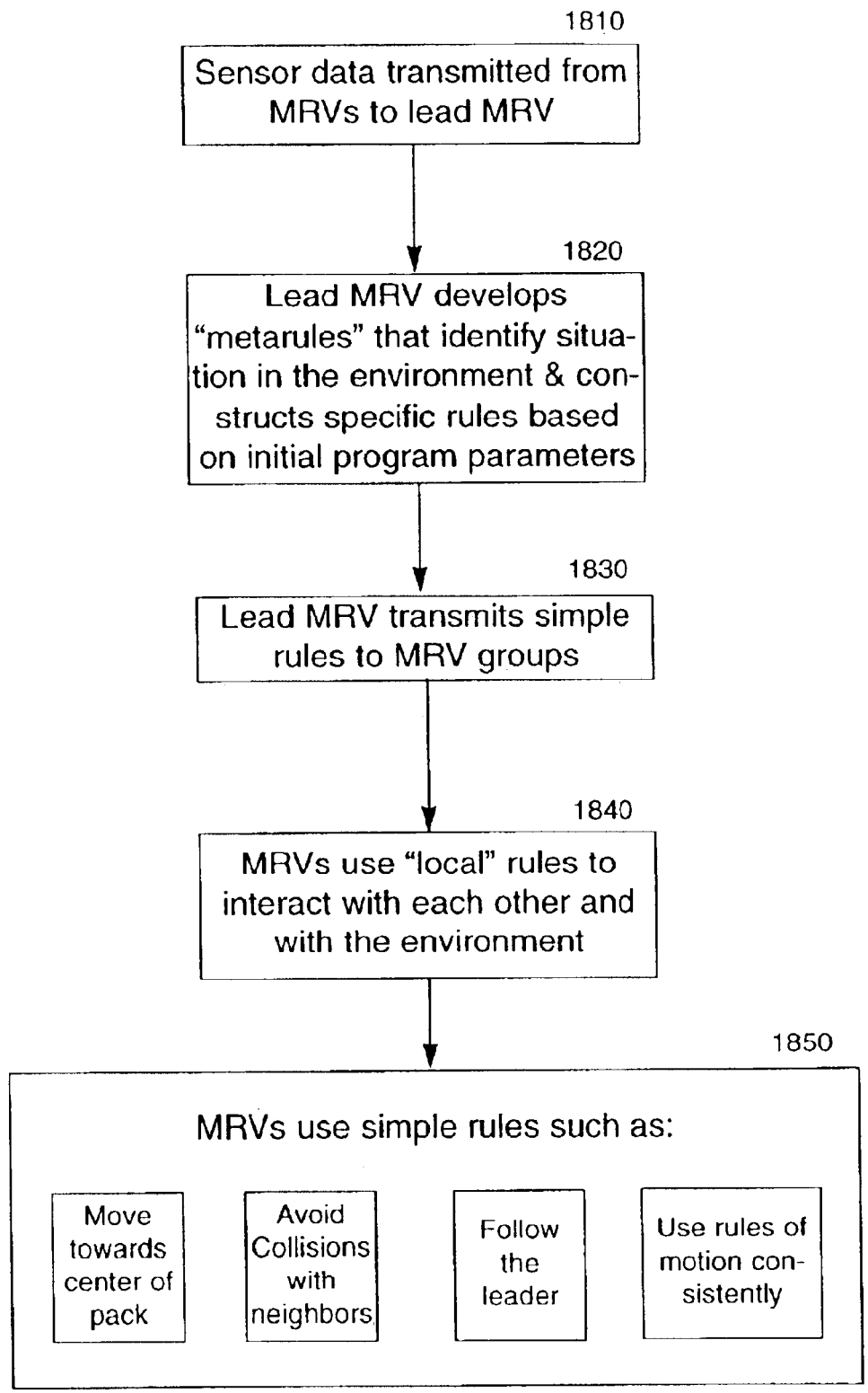

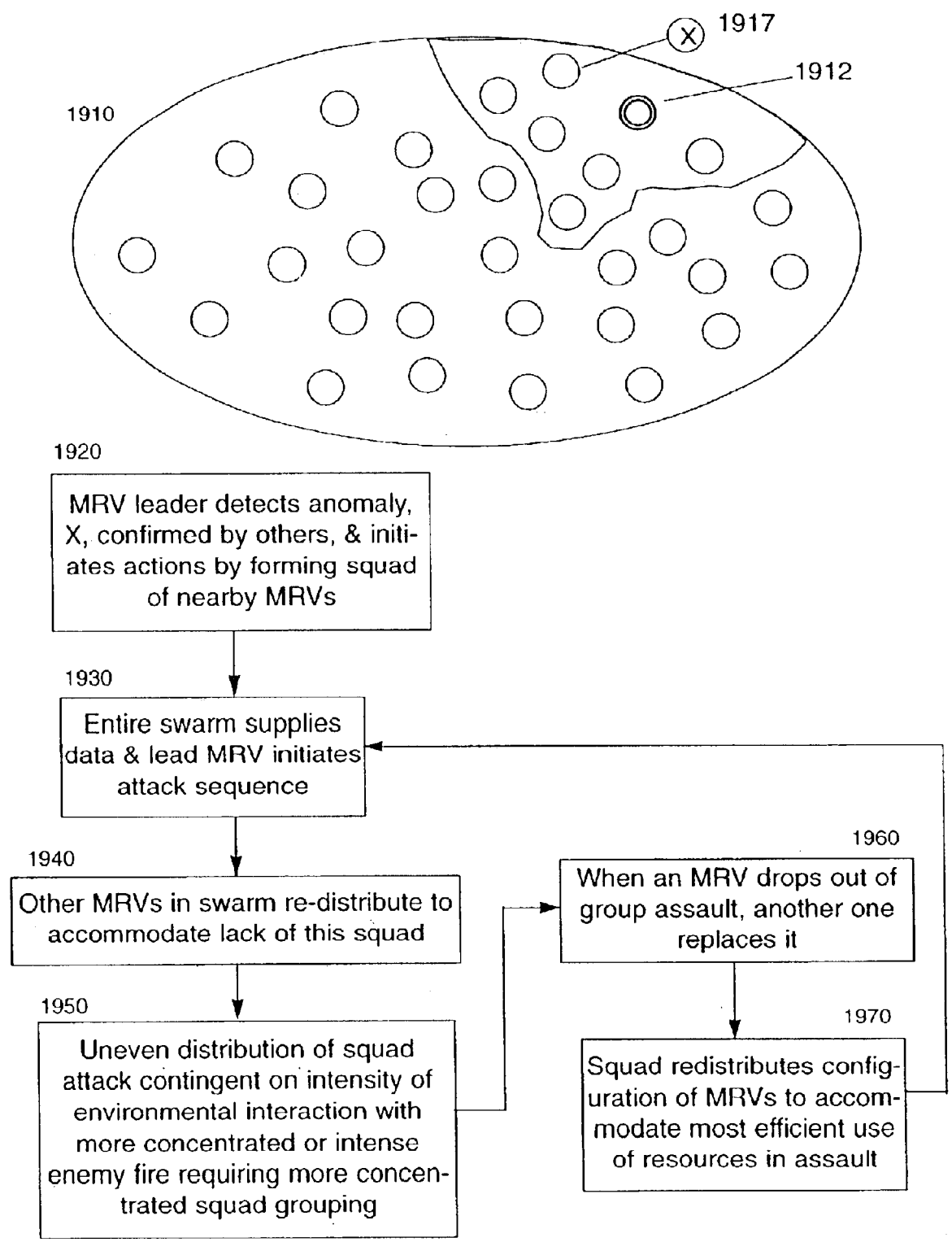
Fig 19: Self Correcting Mechanism of MRV Squad

Fig 20: Self Diagnostic Process of MRVs Needed to Join Squad
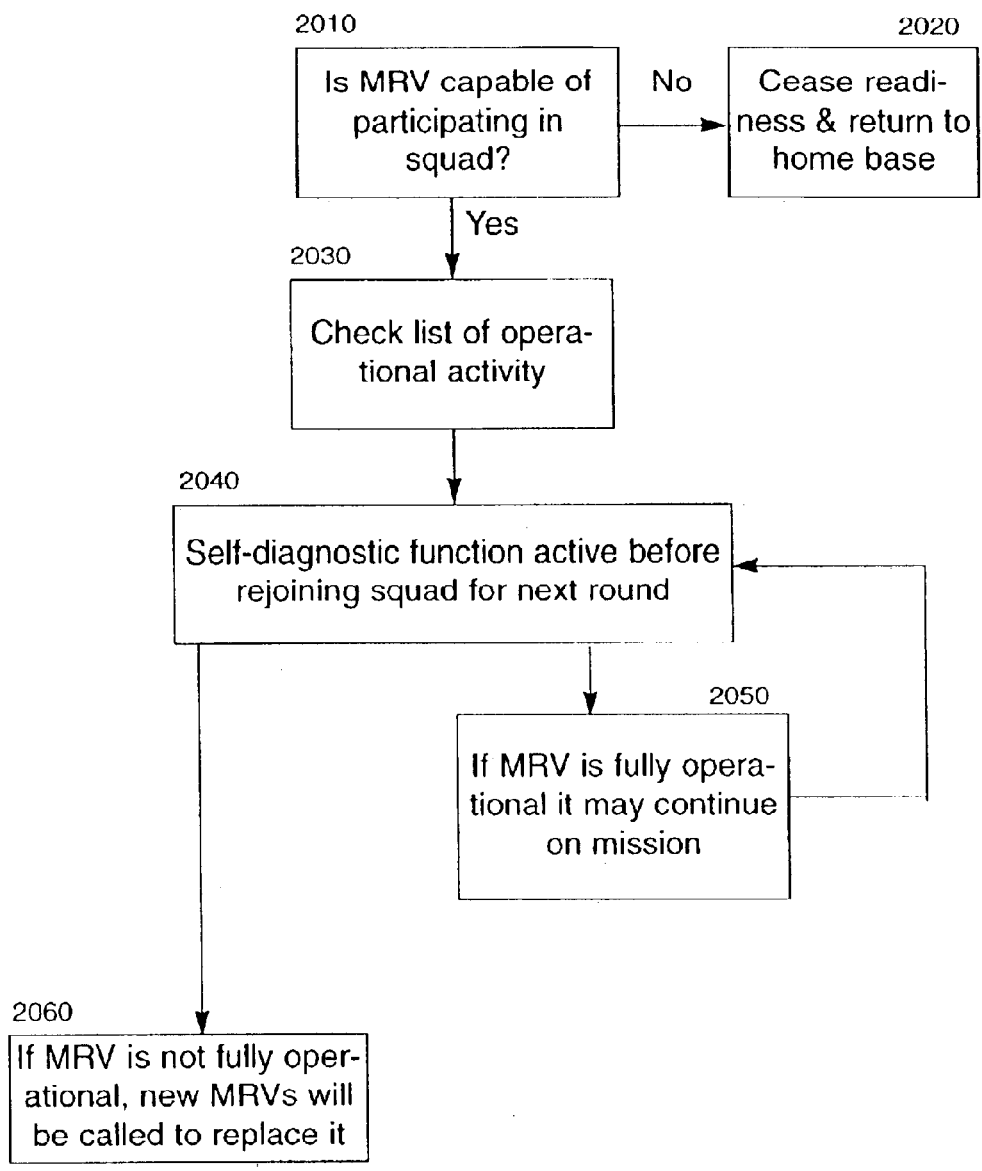

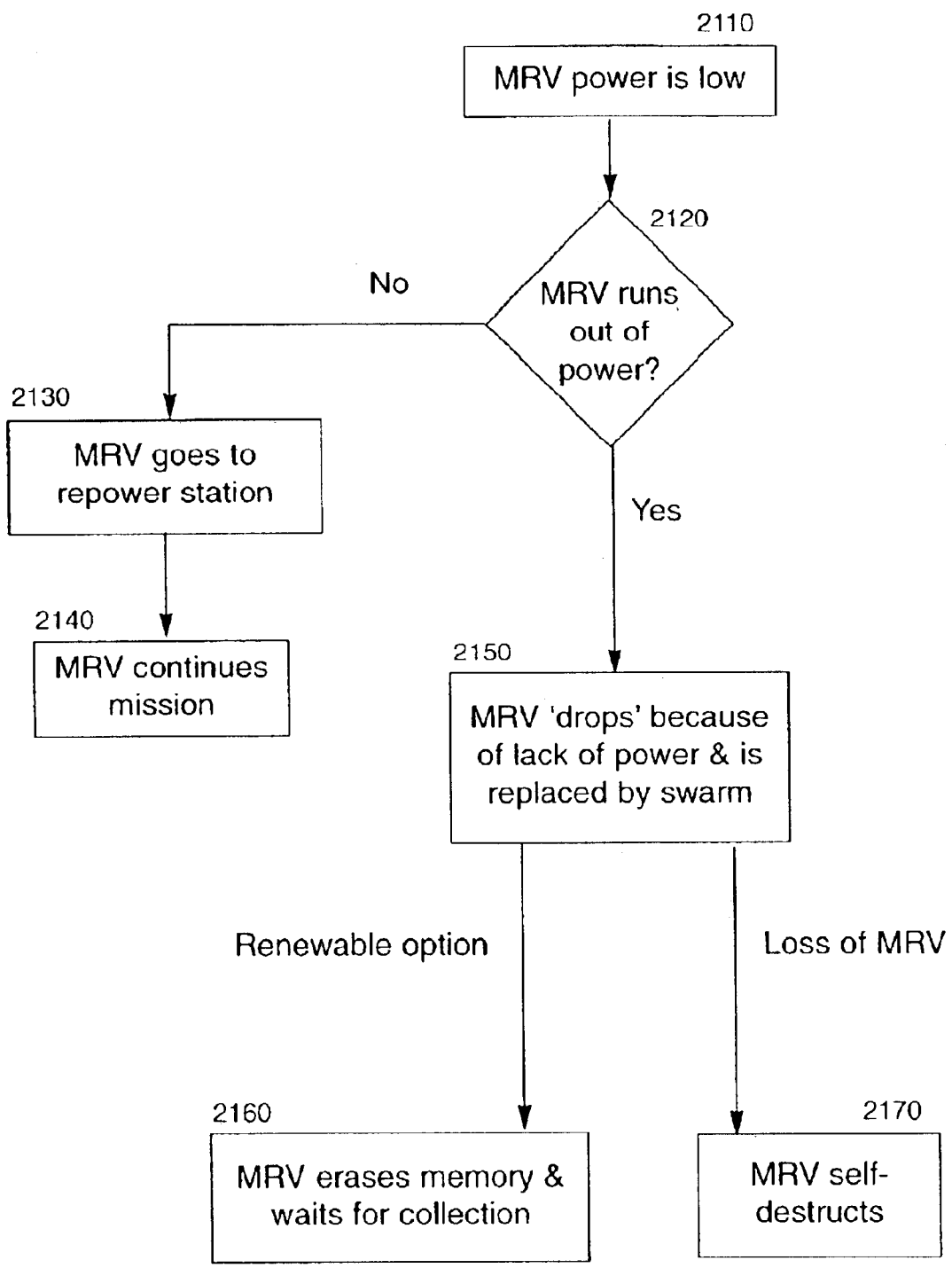
Fig 21: MRV Power Supply

Fig 22: Computation Resource Limits
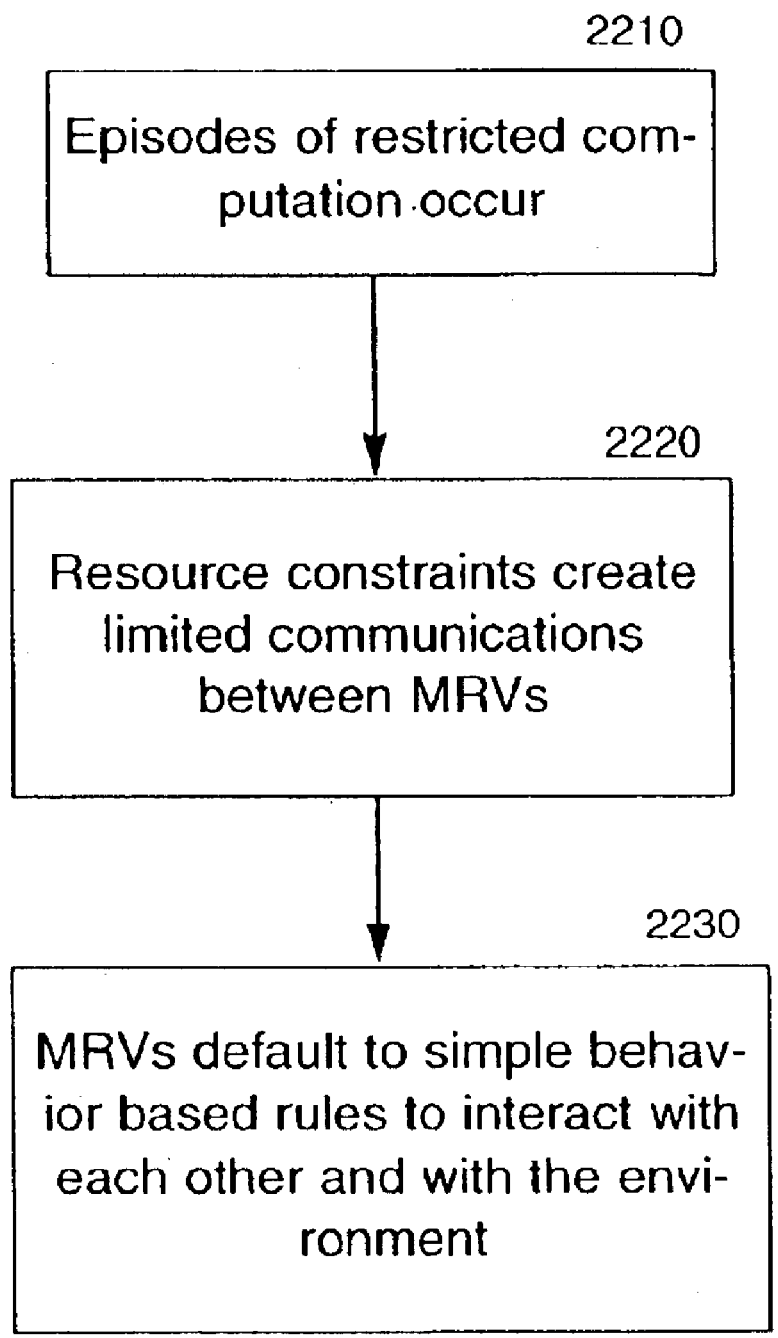

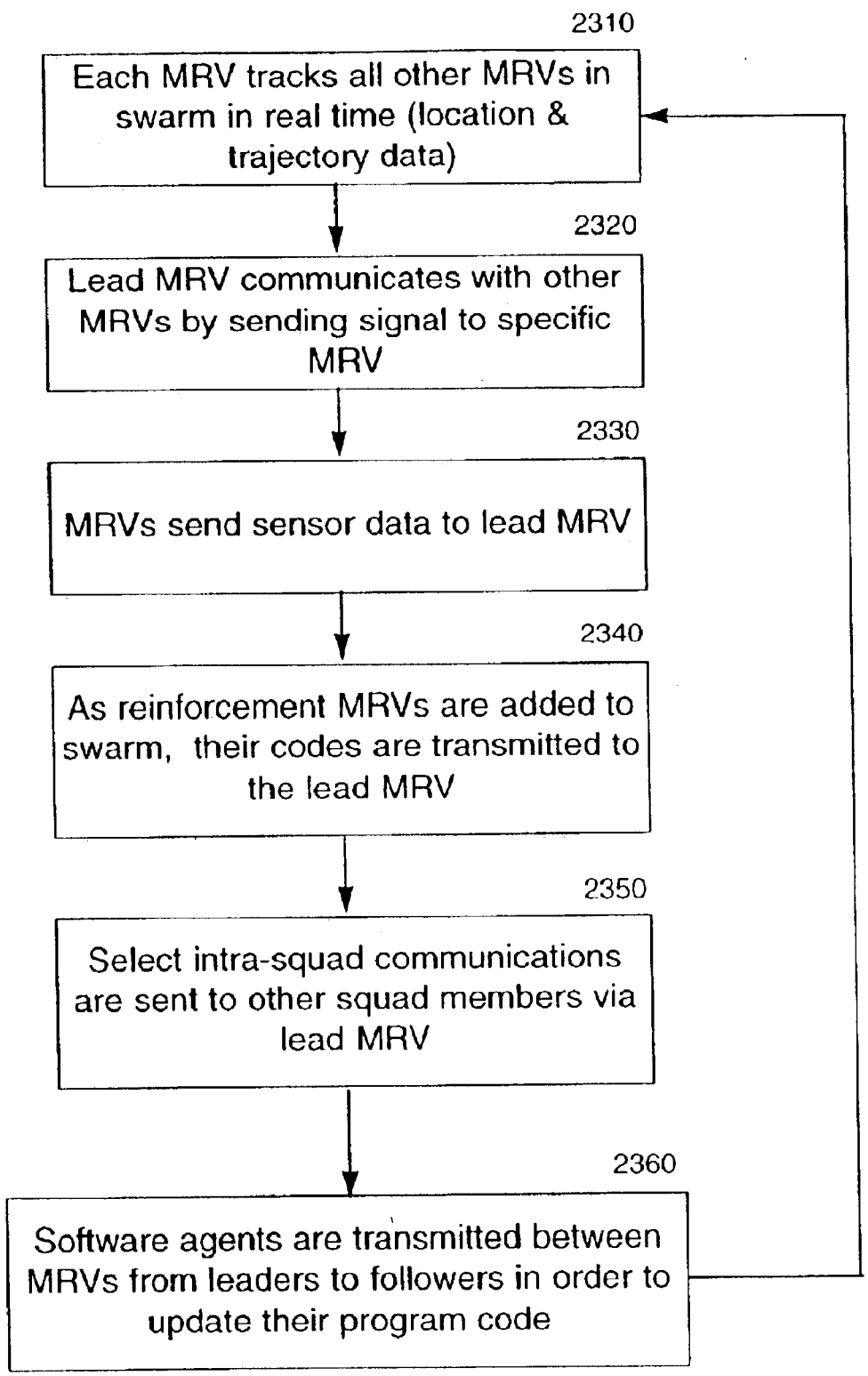
Fig 23: MRV Intercommunication

Fig 24: Environmental Interaction & Adaptation of Mobile Networks
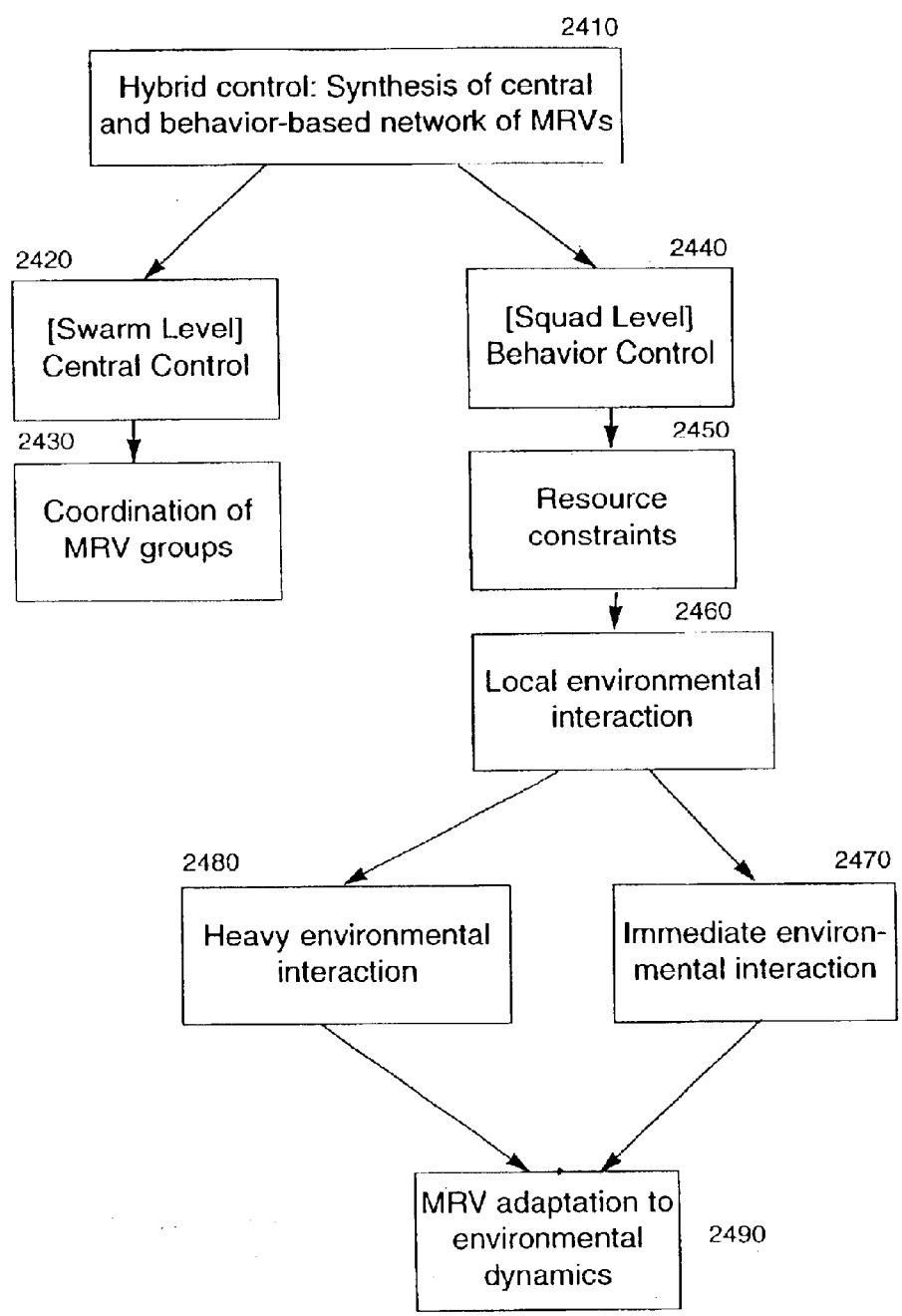

Fig 25: Environmental Feedback
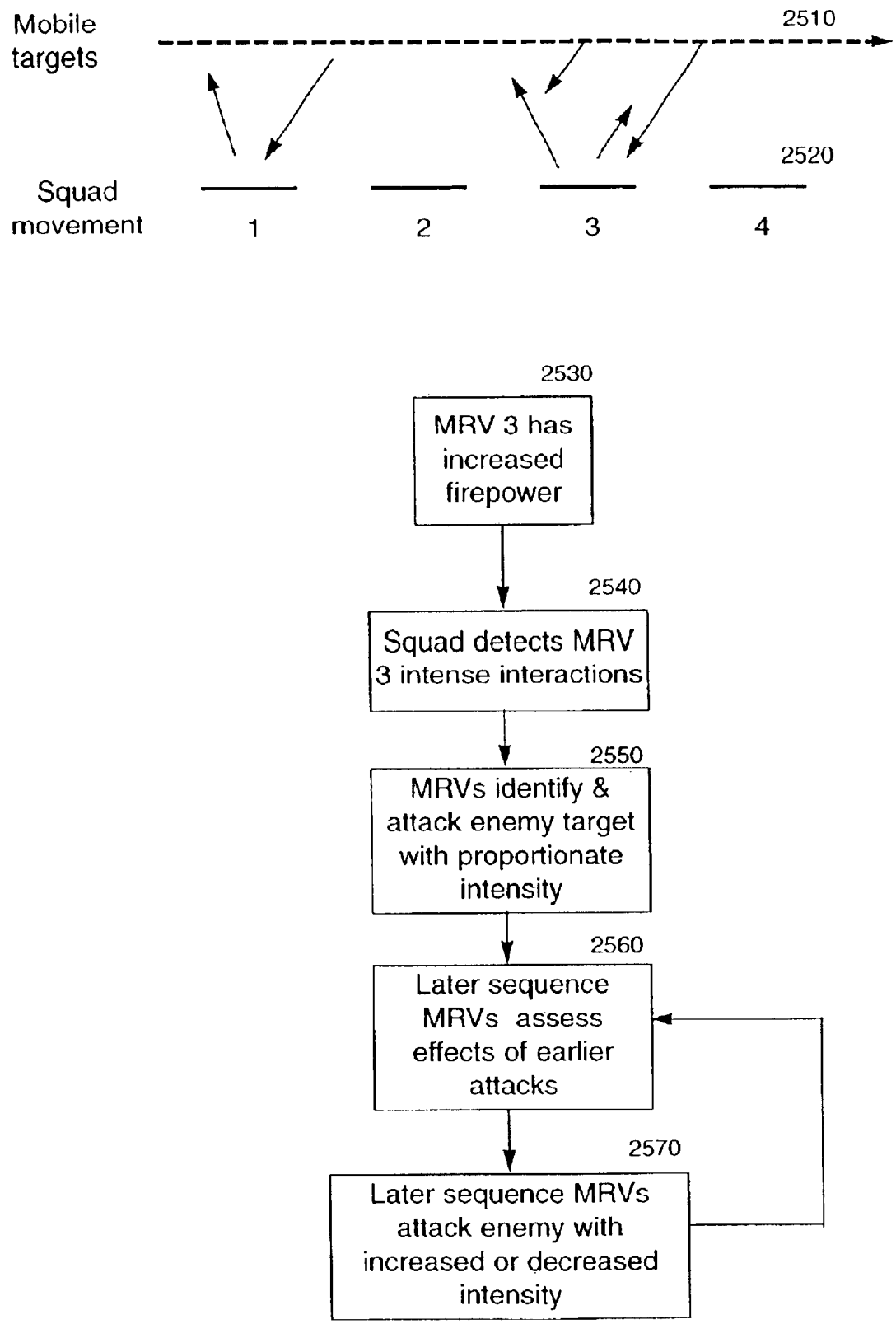

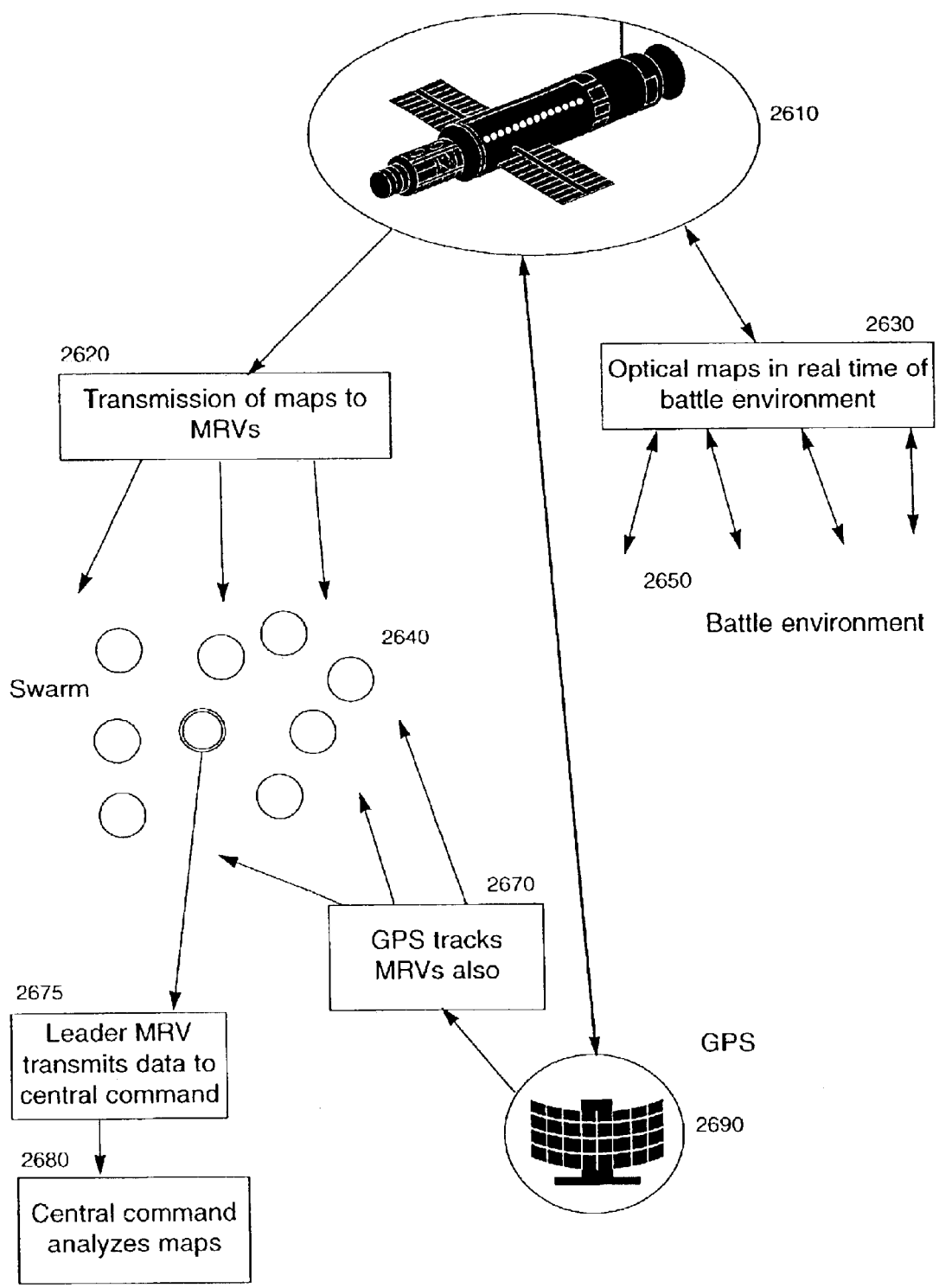
Fig 26: Satellite & External Sensor Integration

Fig 27: Swarm As Communication Interface
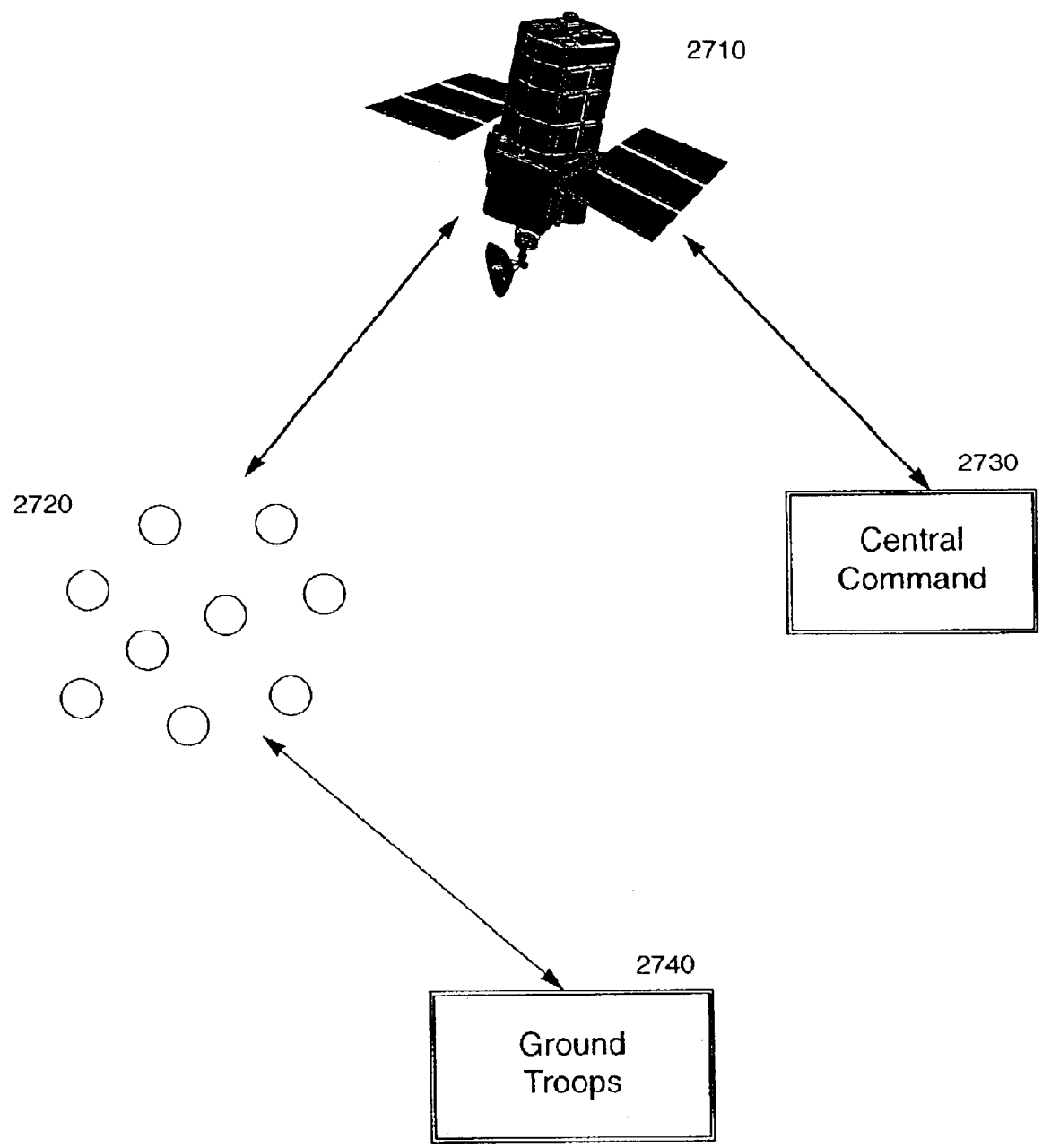

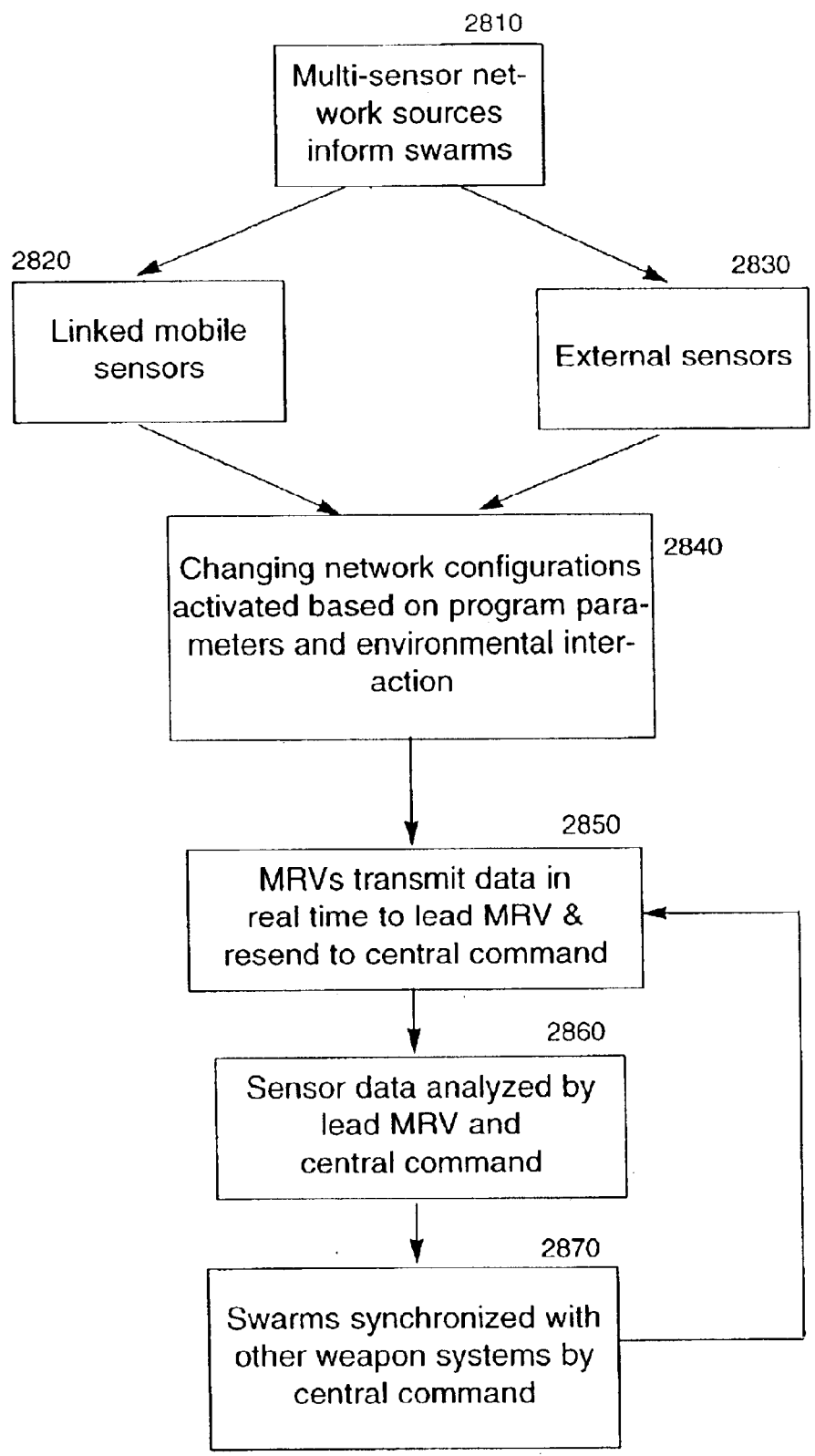
Fig 28: Mobile Sensor Network (MSN)

Fig 29: Group Dynamic Navigation
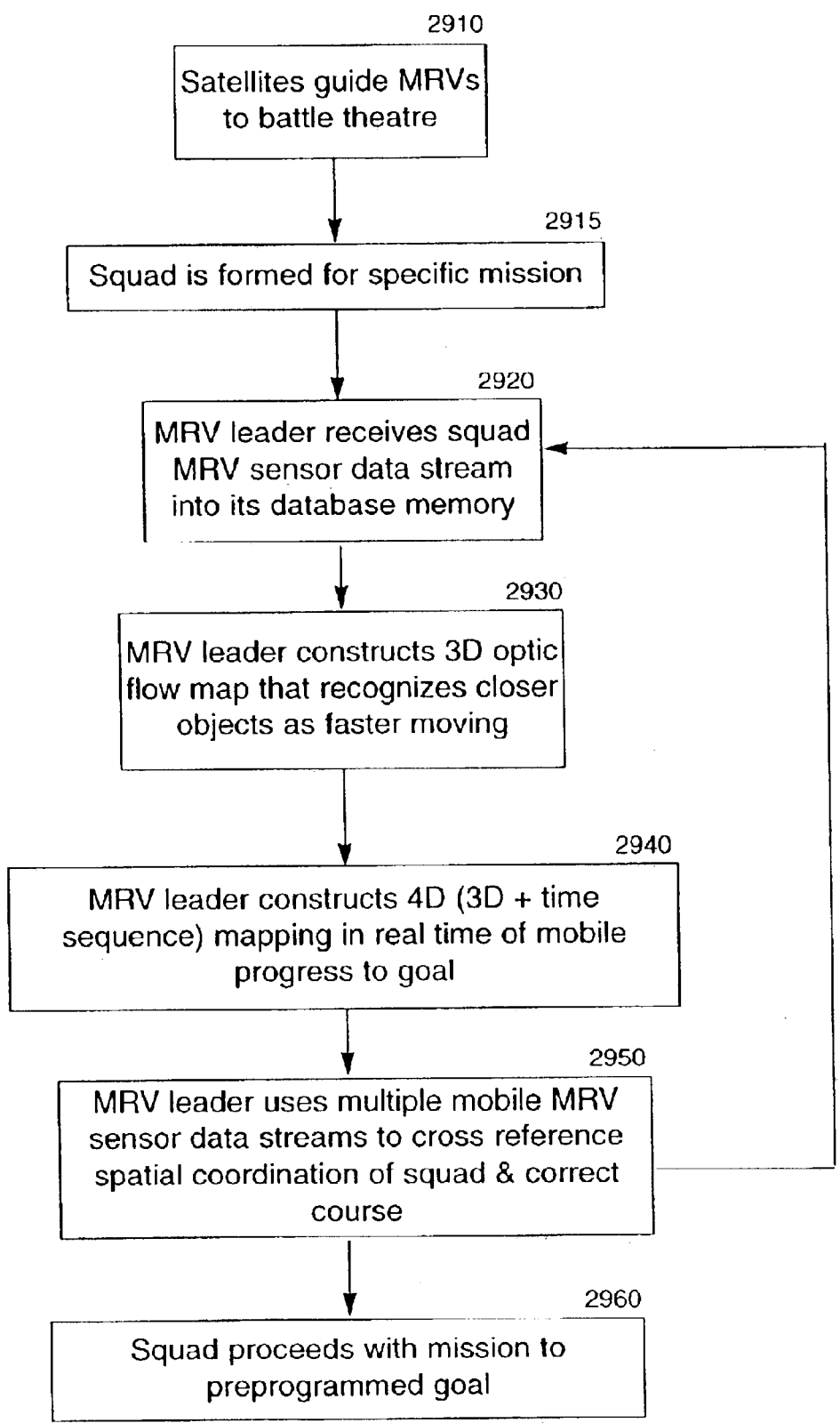

Fig 30: Group Mobility
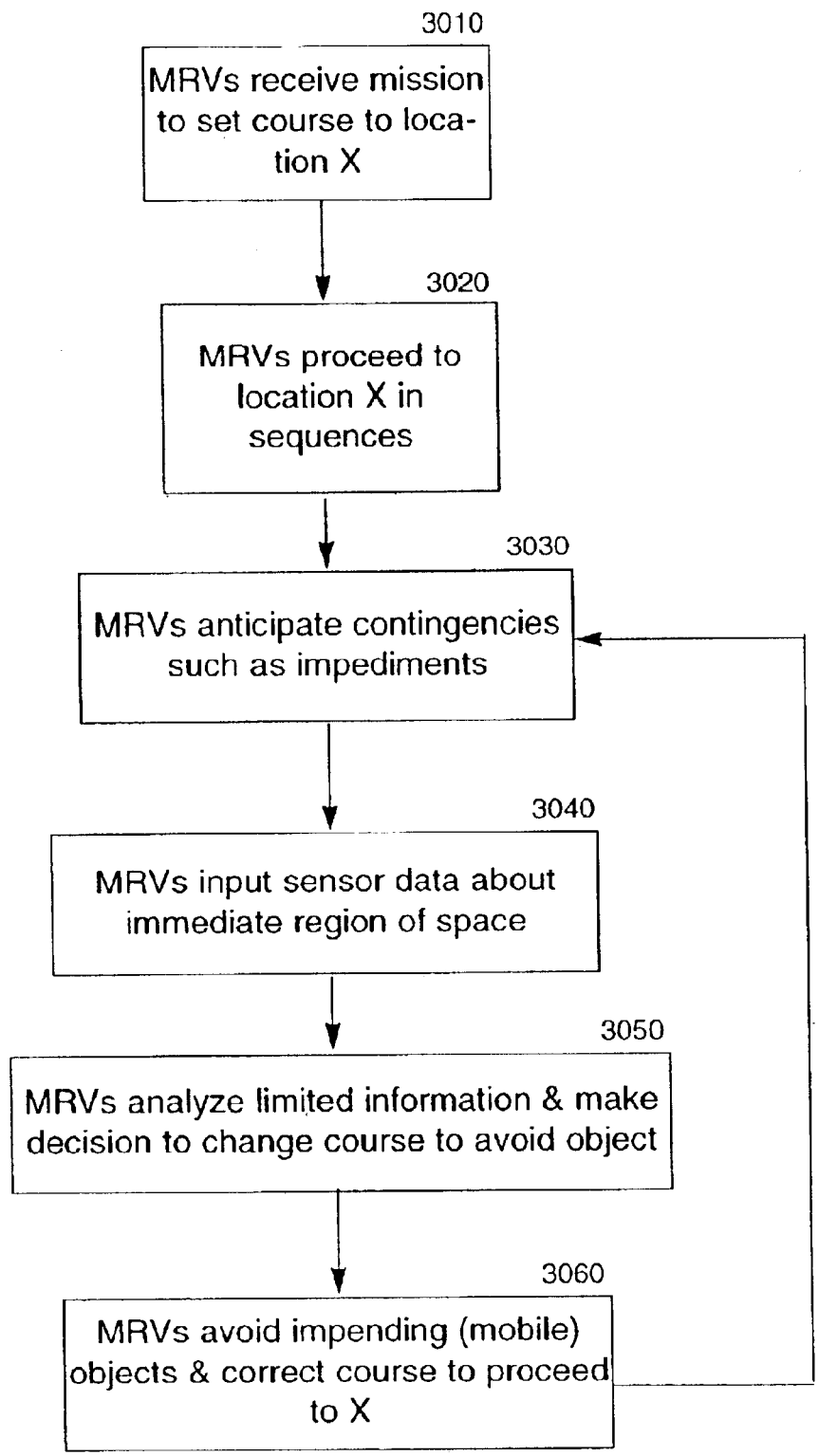

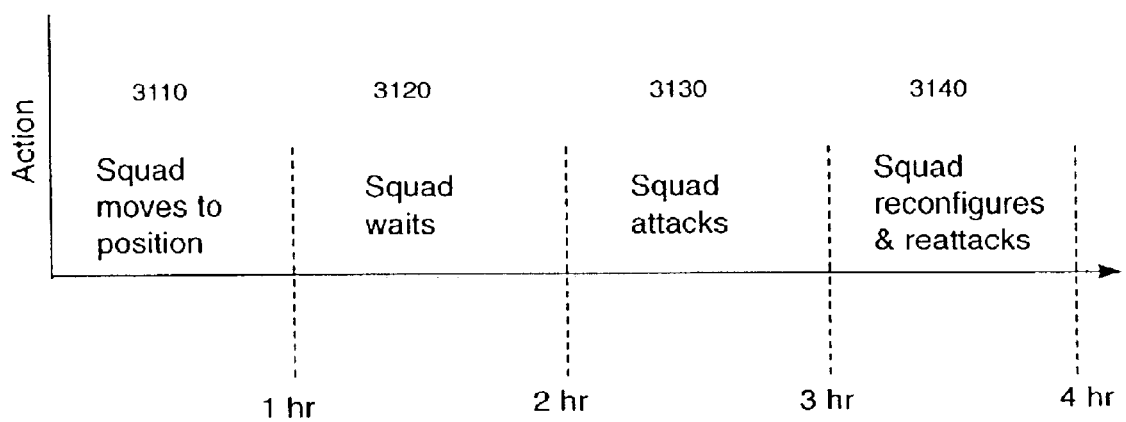
Fig 31: Discontinuous & Variable Actions of MRVs

Fig 32: Partial Maps and Continuous Mapping Process
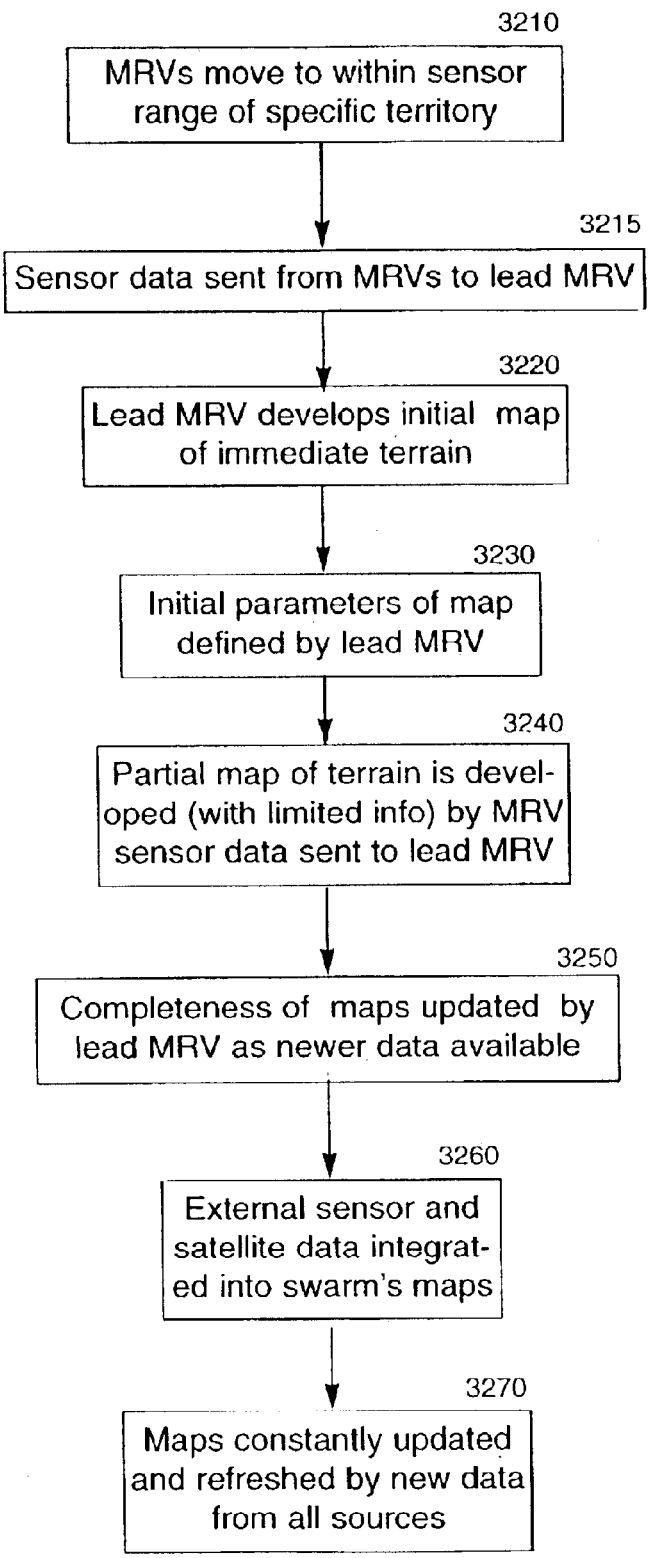

Fig 33: 3D Map Topology
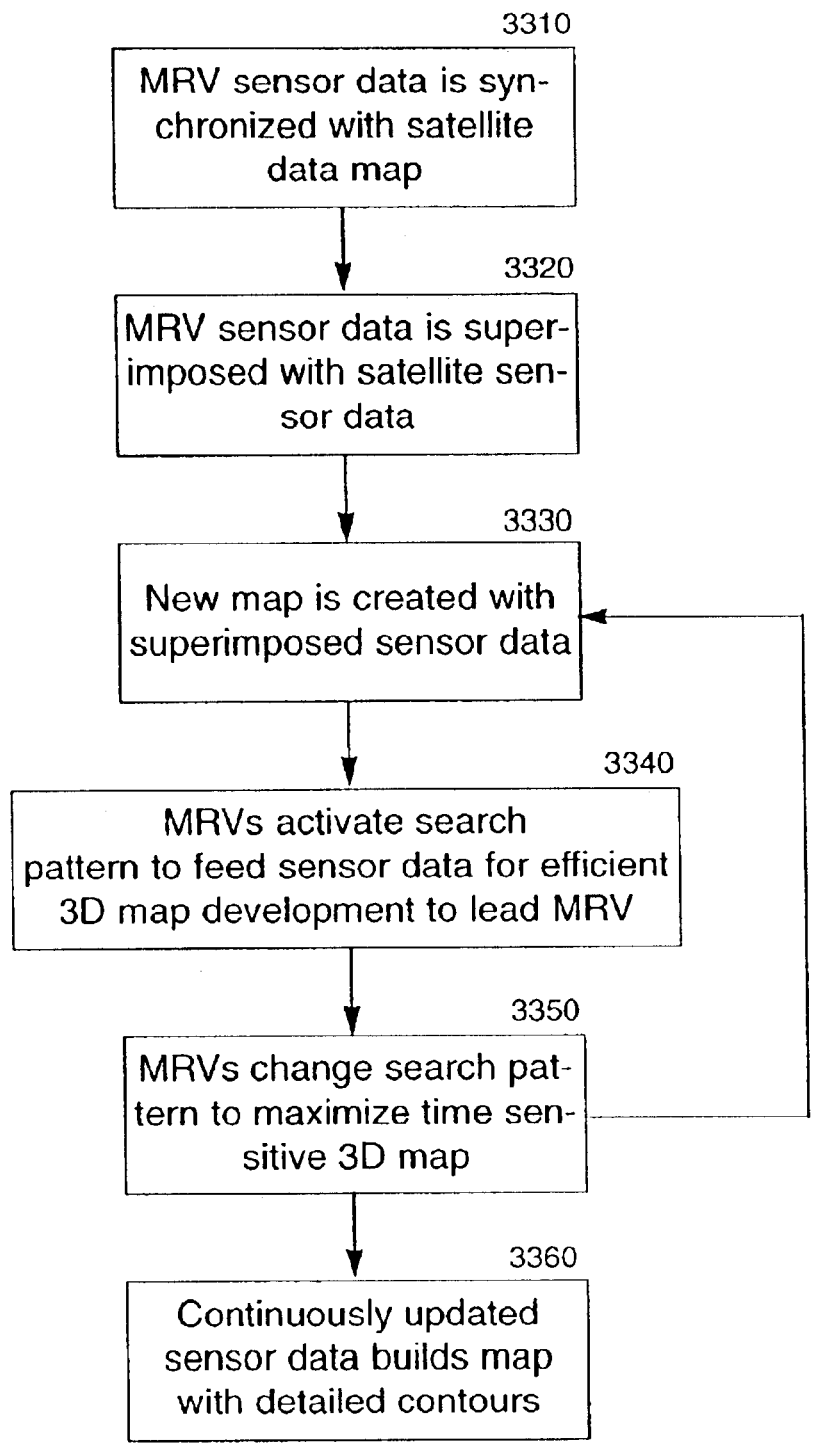

Fig 34: Mobile Software Agents
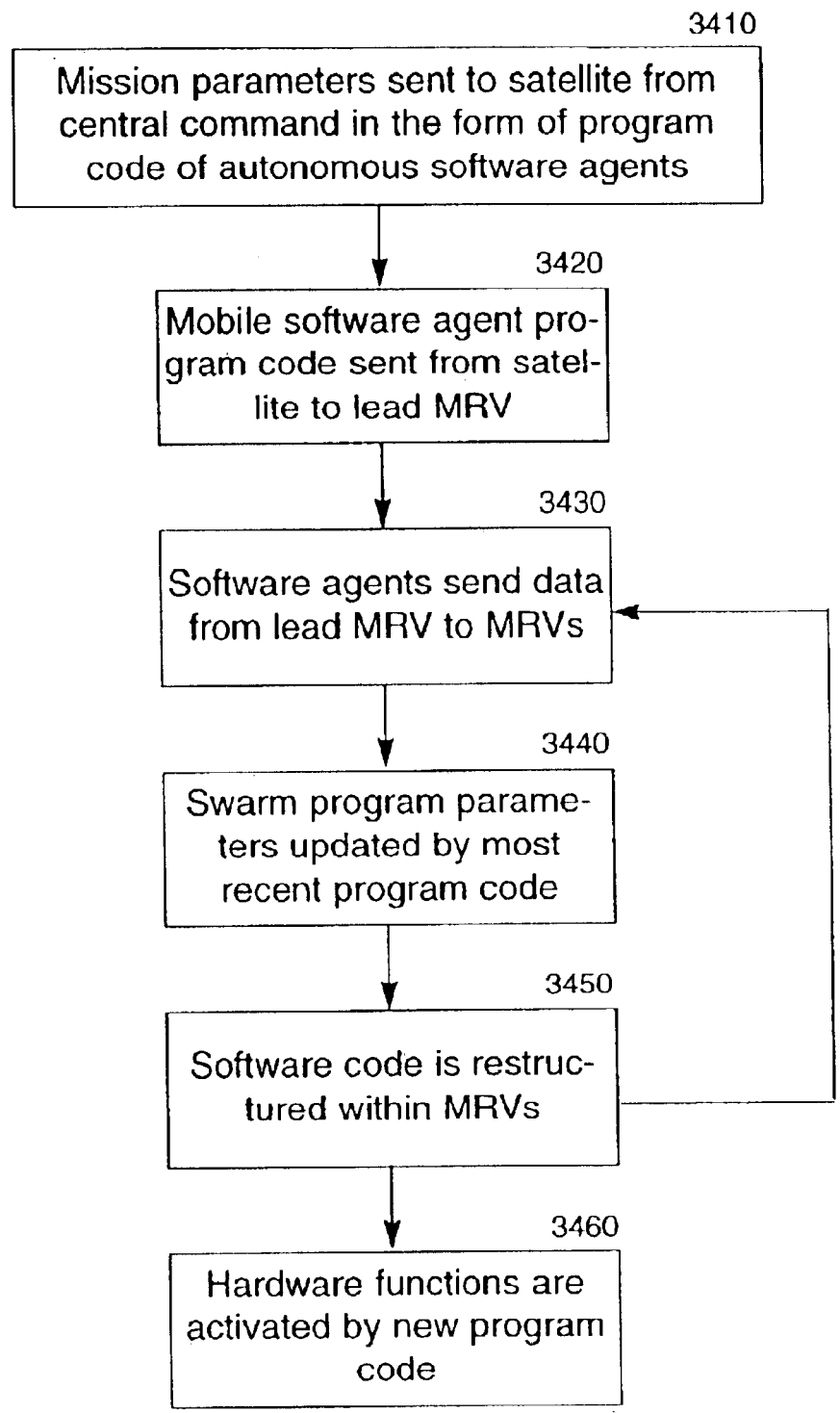

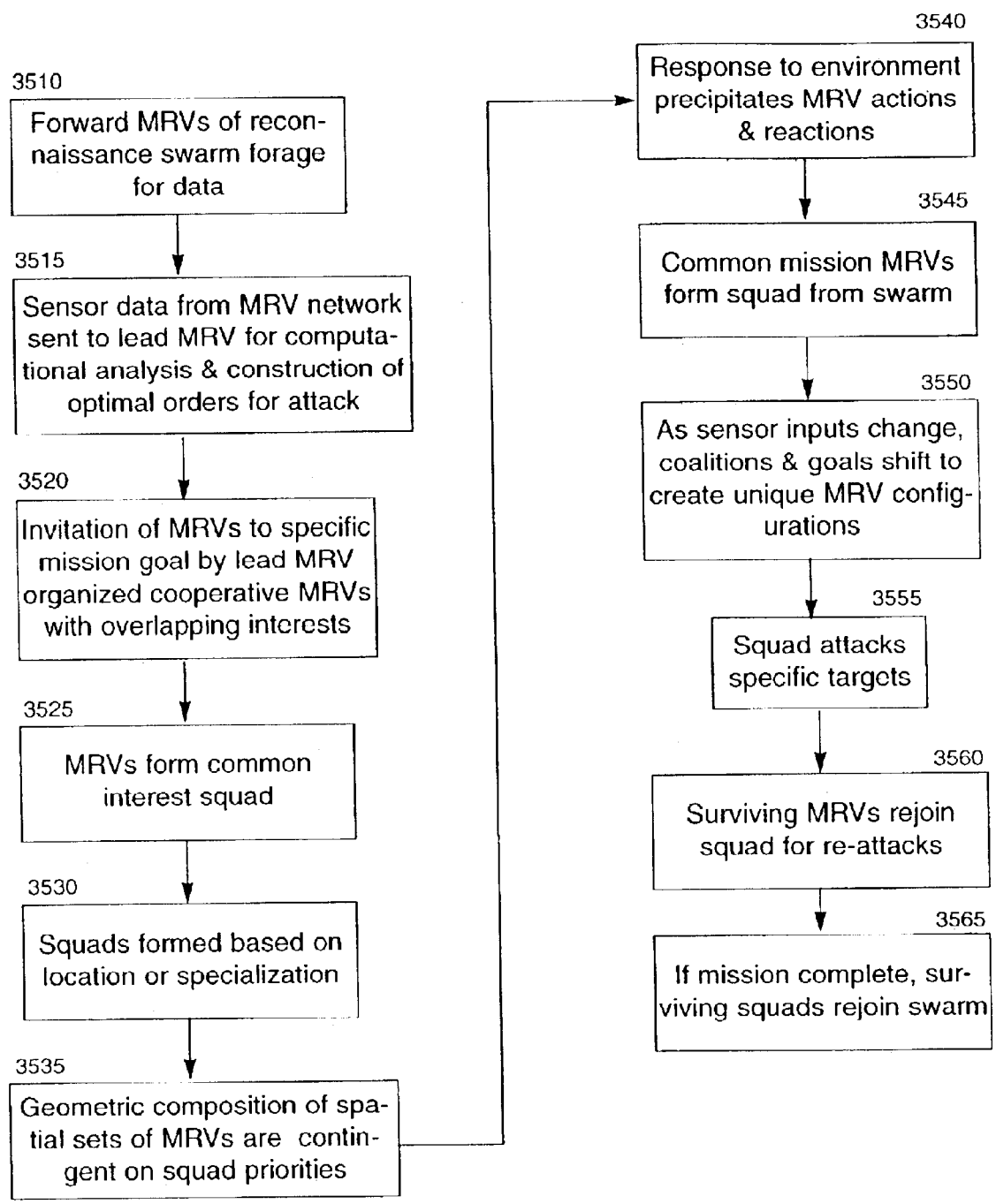
Fig 35: Swarm Aggregation: Formation Into Squads

Fig 36: Squad Organization & Response to Environment
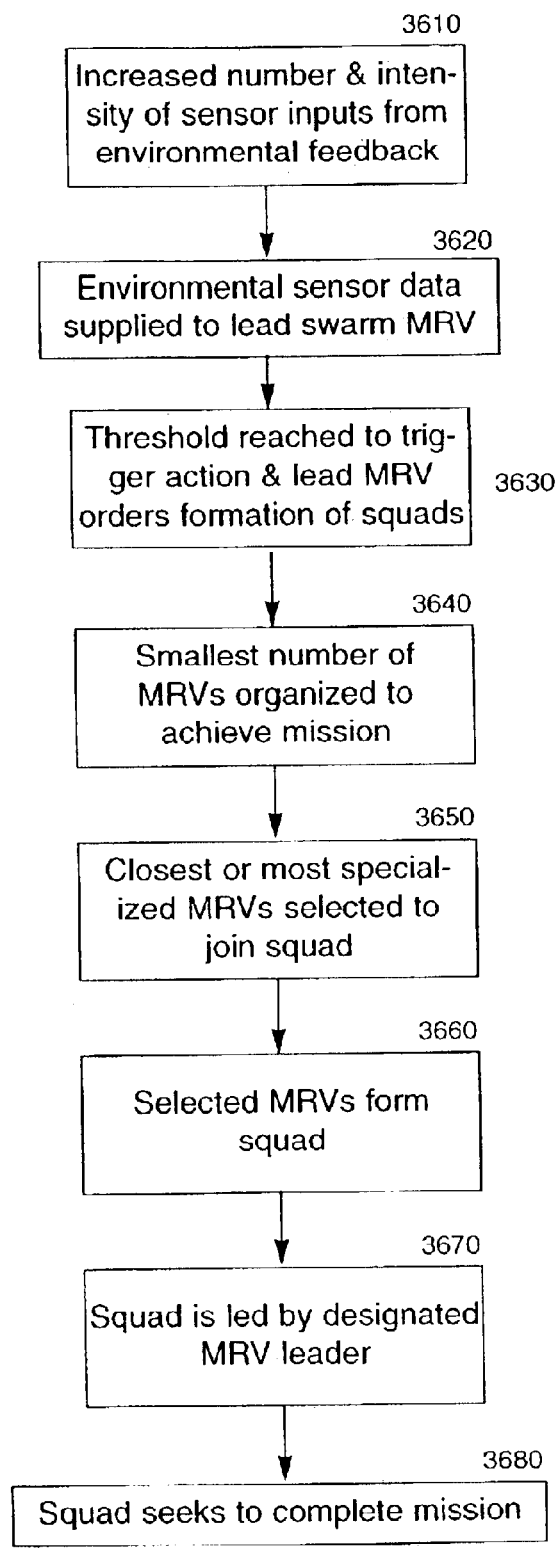

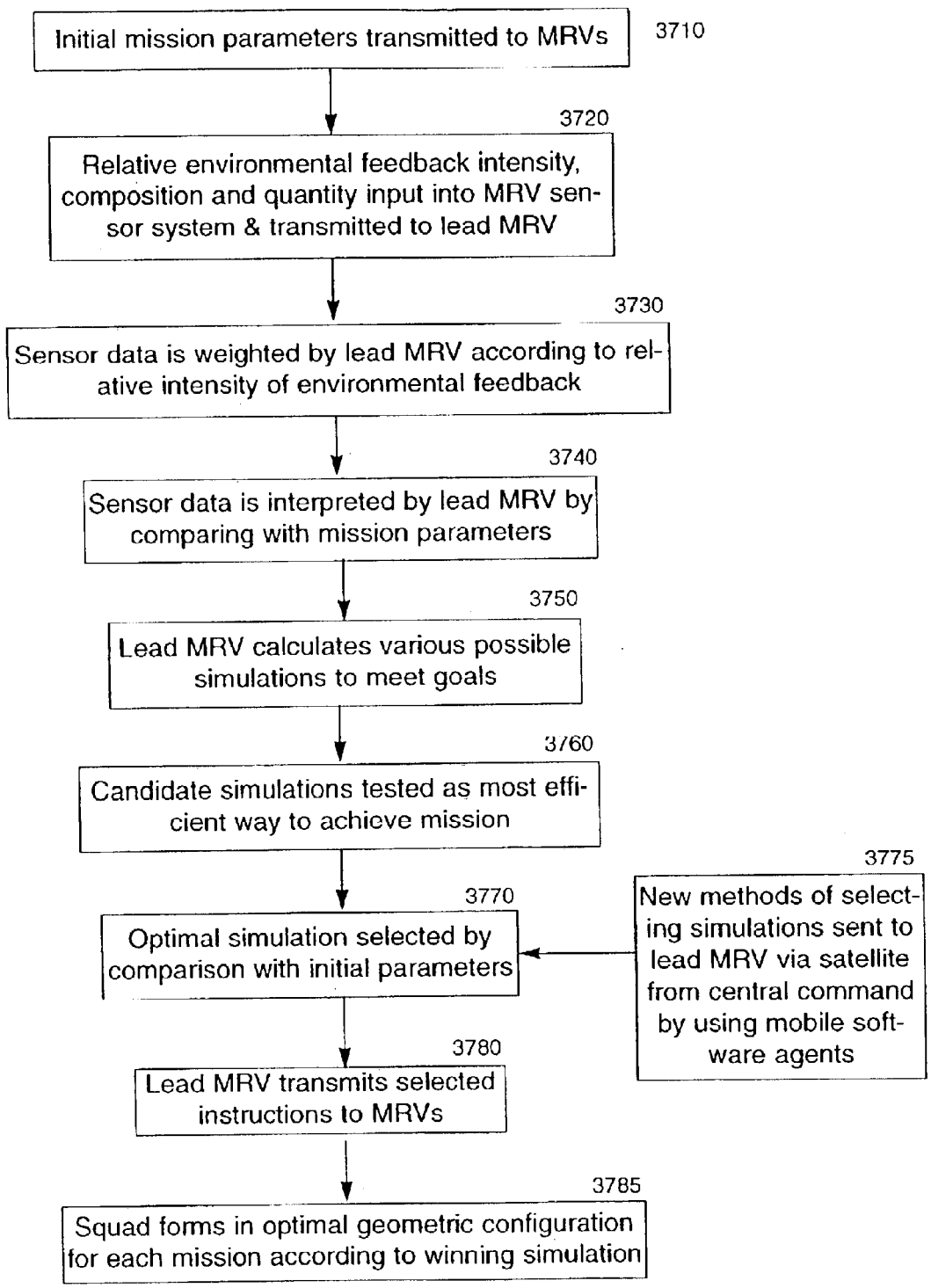
Fig 37: MRV Decision Making

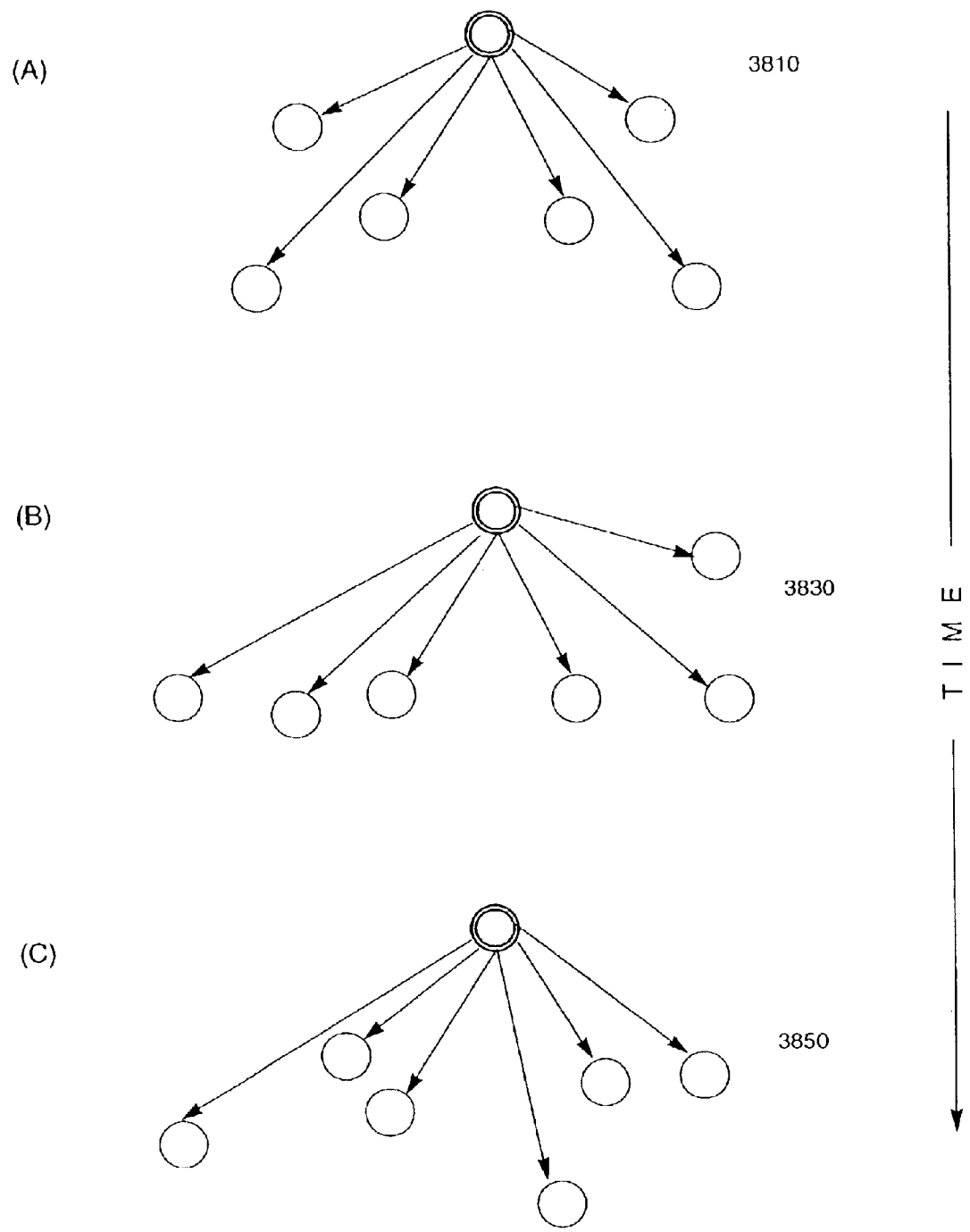
Fig 38: Octopus Dynamics Wireless Squad behavior Analogy

Fig 39: Collective Biodynotics
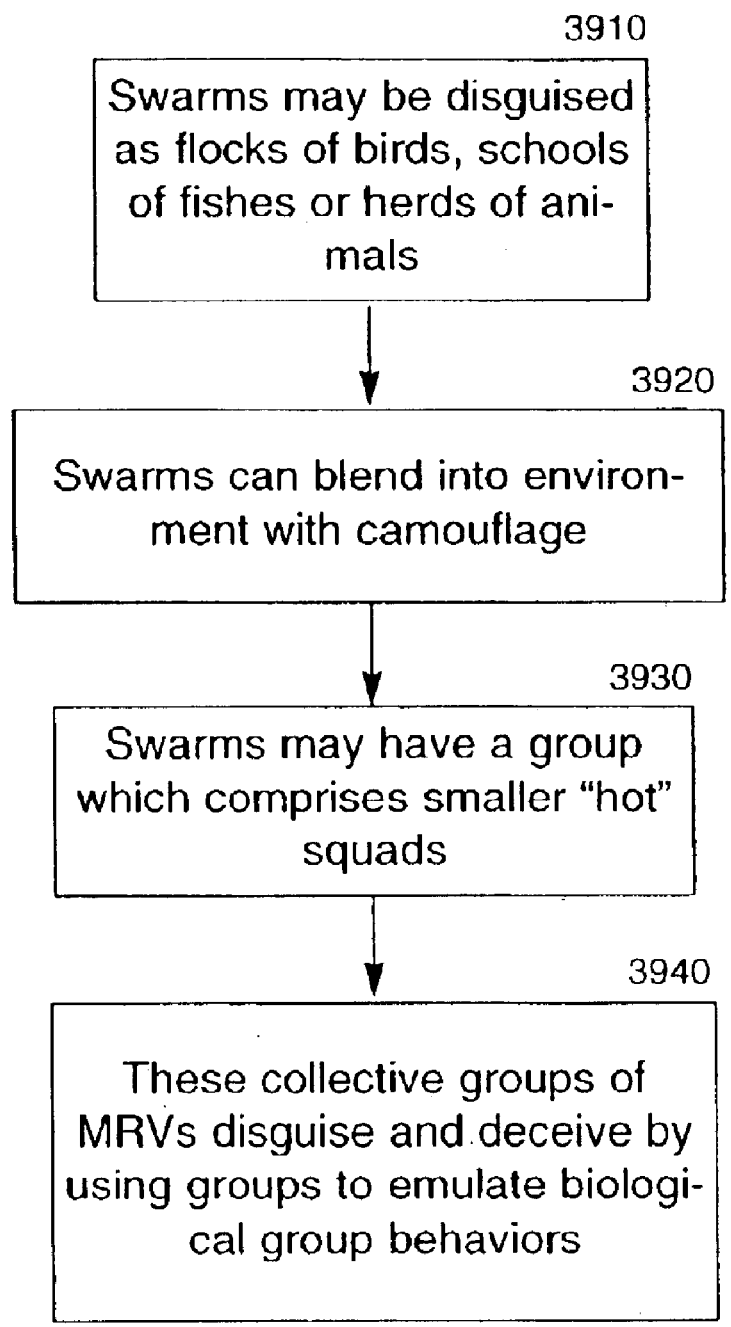

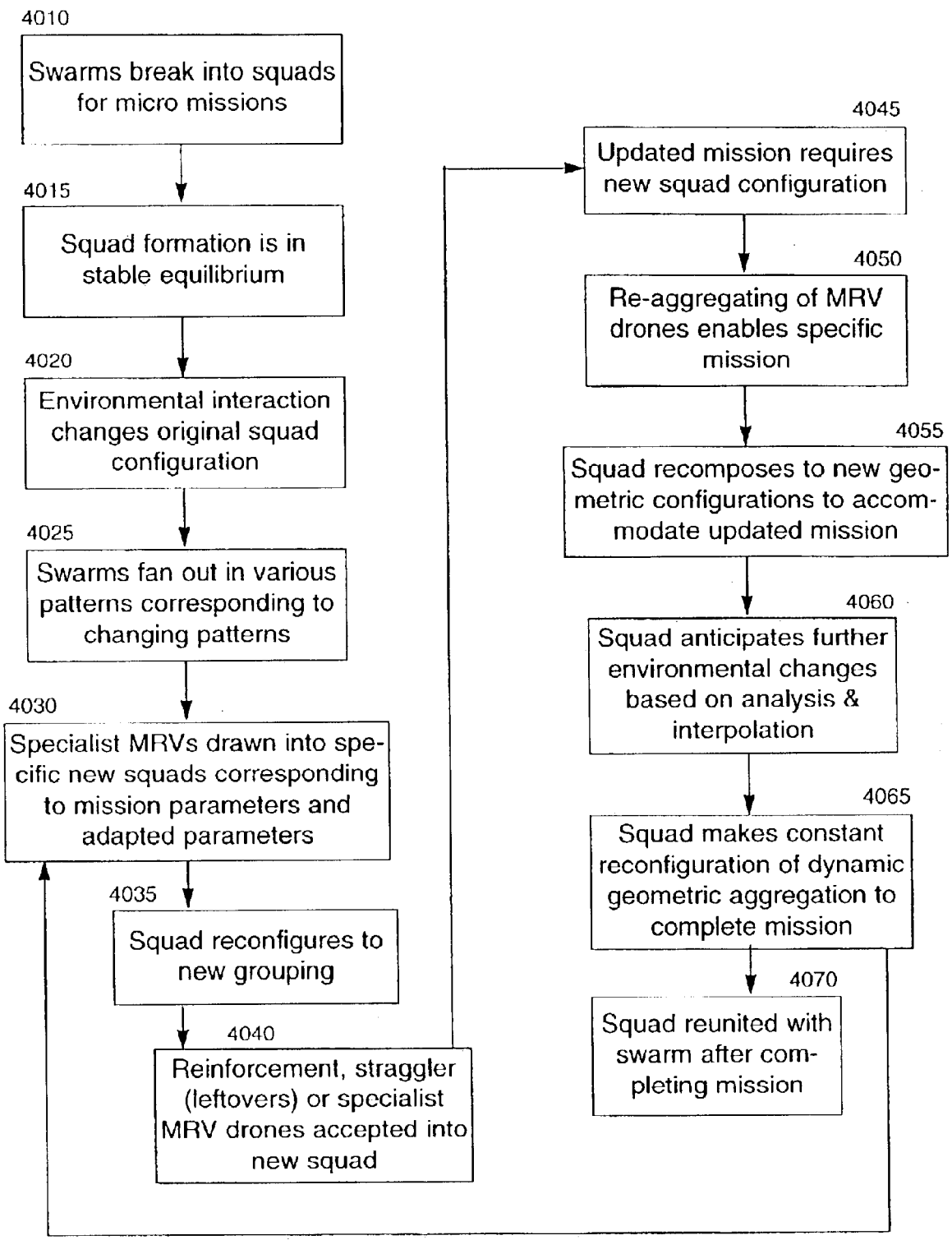
Fig 40: Regrouping Processes

Fig 41: Sample Squad Reconstitution Process
(A)
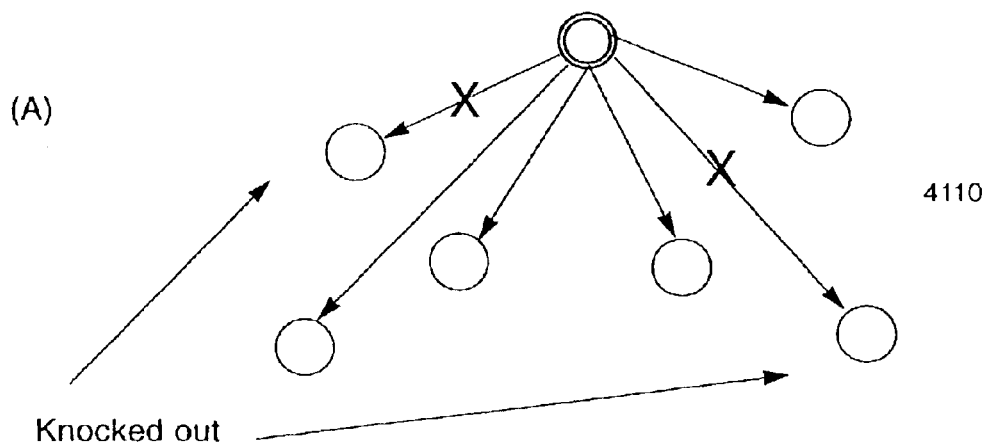
Knocked out
(B)
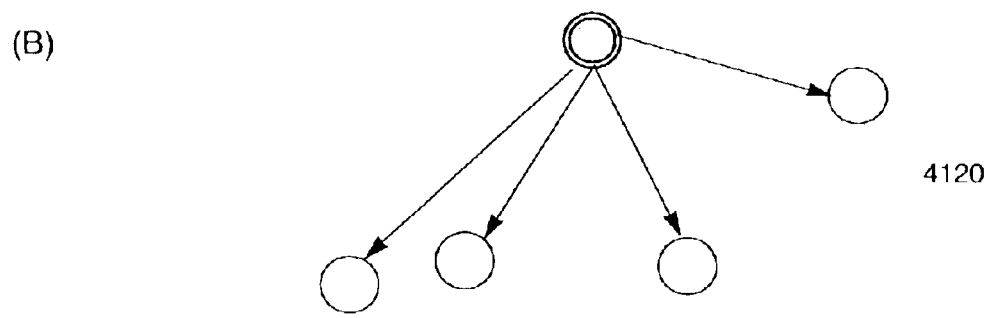
(C)
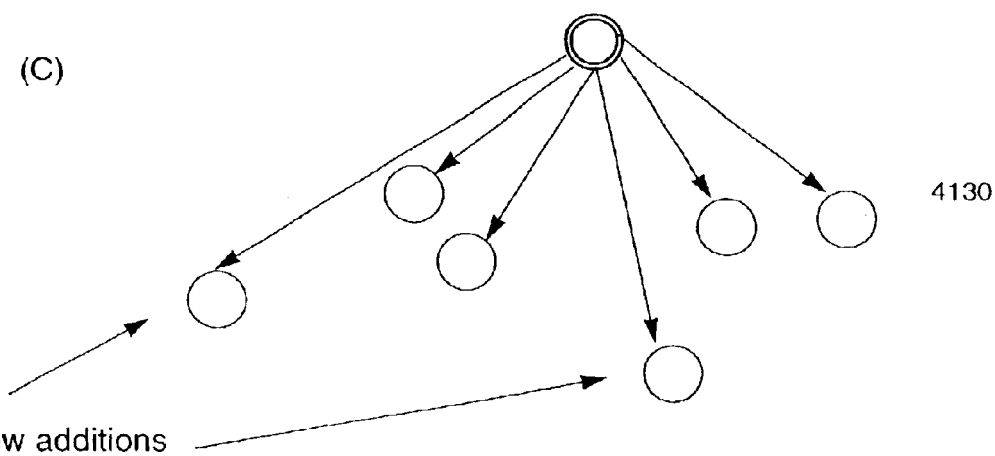
New additions

Fig 42: Problem Solving Process of MRV Groups
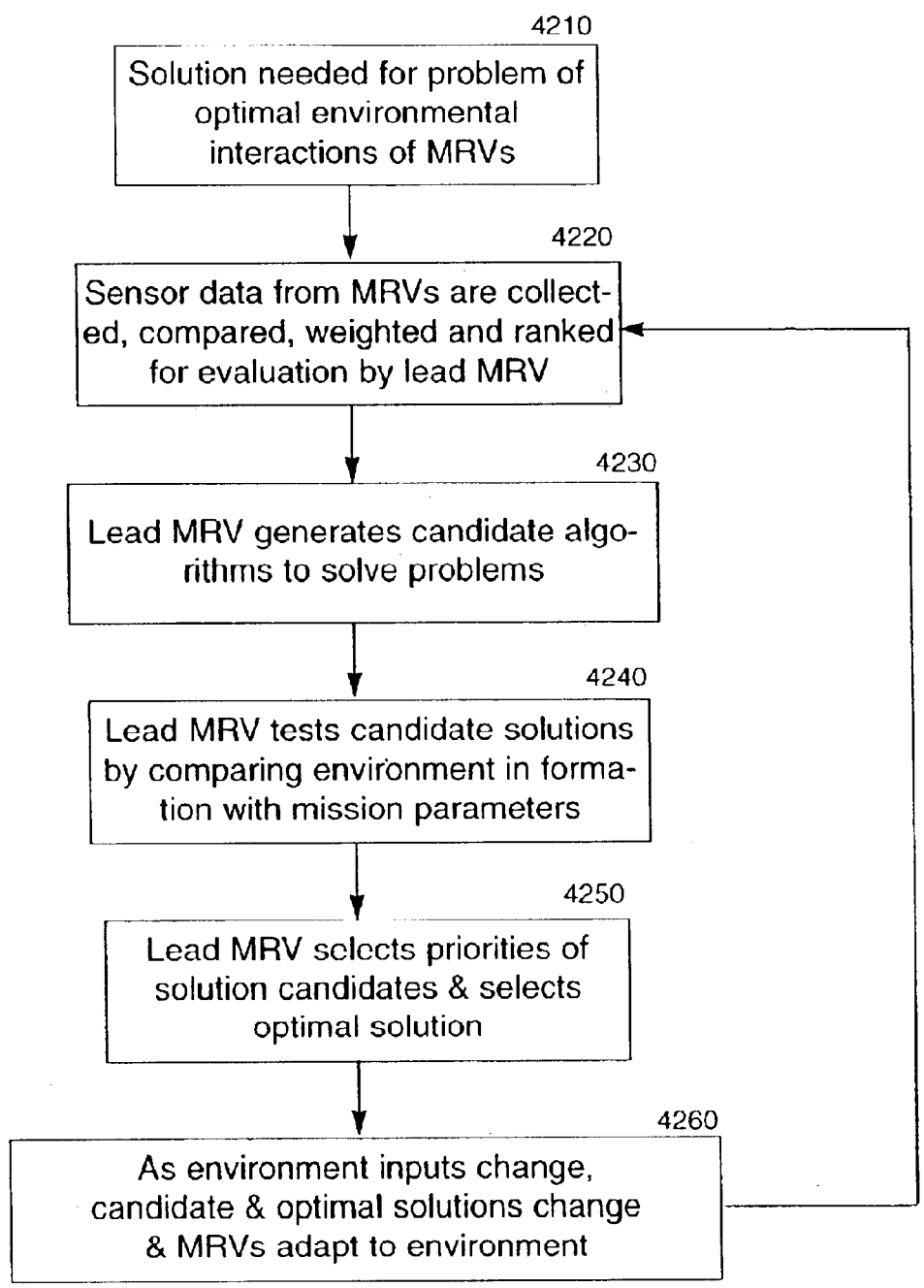

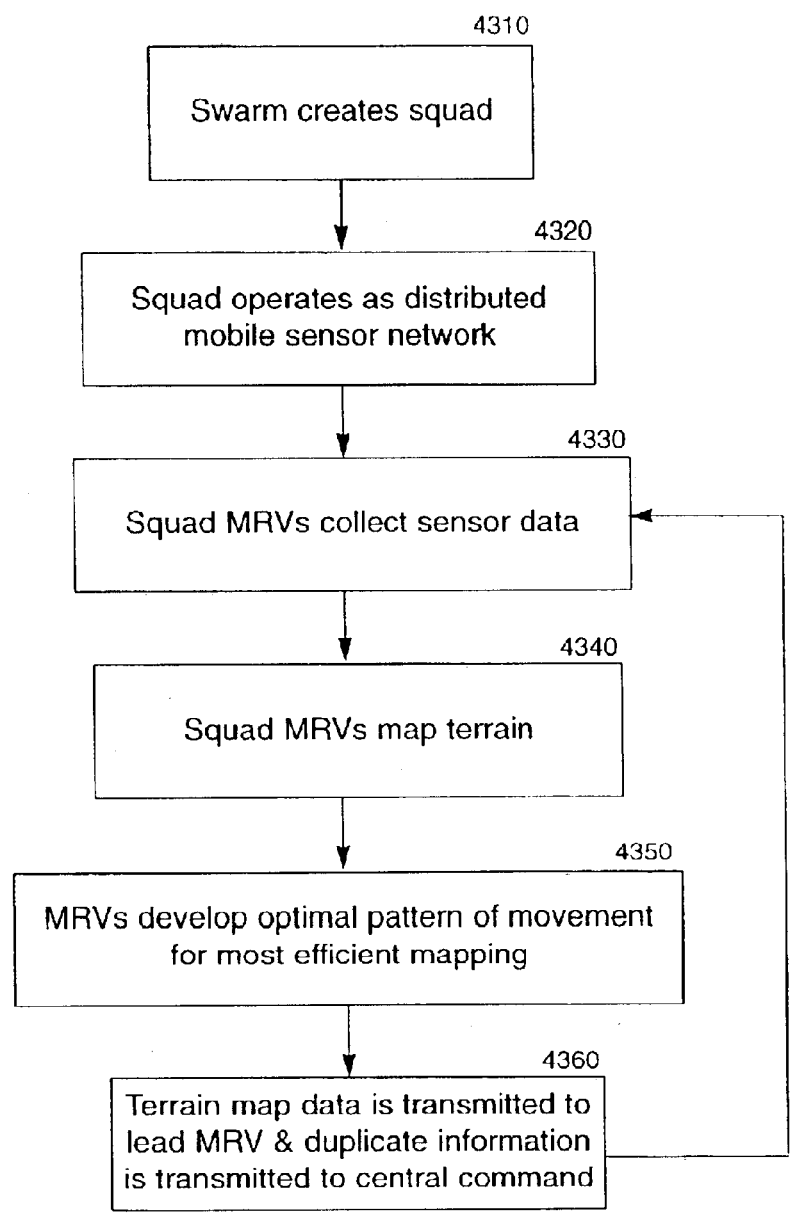
Fig 43: Neutral Swarm Functions' Surveillance & Reconnaissance

Fig 44: Defensive Swarm Functions
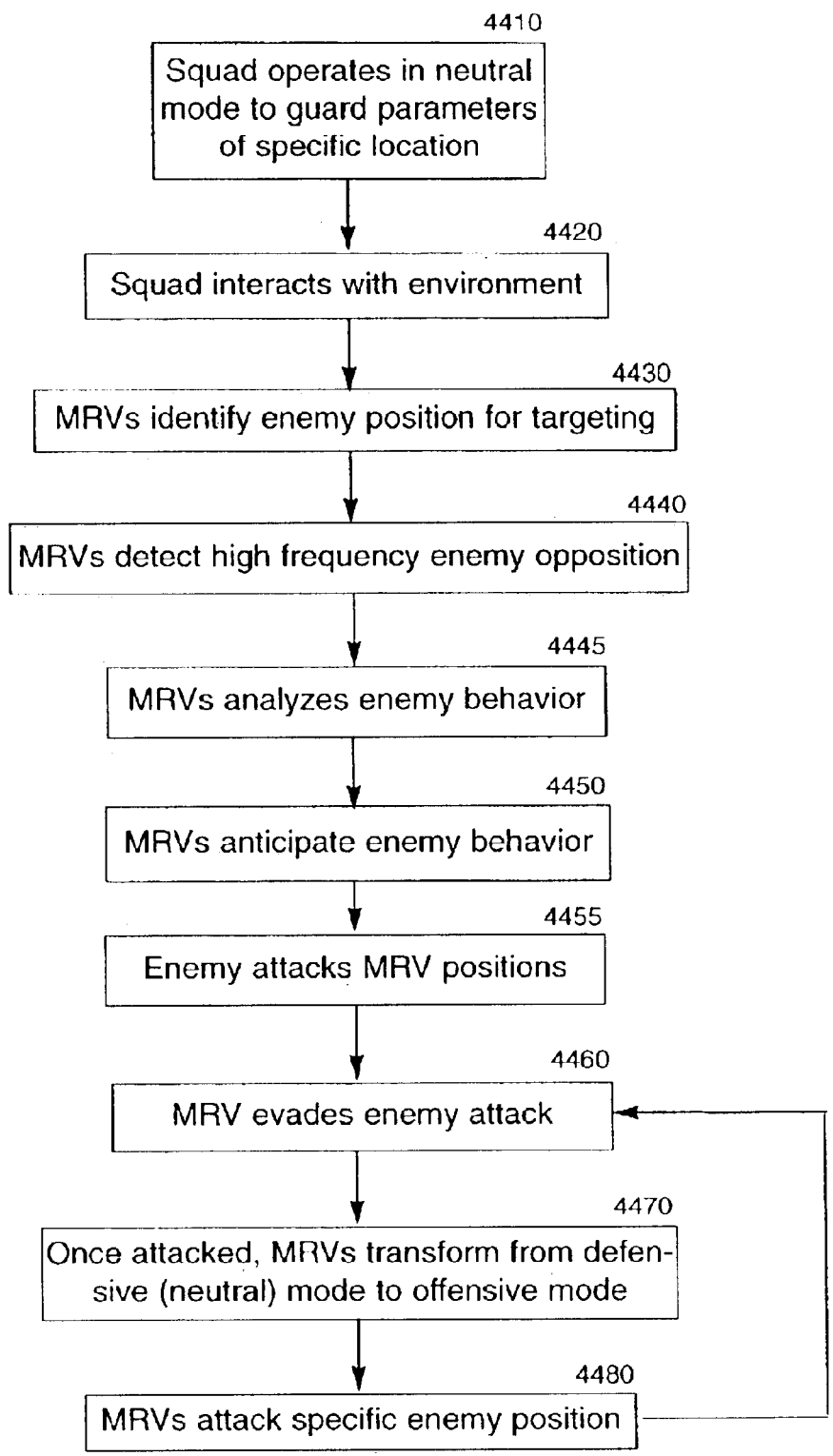

Fig 45: Offensive Swarm Functions

1. Clearing & attacking as team

2. Targeting & attacking as team

3. MRVs carrying munitions

4. MRVs fire external munitions

5. MRVs launch nonlethal attacks, including:
   a) tranquilizer gas
   b) electric shock
   c) sound disabler 6. Refueling or recharging MRVs 7. Electromagnetic pulse (EMP) function of group of MRVs

Fig 46: Intelligent Mines That Convert To Active Status
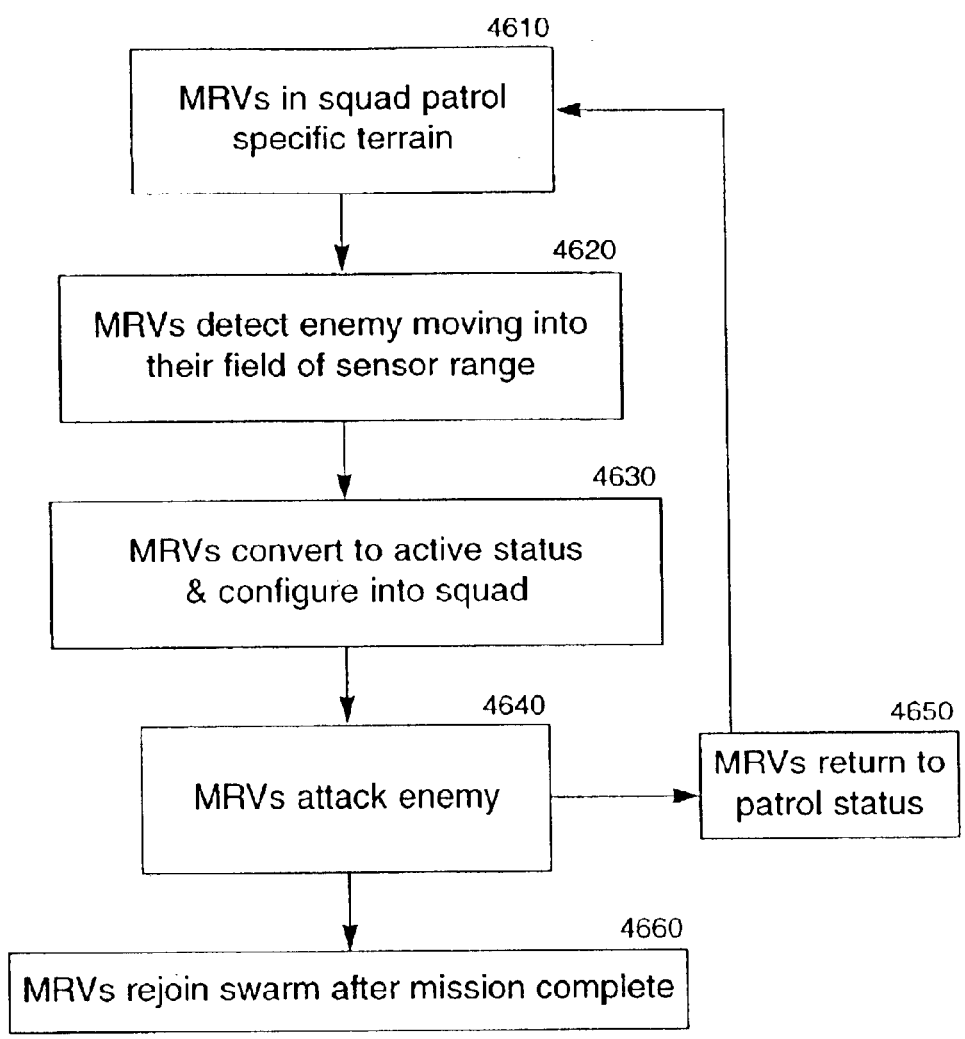

Fig 47: Tactical Model 1: Unilateral Assault
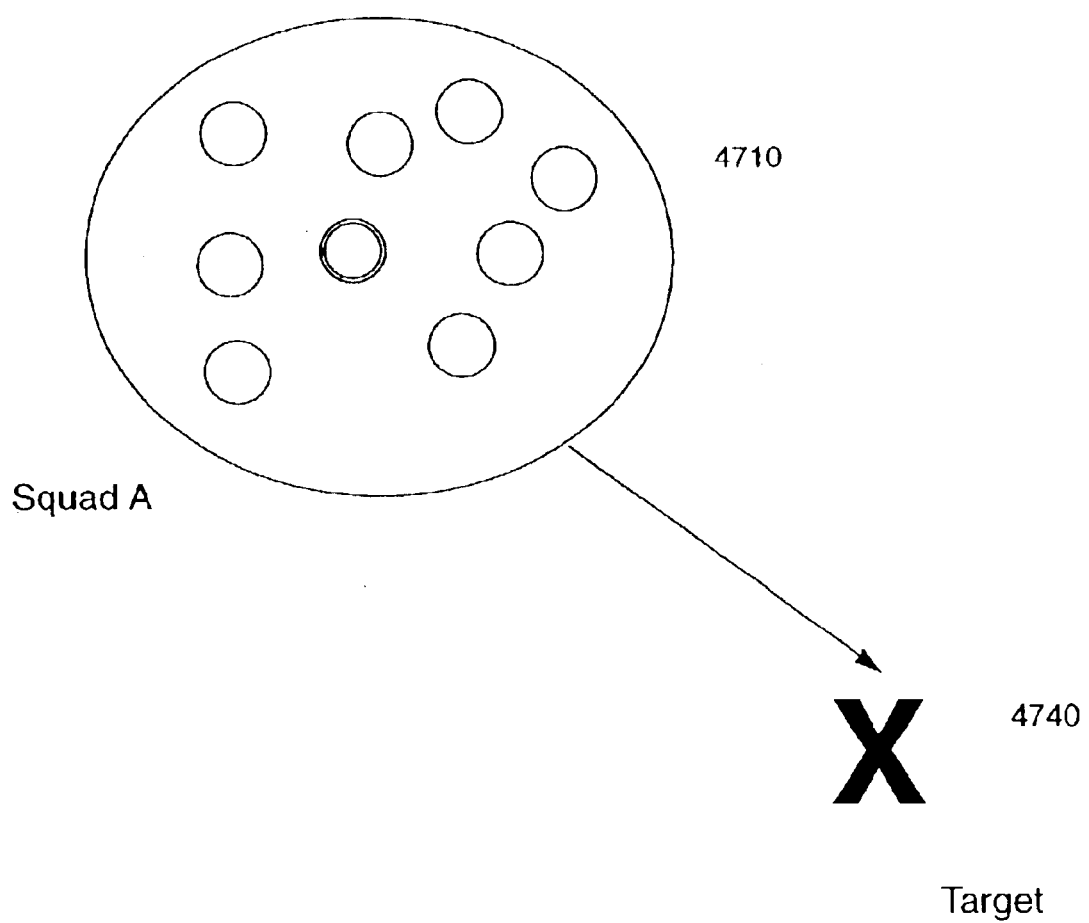

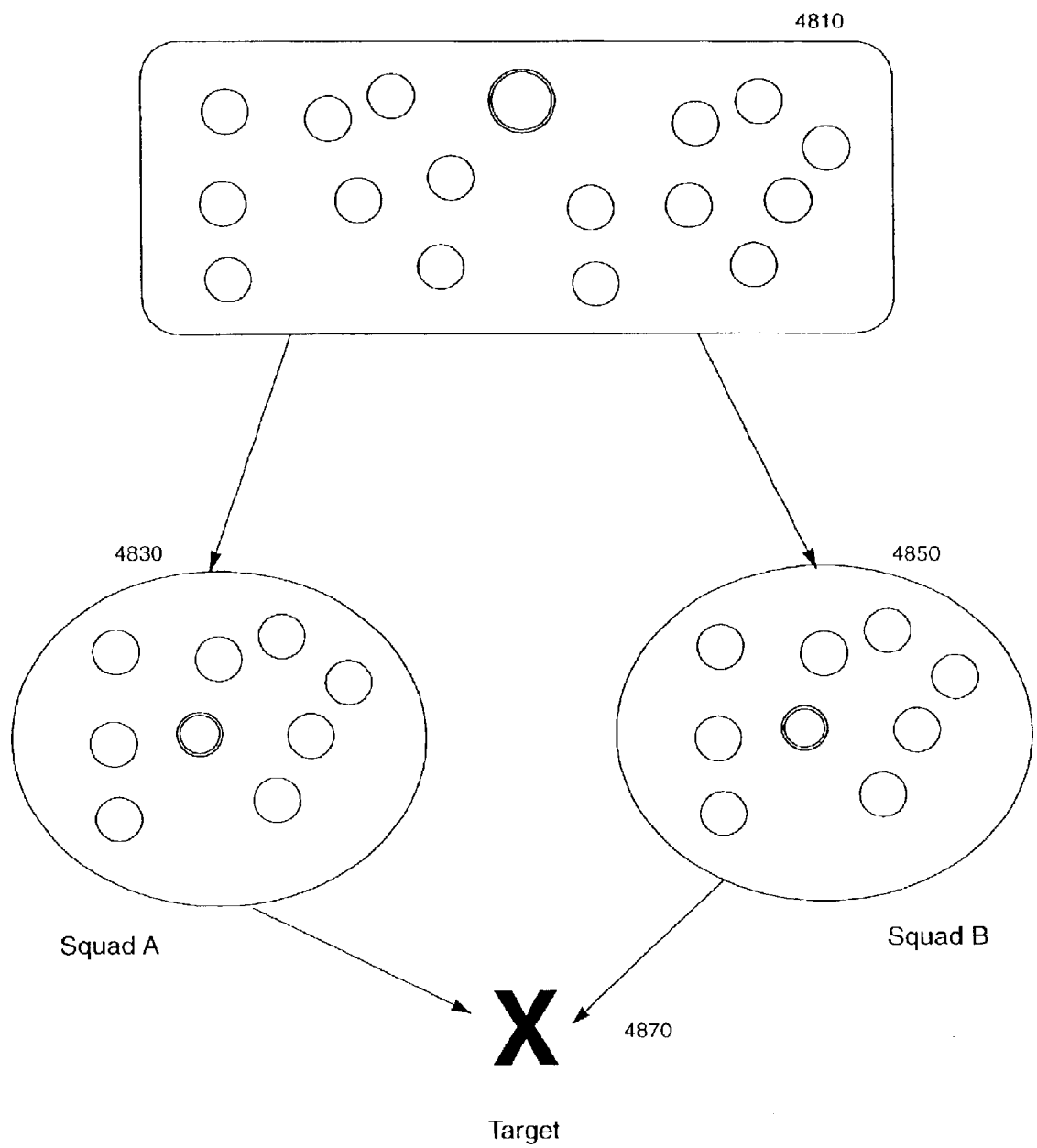
Fig 48: Tactical Model 2: Outflank Enemy

Fig 49: Tactical Model 3: Swarms Attack Beach in Littoral Assault
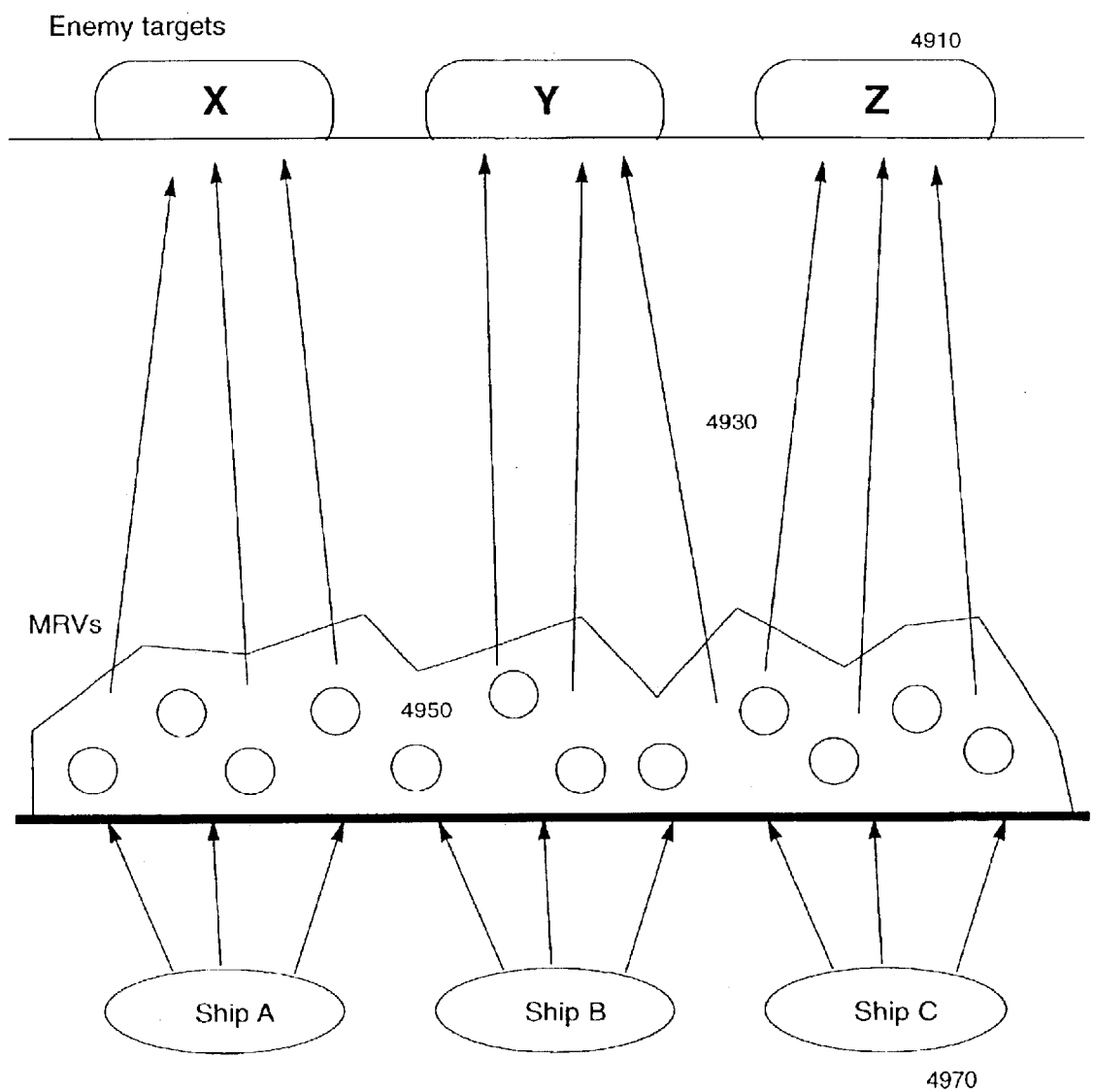

Fig 50: MRV Dynamics 1: The Gambit
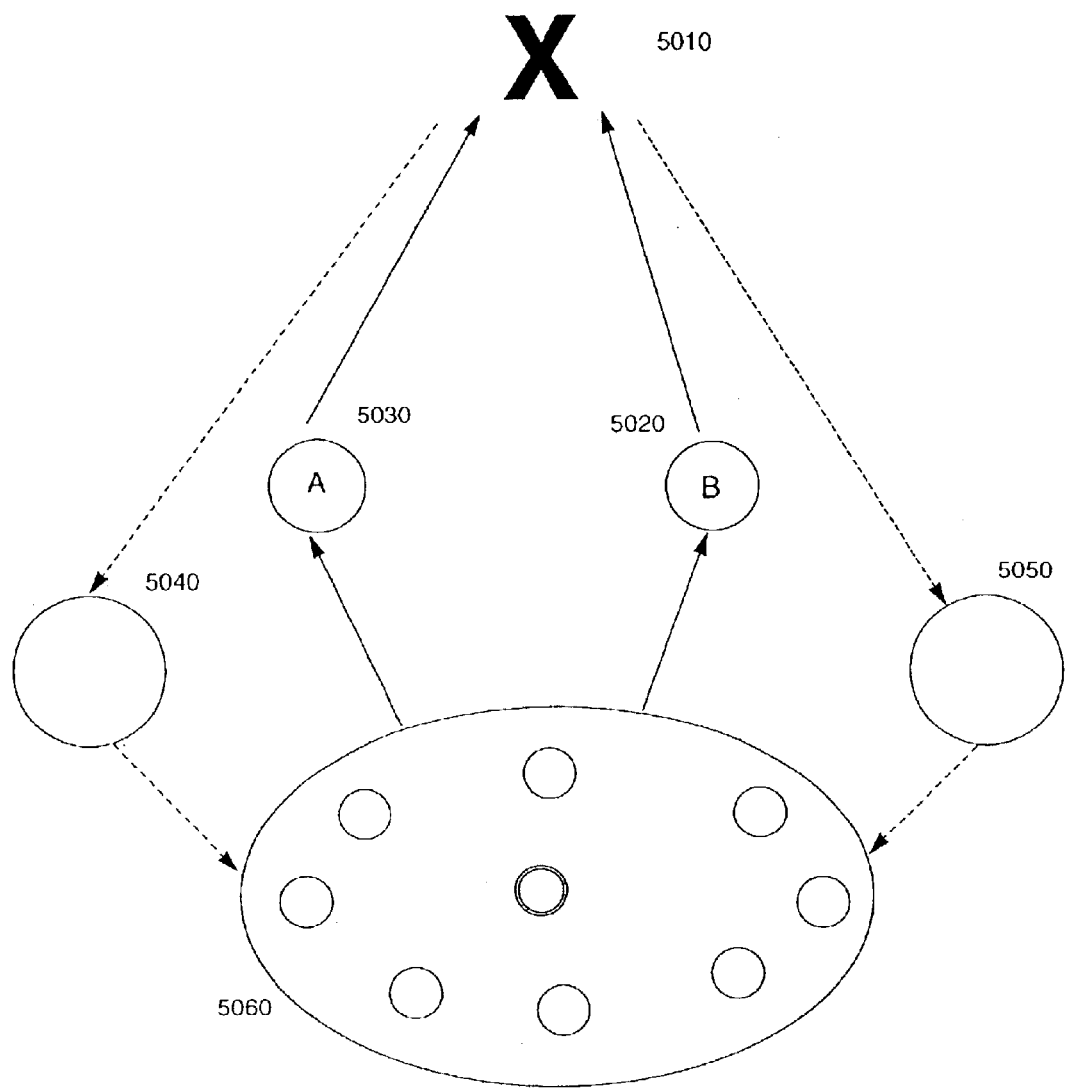
A & B MRVs sensor data transmitted to
later waves of squads Fig 51: MRV Dynamics 2: Multiple Wave Regrouping
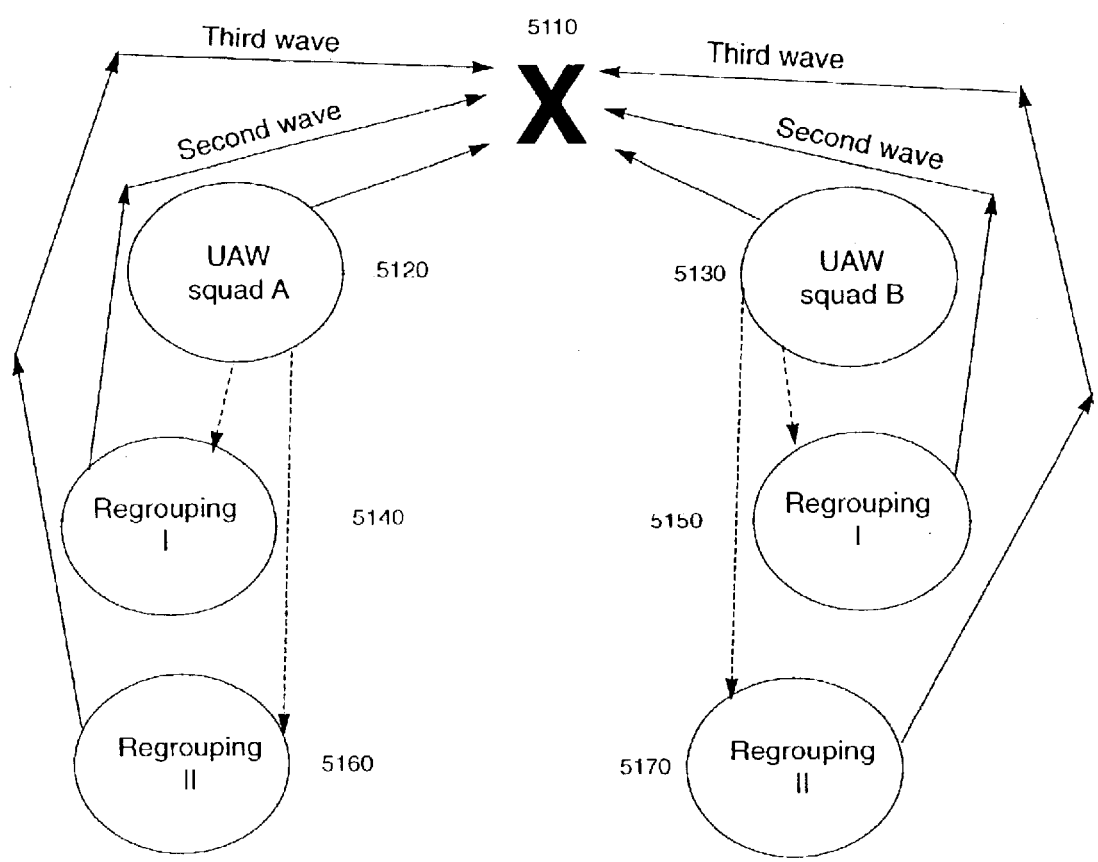

Fig 52: MRV Dynamics 3: Squads Anticipate & Strike Mobile Enemy
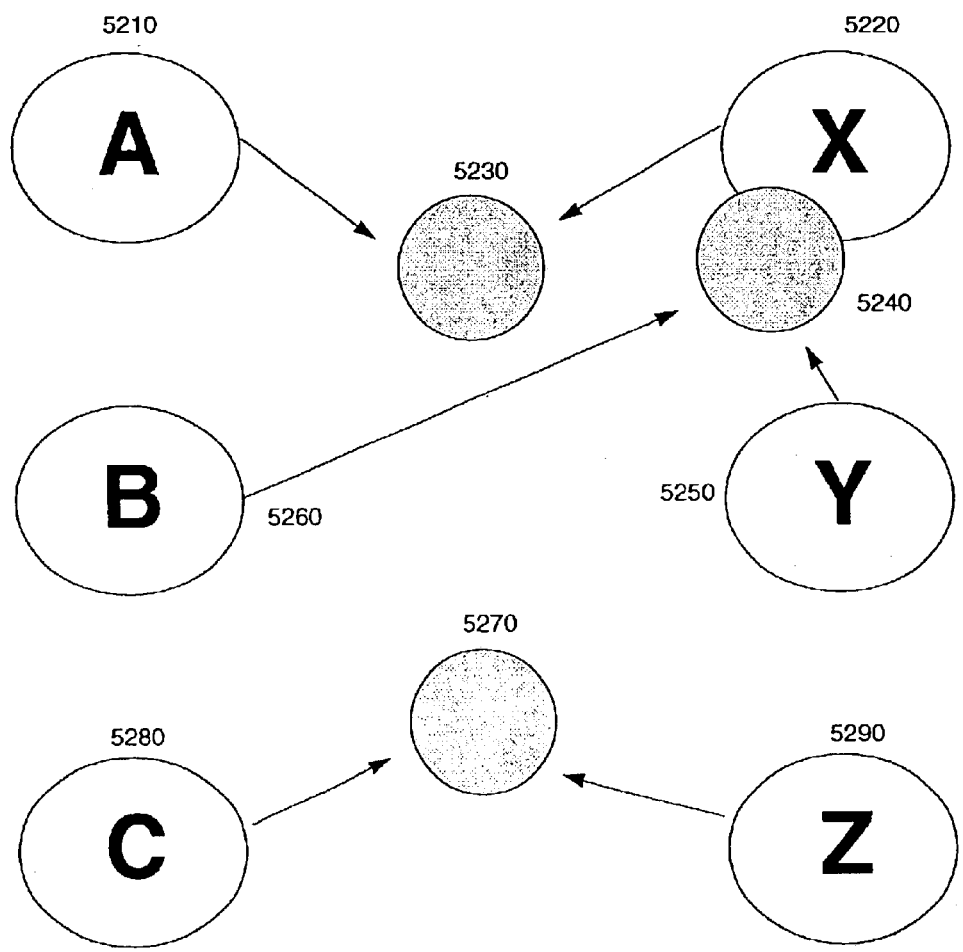

Fig 53: MRV Dynamics 4: Complex Dynamics With MRV Squad Reconstitution, Multiple Strikes & Mobile Enemy Counterattacks
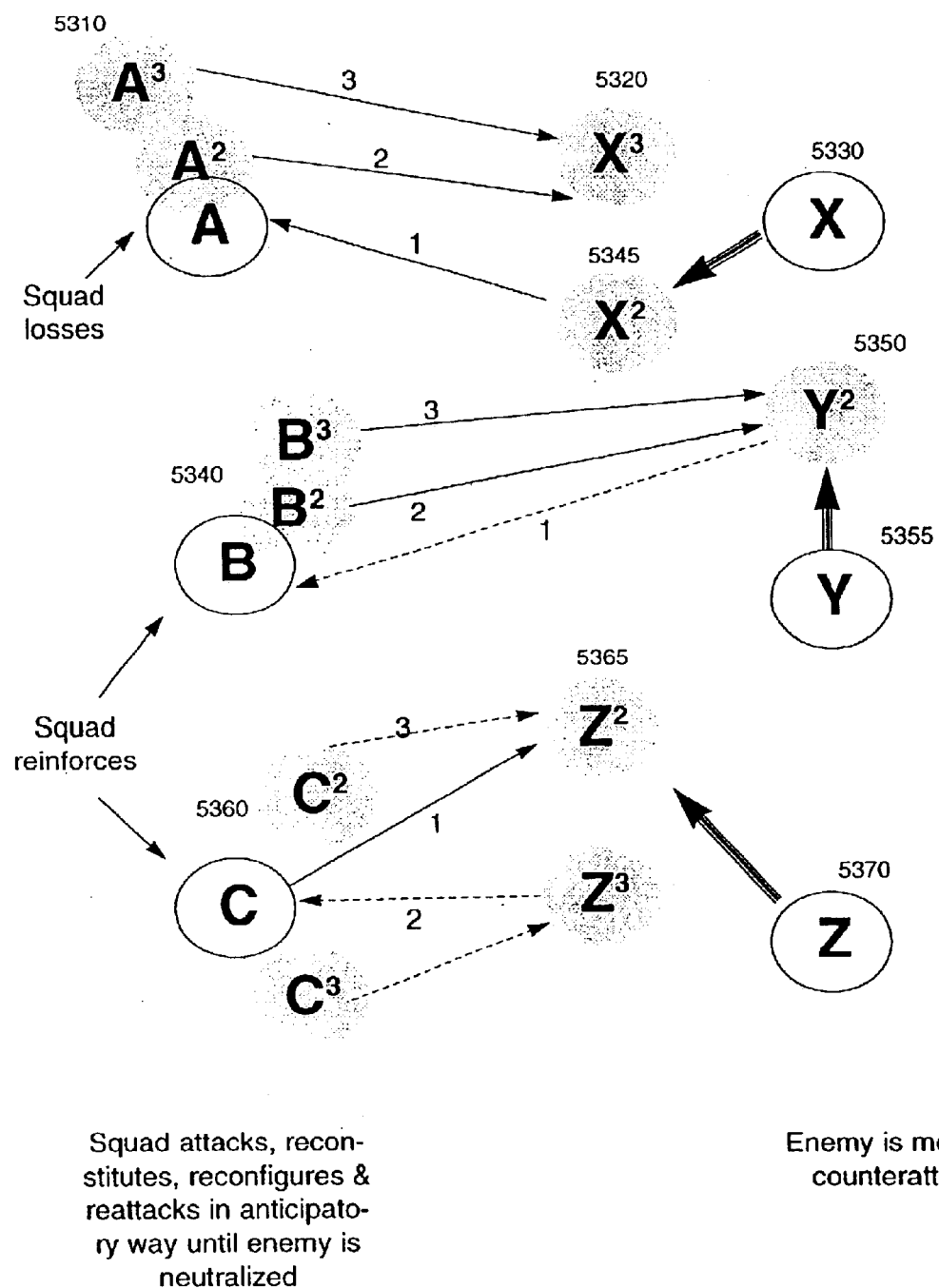
Squad attacks, reconstitutes, reconfigures & reattacks in anticipatory way until enemy is neutralized
Enemy is mobile & counterattacks Fig 54: MRVs that launch micro-MRVs
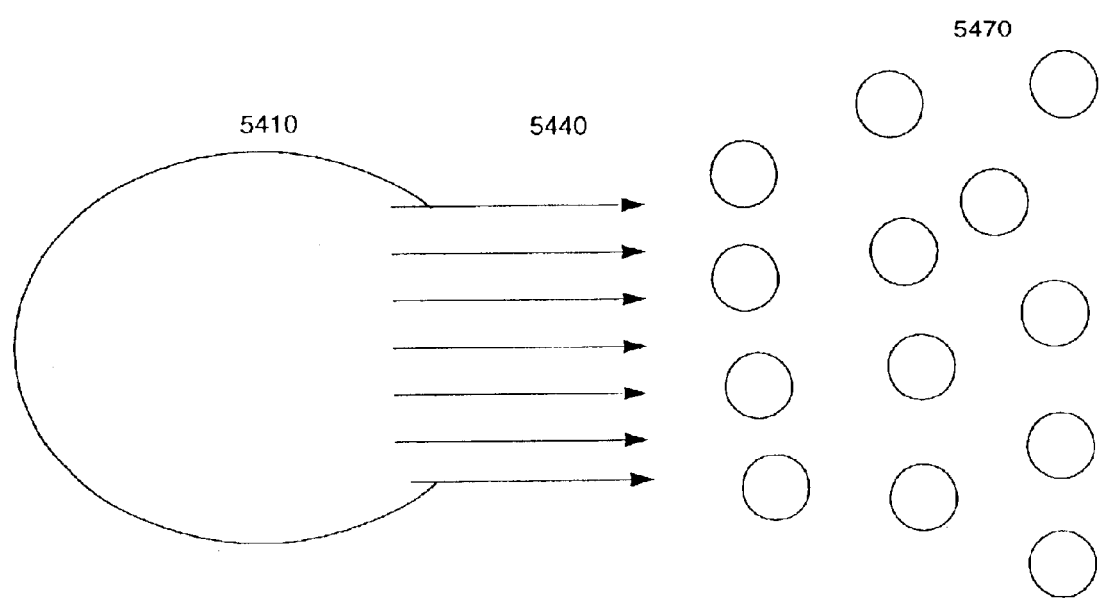

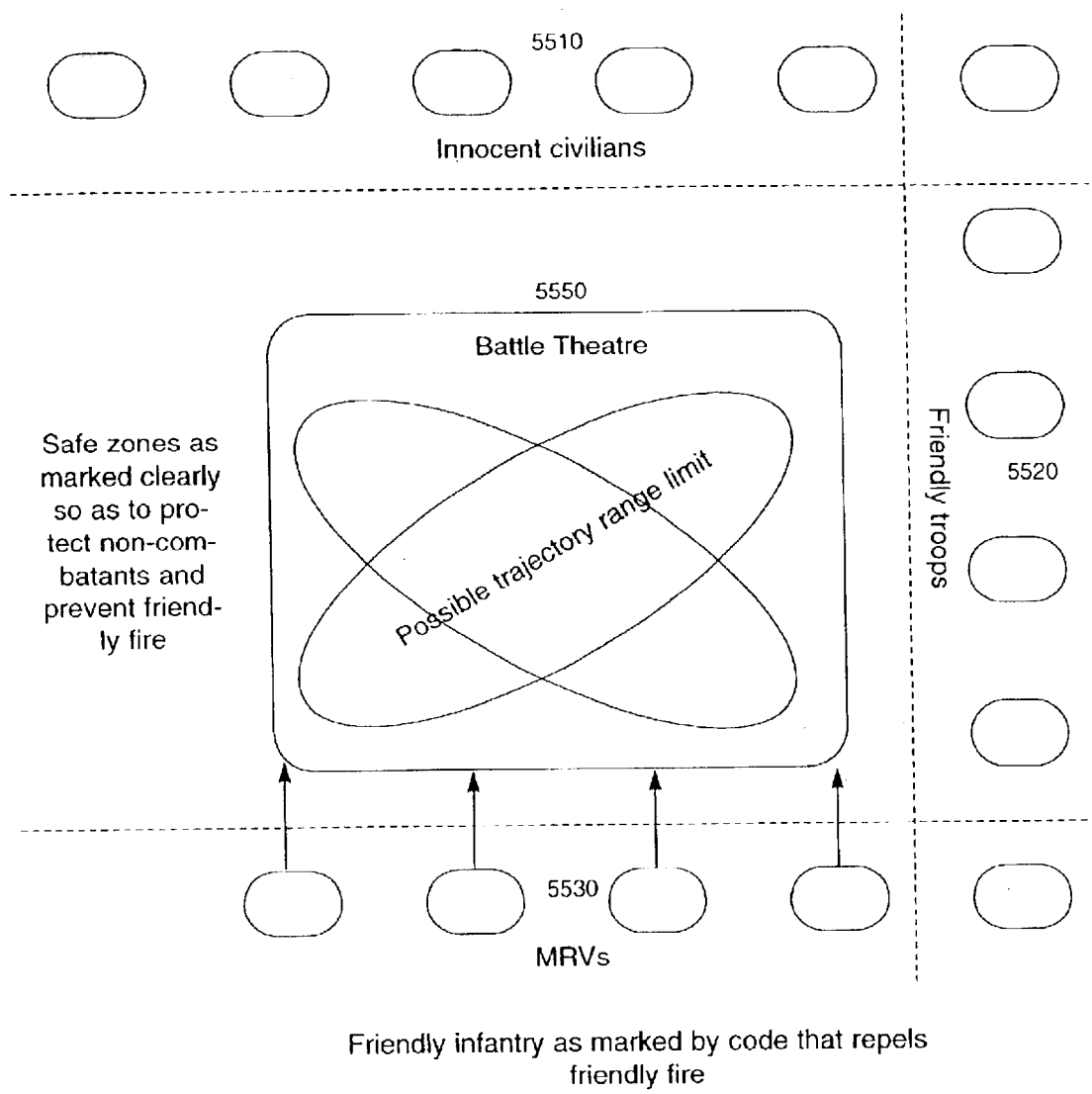
Fig 55: Recognition Capability to Identify & Protect Noncombatants

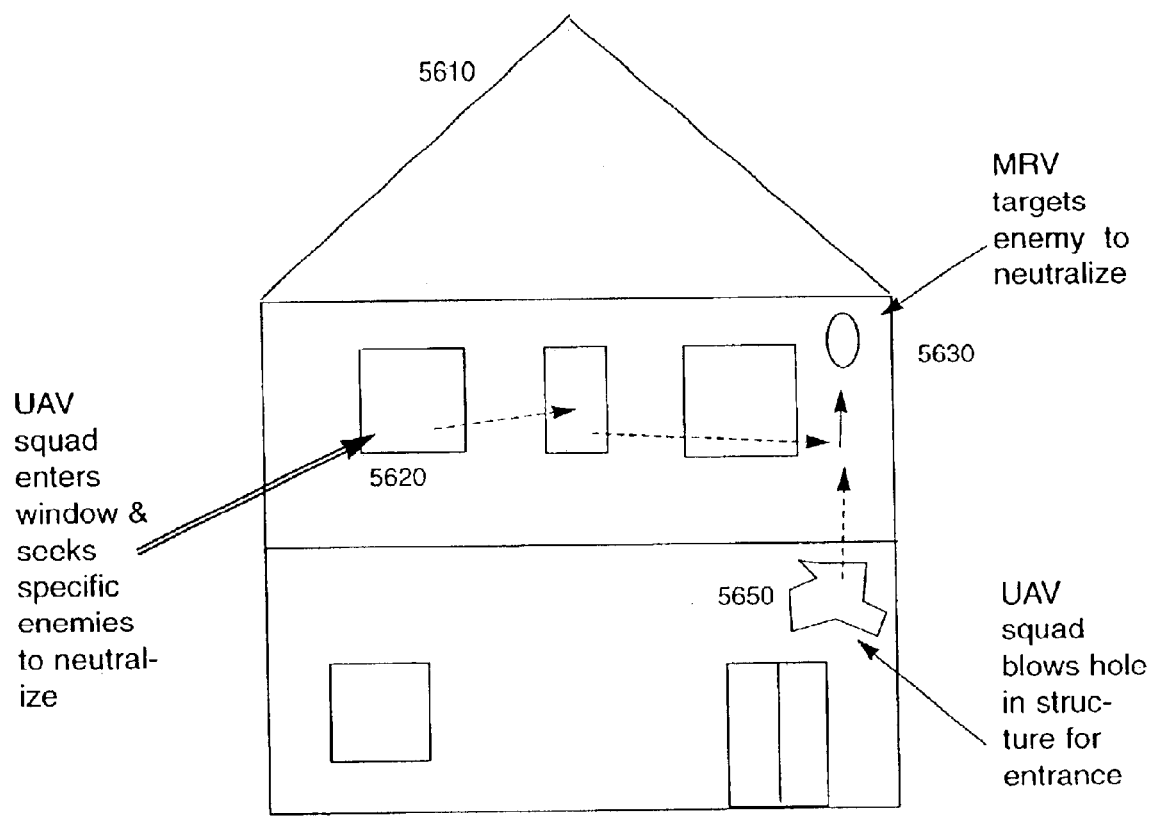
Fig 56: Structure Penetration - House

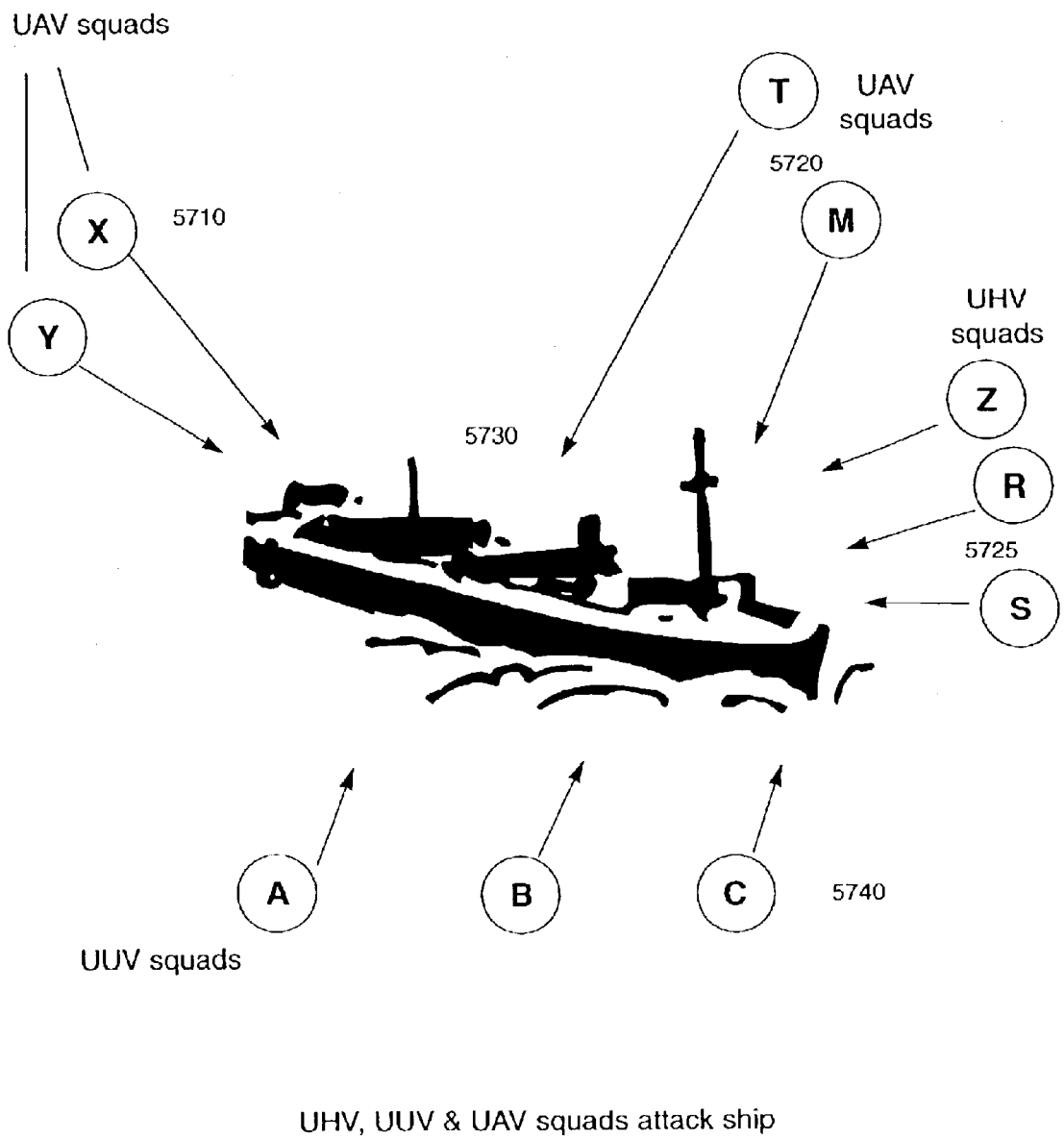
Fig 57: Structure Penetration - Ship
UHV, UUV & UAV squads attack ship

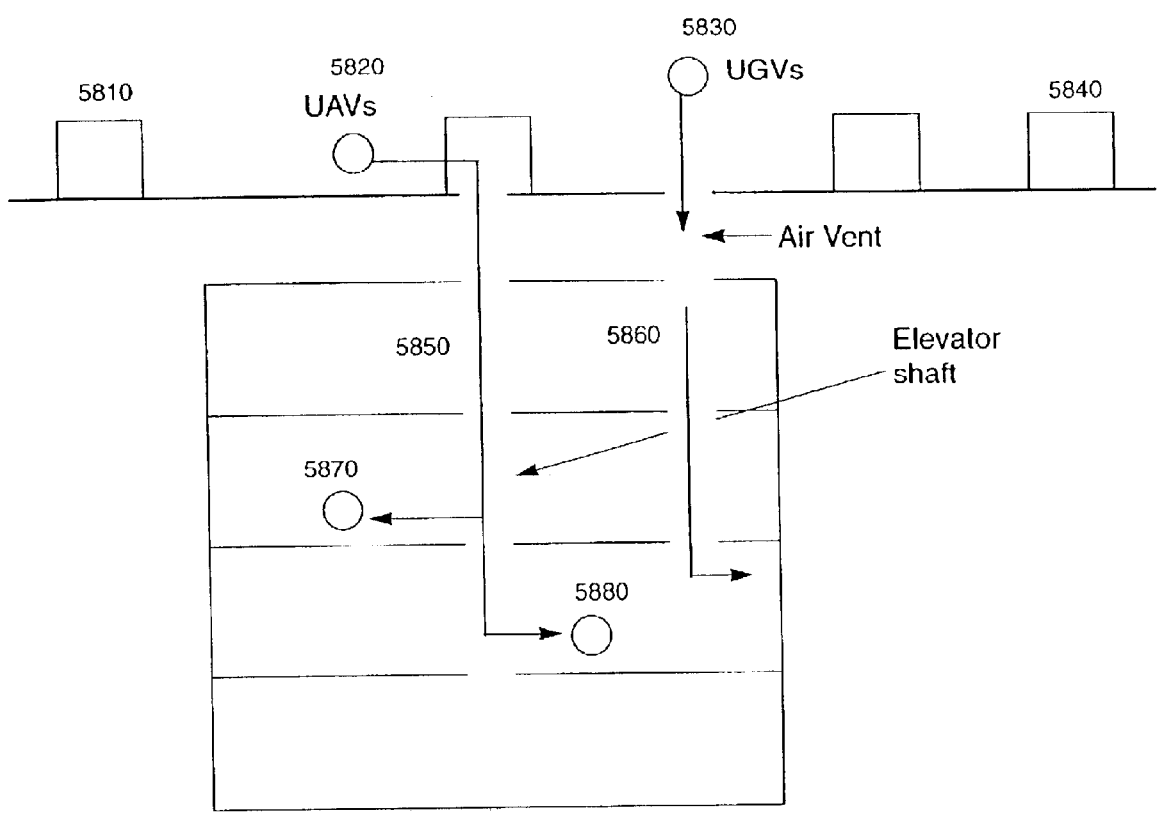
Fig 58: Structure Penetration - Underground Facility

Fig 59: Wolf Pack Dynamics
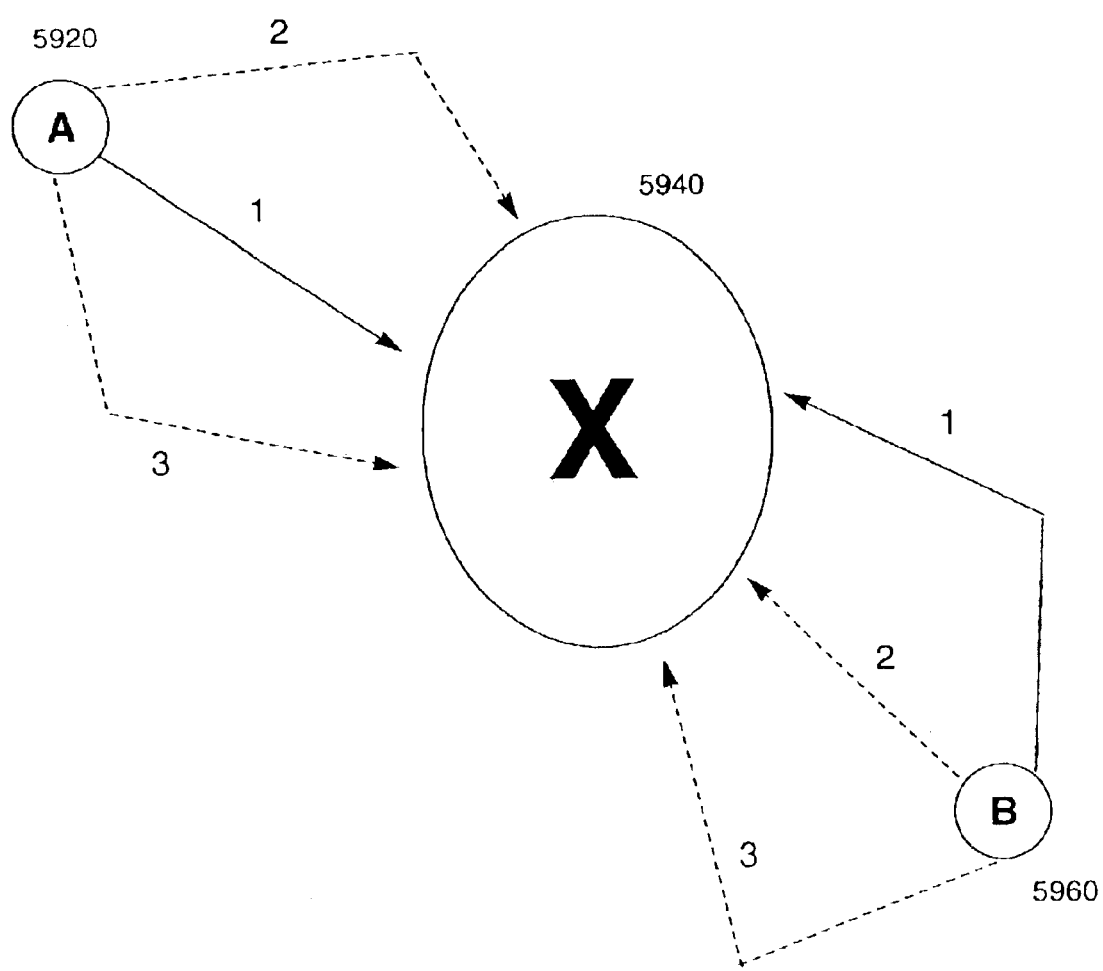

Fig 60: Alternating Attack Sequence
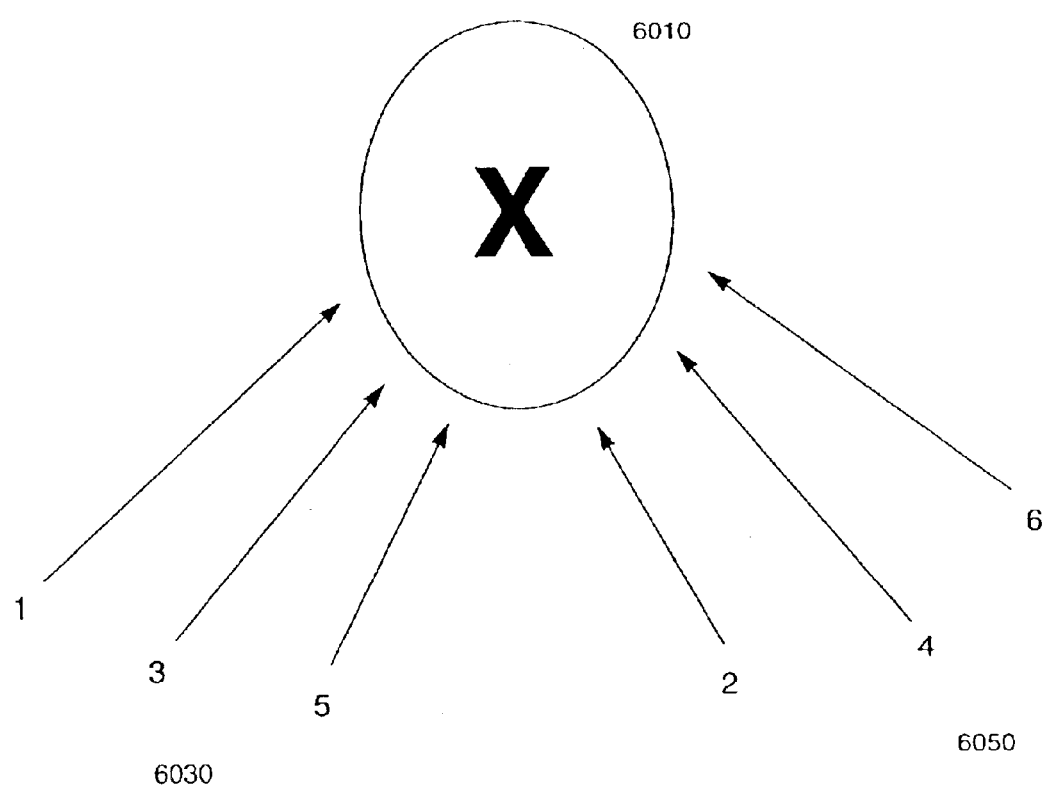

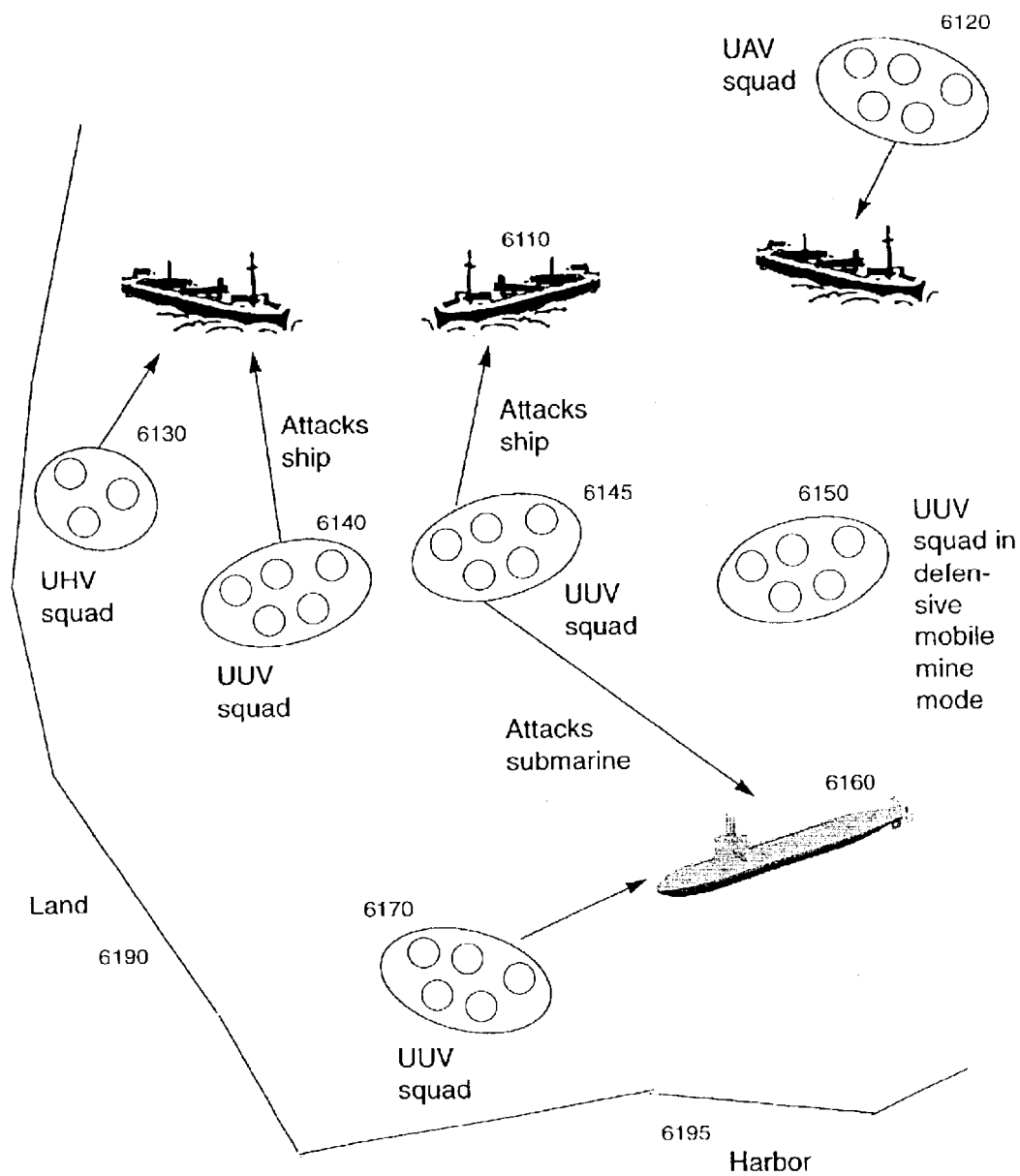
Fig 61: Joint Sea Assault:
Coordinating Air, Ground & Underwater Swarms

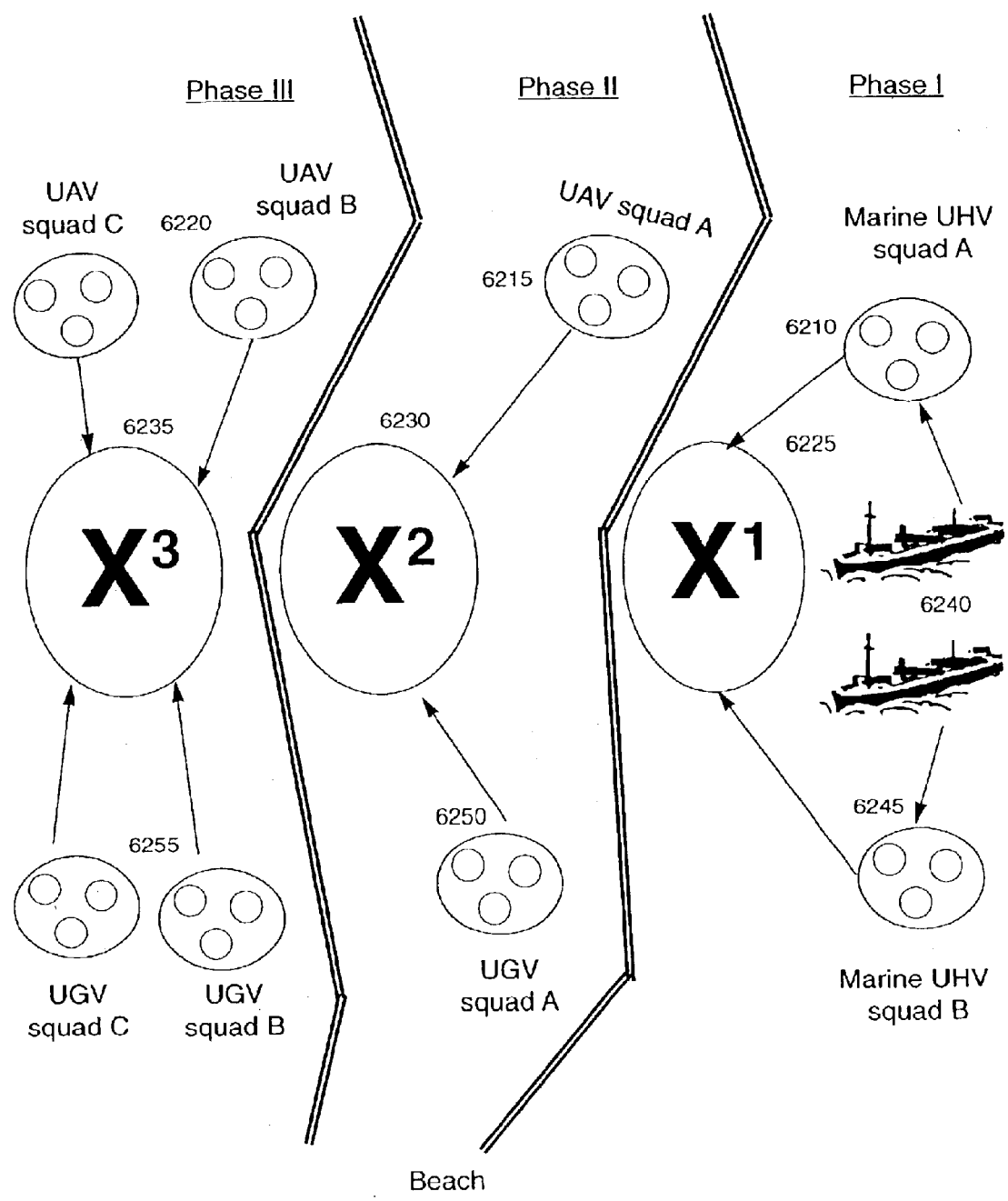
Fig 62: Joint Land Assault: Traps with Swarm Combinations

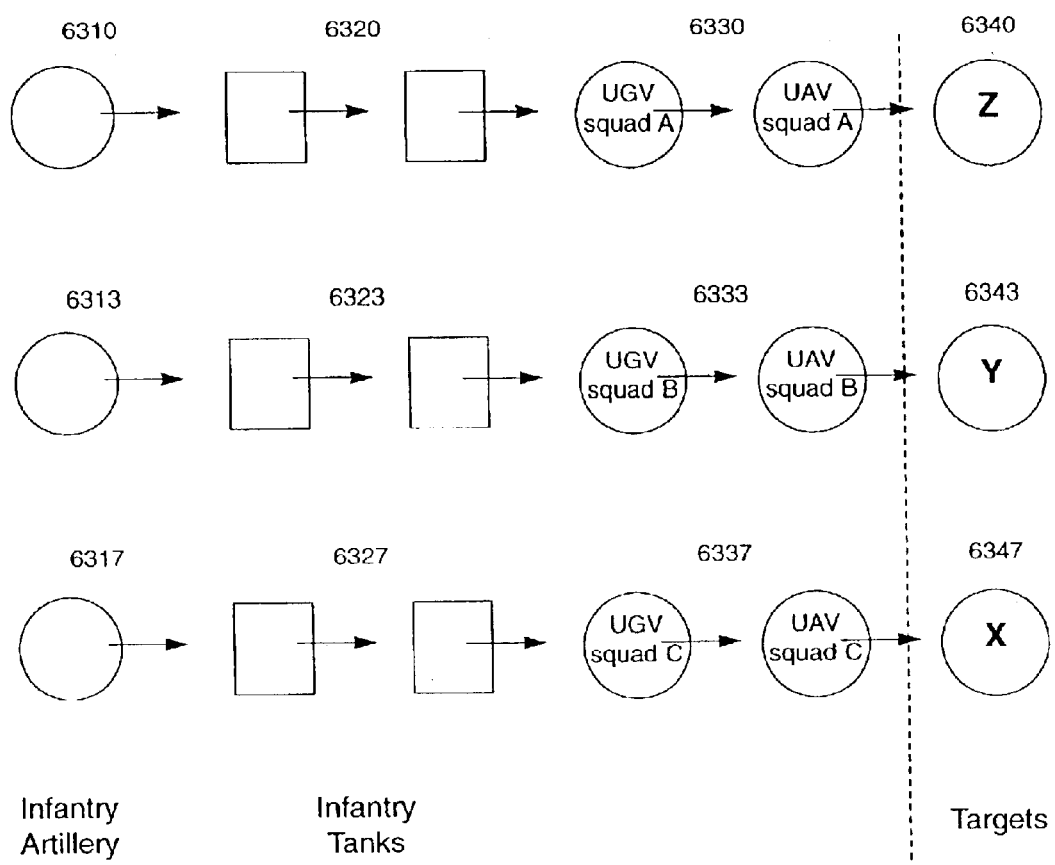
Fig 63: Joint Battle Operations - MRV Squads Providing Advance Cover For Infantry

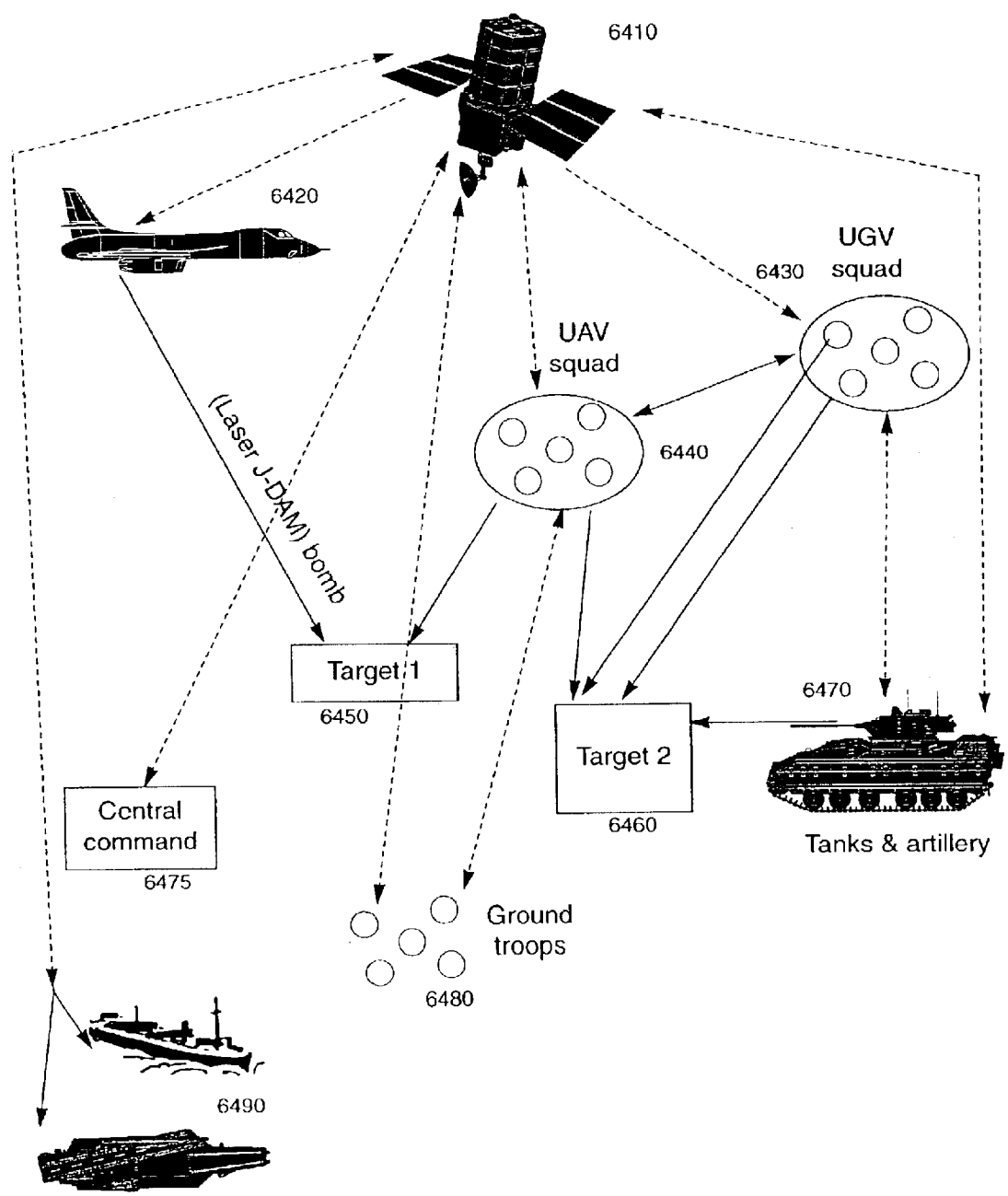
Fig 64: Joint Interoperable Integration of Swarm & Future Combat System (FCS)

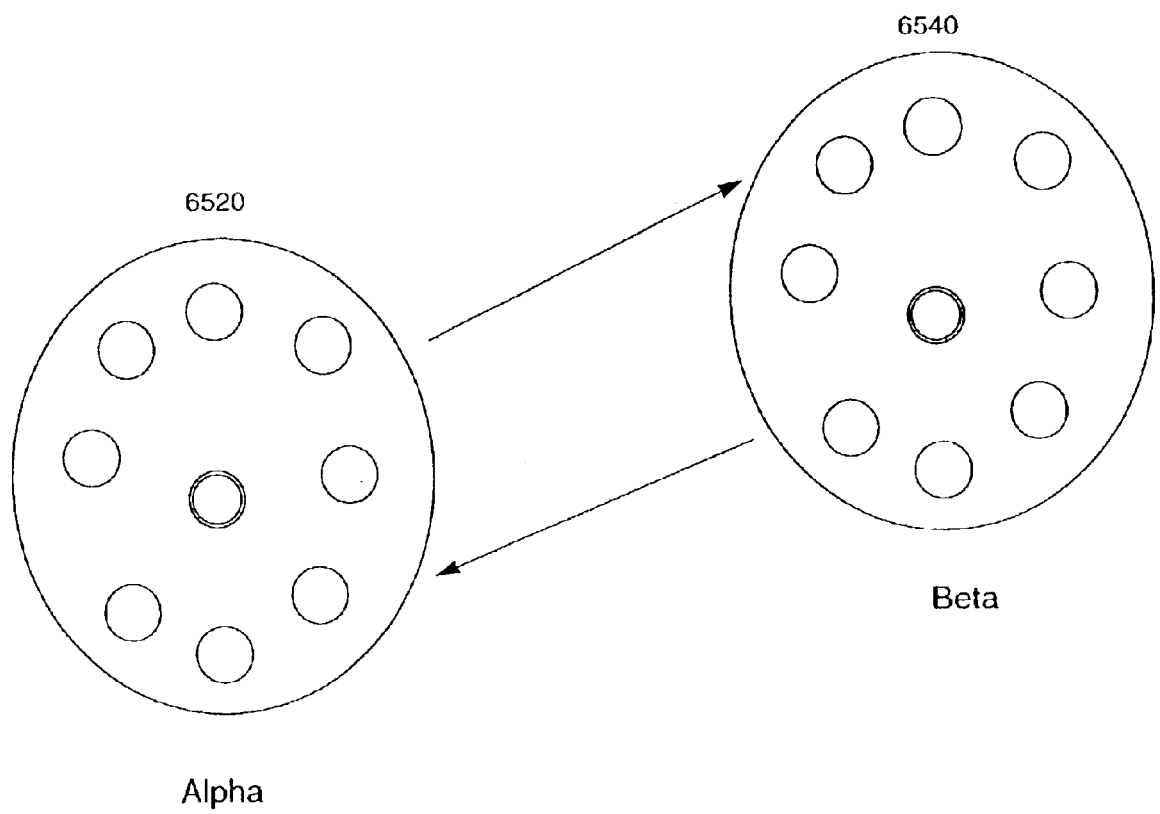
Fig 65: Initiation of Dynamic Multi-lateral Interaction of Swarms in Tactical Dogfight Fig 66: Dynamic Tactical Combat Between Robotic Systems: Inter-MRV Multilateral Mobile Combat
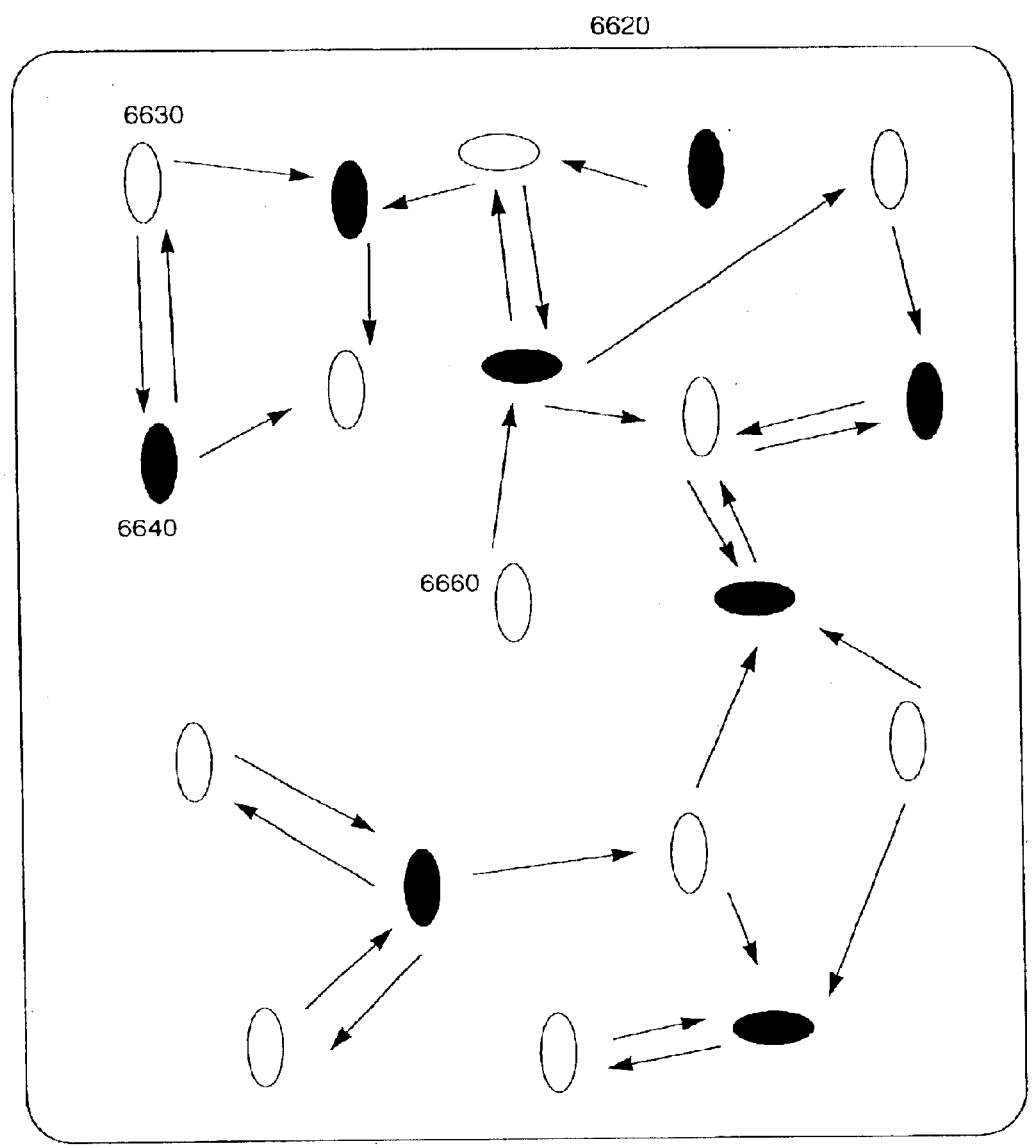
Tactical Battle Space

Fig 67: Evasive Swarm Maneuvers
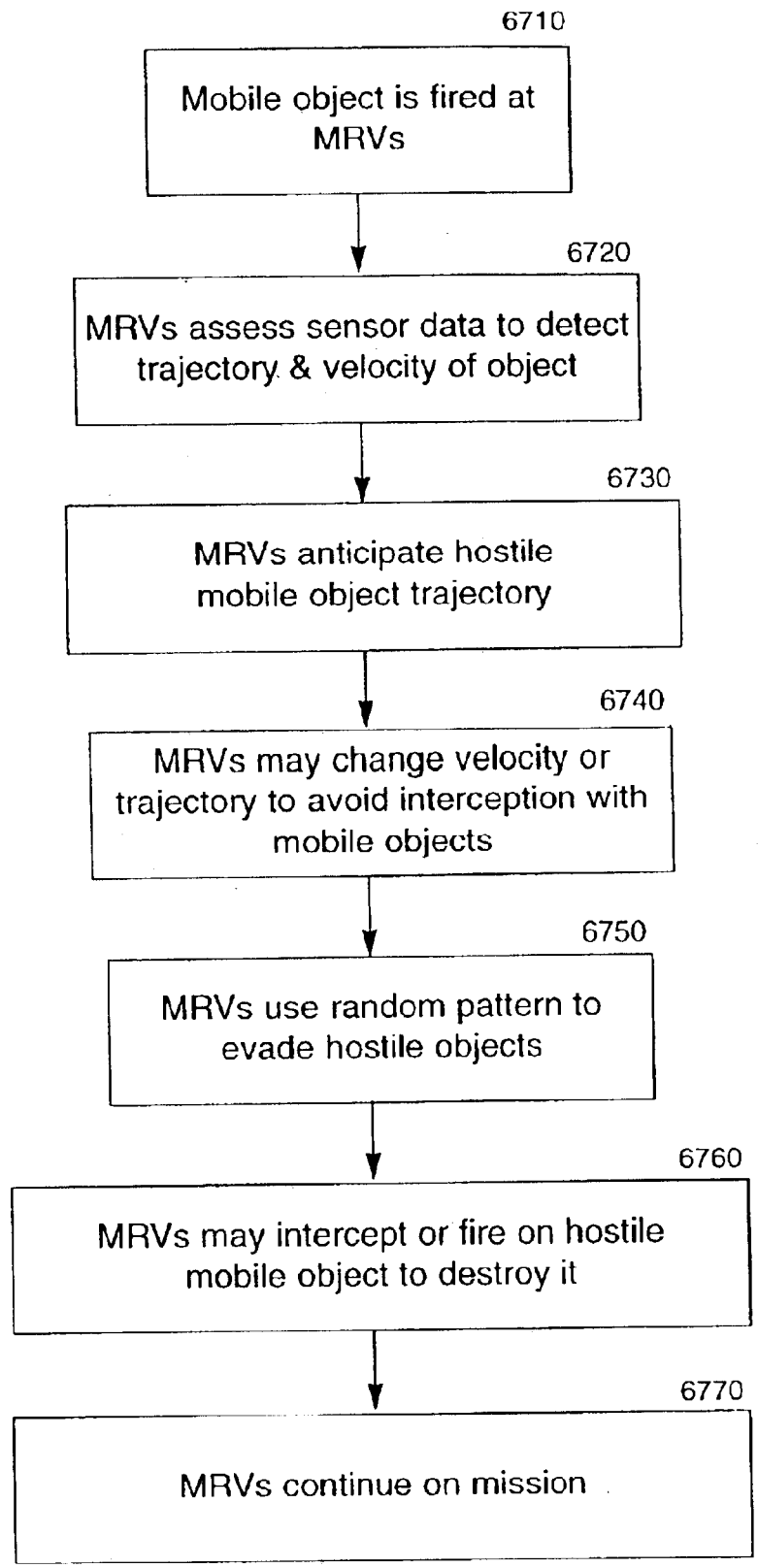

Fig 68: Taxonomy of Weapon Hardware System Categories

| System Size | UAV | UGV | UUV | UHV | Misc. |
|---|---|---|---|---|---|
| Medium | Mini-Helicopter (6') | Mid size tanks | Mini-Subs | Mini-Hovercraft | Satellite |
|  | Mid-size planes (motorized) (Predator UAV) Mid-size jets |  | Mini-Sea Mines |  | Ship |
| Small | Small Helicopters (3') (Berkeley UAV) | Small Tanks | Small Subs | Small Hovercraft | Burrowing Devices |
| Micro | Bird Sized Helicopters (Micro air vehicles) | Insect Size |  | Mouse Sized Hovercraft |  |
| Nano |  | Ant-Size |  |  |  |

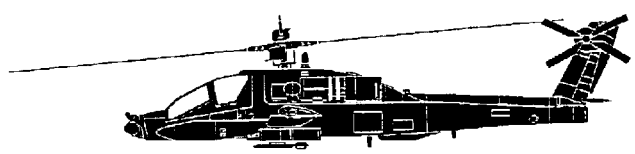

Fig 69: Swarm Battle Recirculation Process
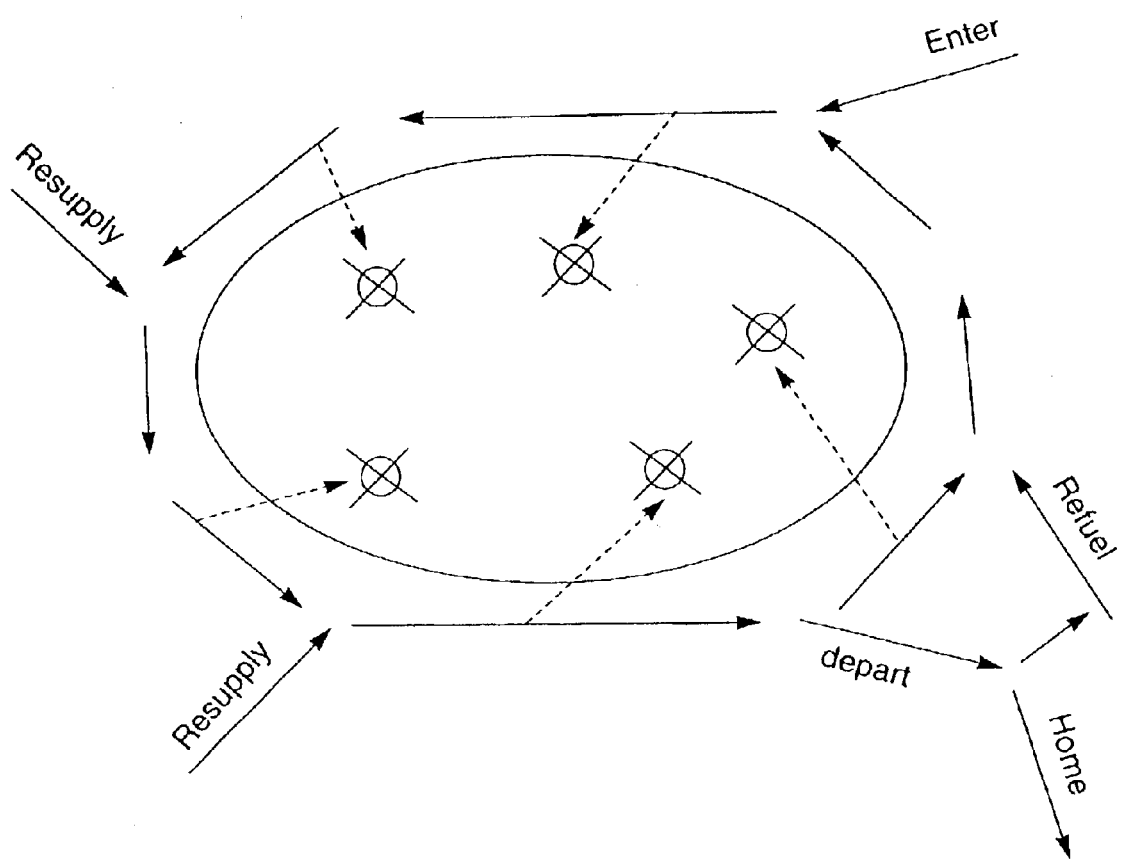

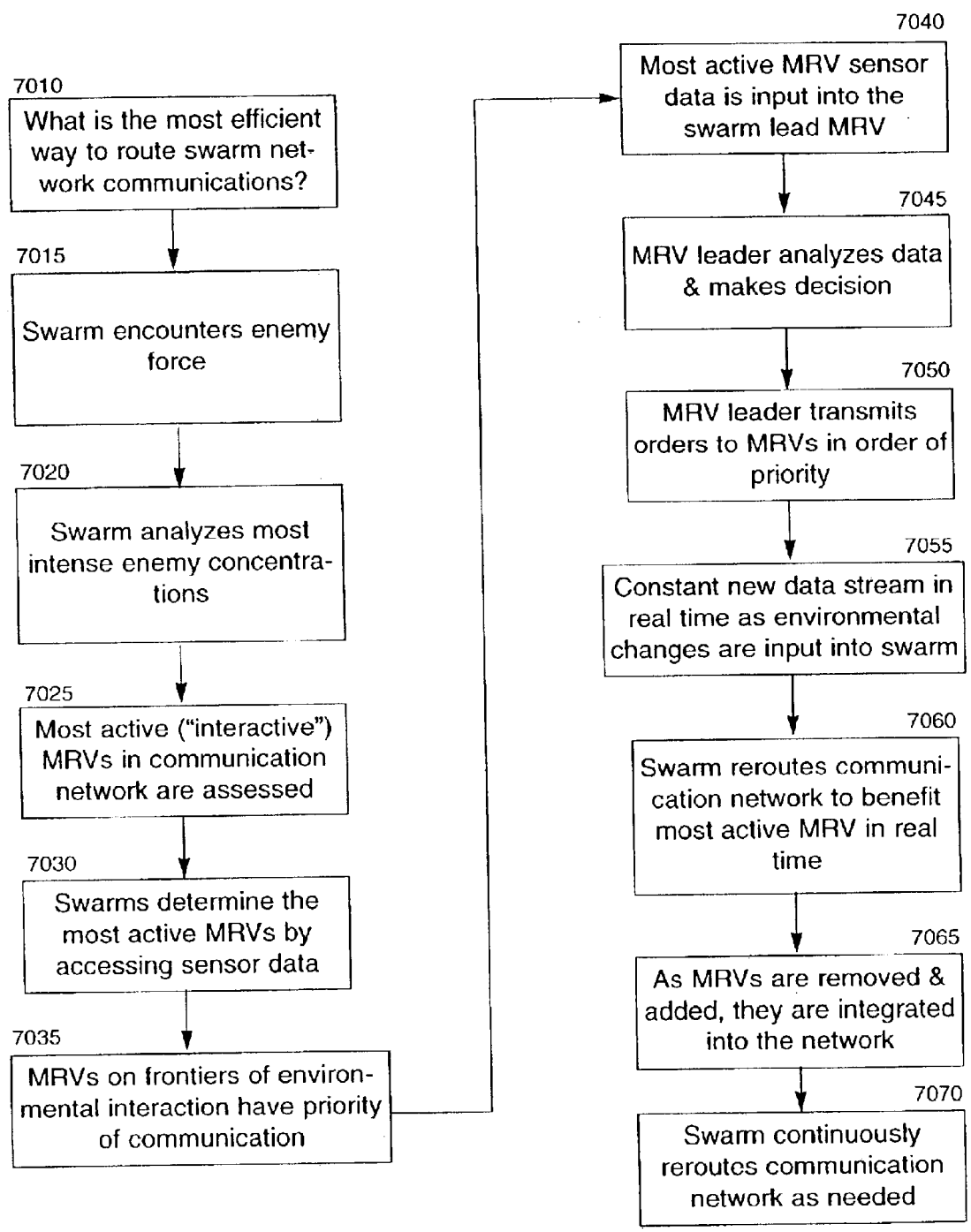
Fig 70: Dynamic Communications Network Rerouting to Most Efficient Route Fig 71: Most Efficient Allocation of Resources
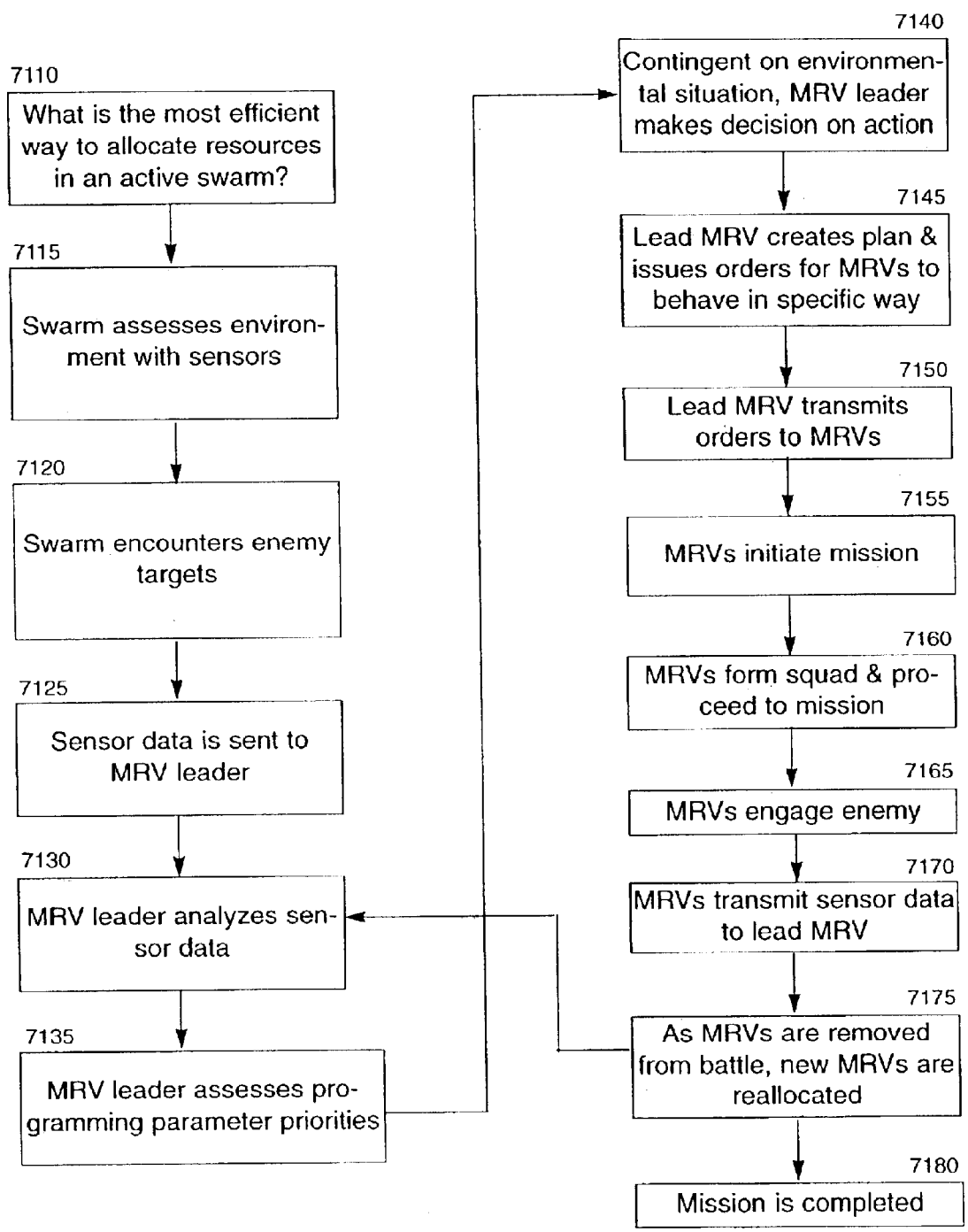

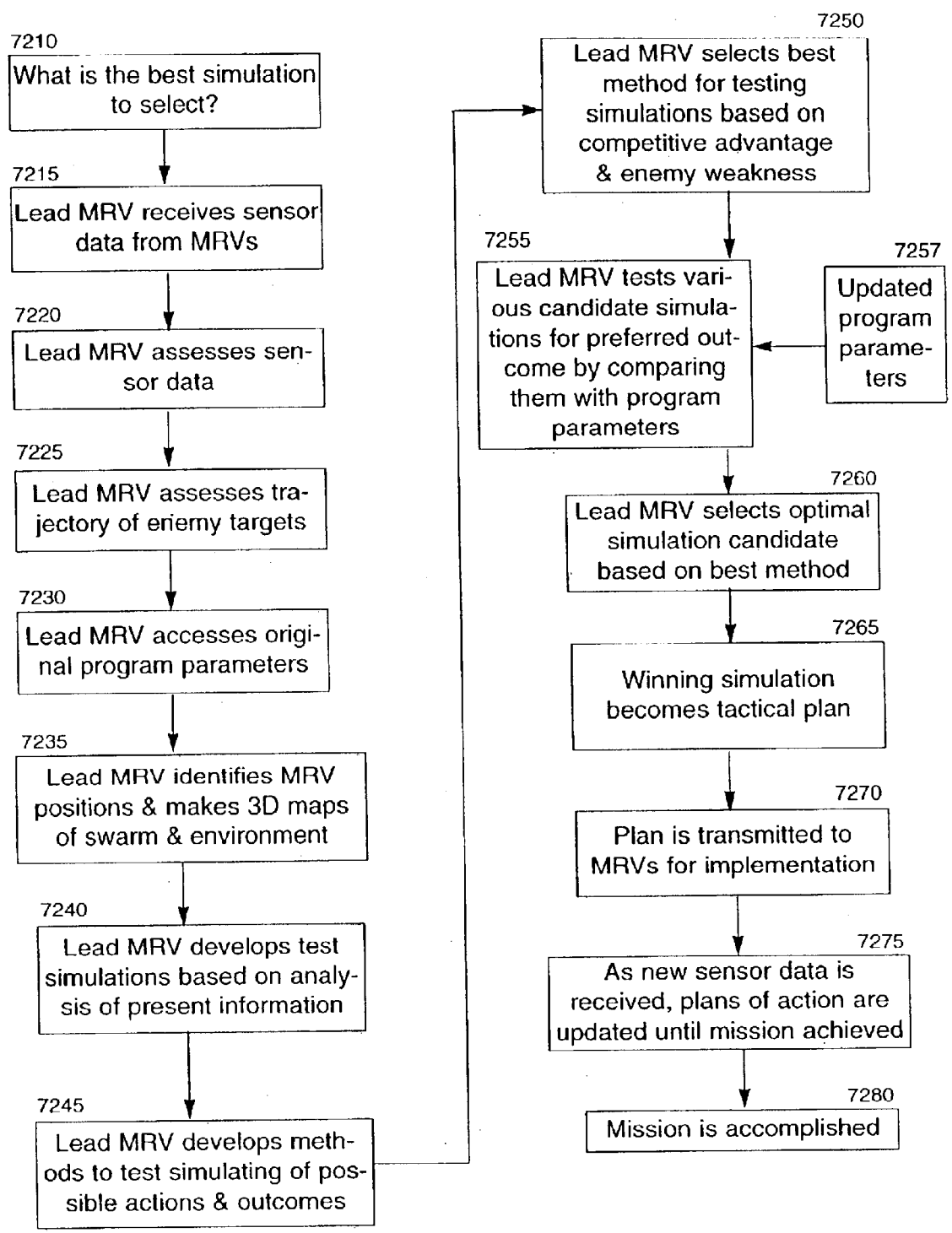
Fig 72: Winner Determination of Simulations

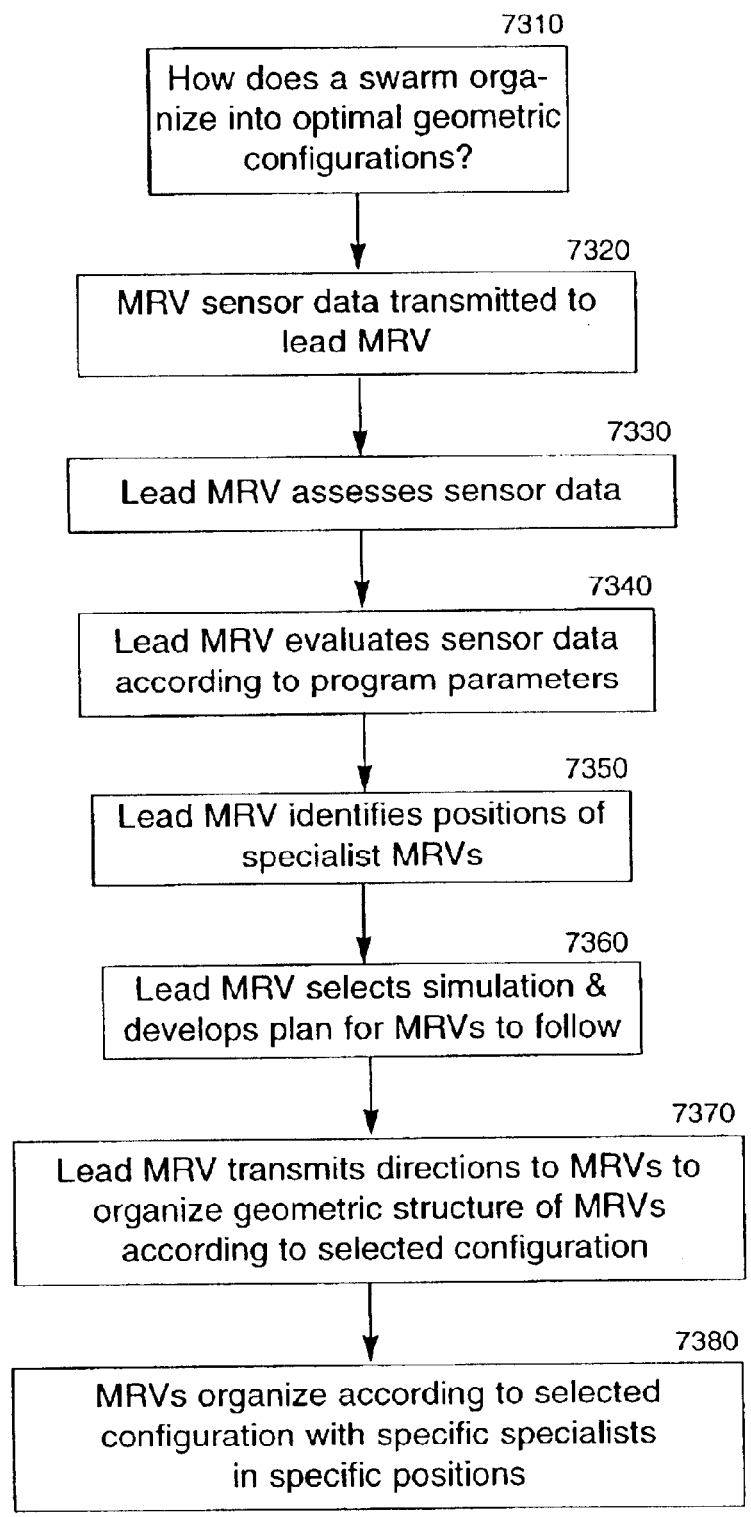
Fig 73: Dynamic Geometric Configuration of Groupings

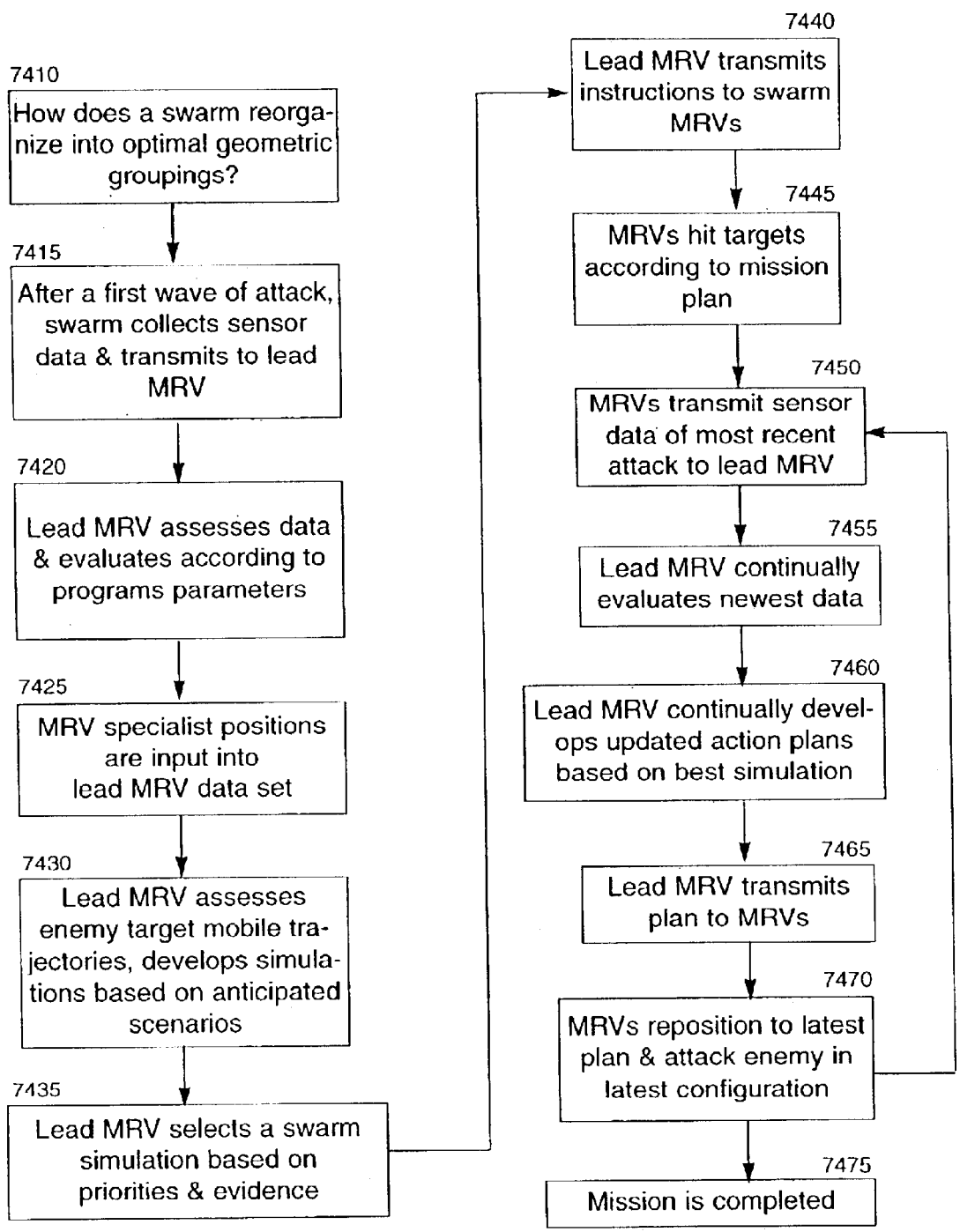
Fig 74: Optimal Geometric Configuration of Regroupings (Reconfigurations)

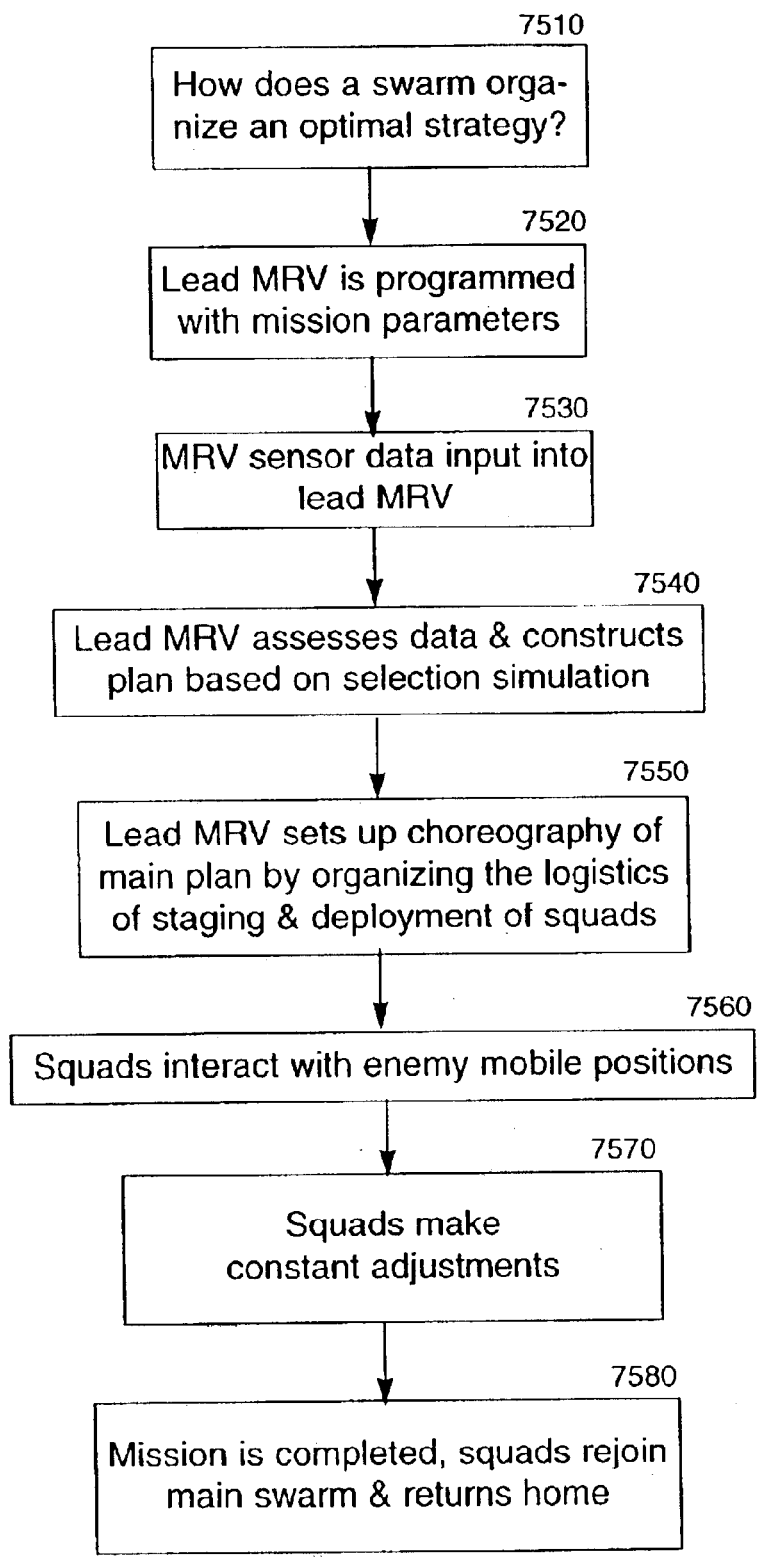
Fig 75: Optimal Strategy For Overall Swarm Level Attack

Fig 76: Optimal Tactical Sequence
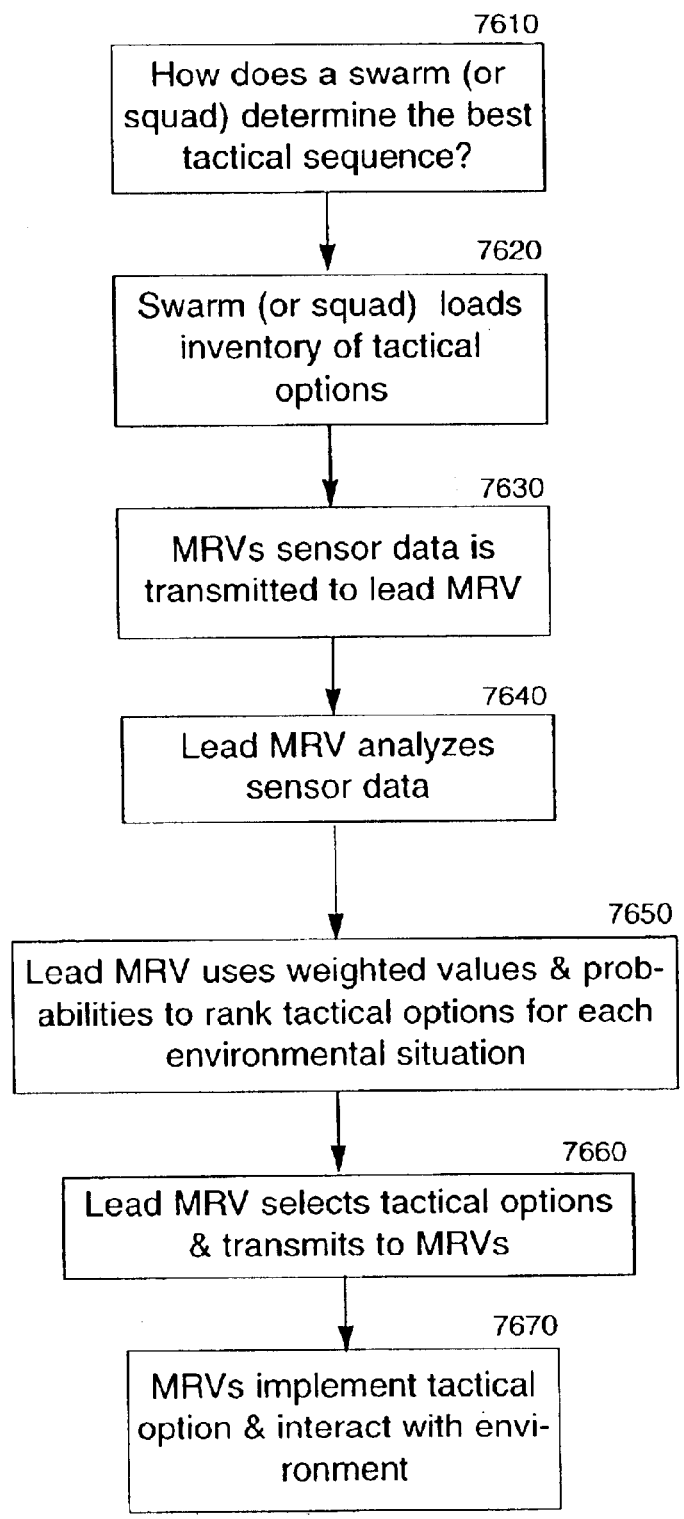

Fig 77: Tactical Option Typology

Attack one stationary position

Attack two or more stationary posting

Attack mobile positions

Waves of attacks

Alternating waves of attacks

Packing behavior (switching & competing behavior)

Outflank & surround positions

Combined attacks

Supporting other weapon systems

Deceptive tactics
- baiting enemy
- camouflage

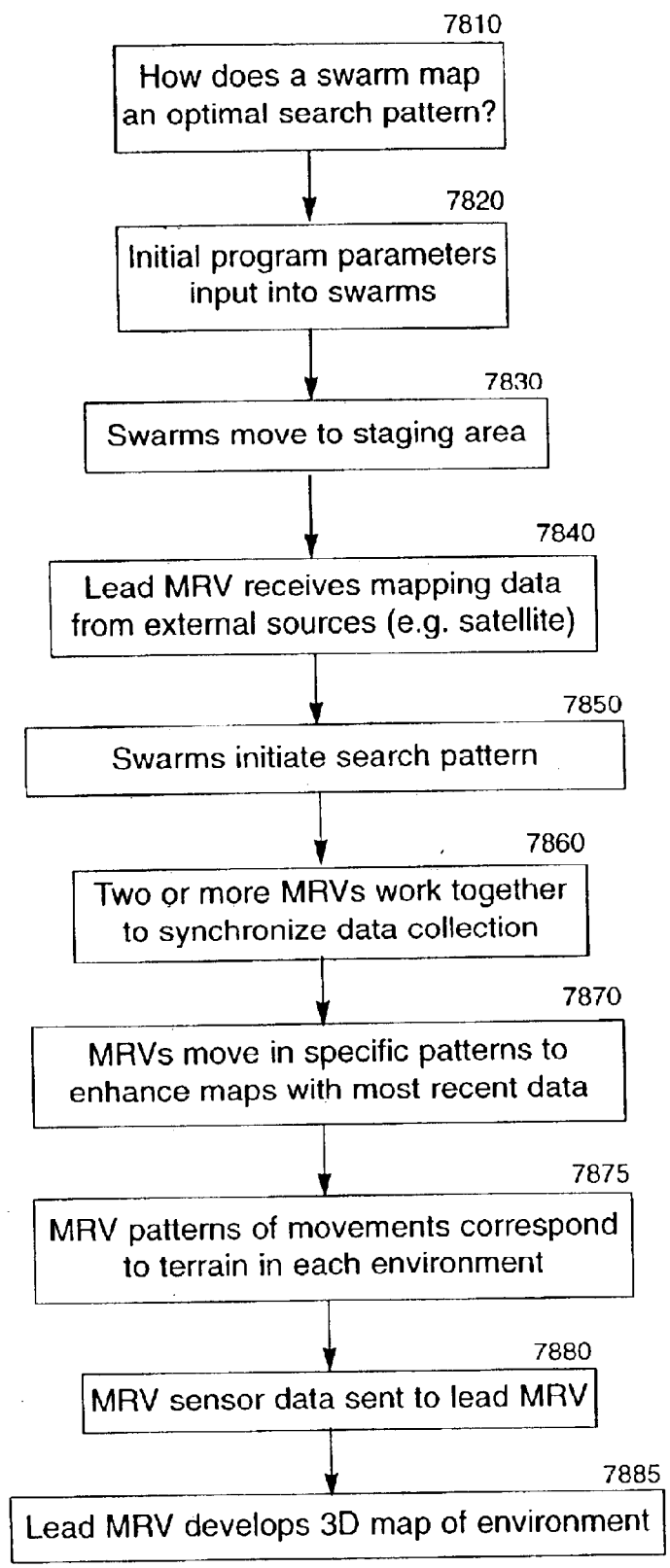
Fig 78: Optimal Search Pattern

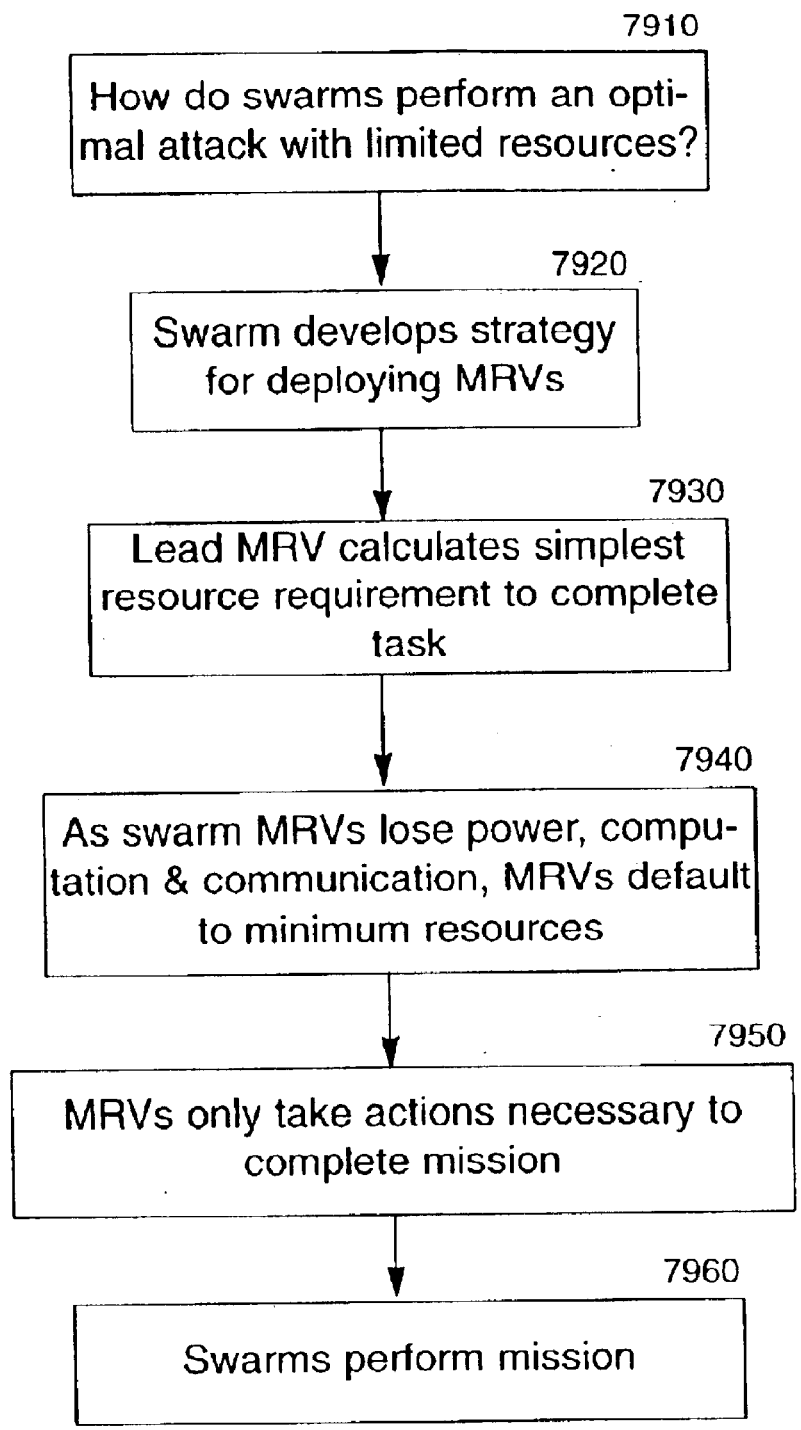
Fig 79: Optimal Attacks With Resource Constraints

Fig 80: Optimal Attack with Information Constraints
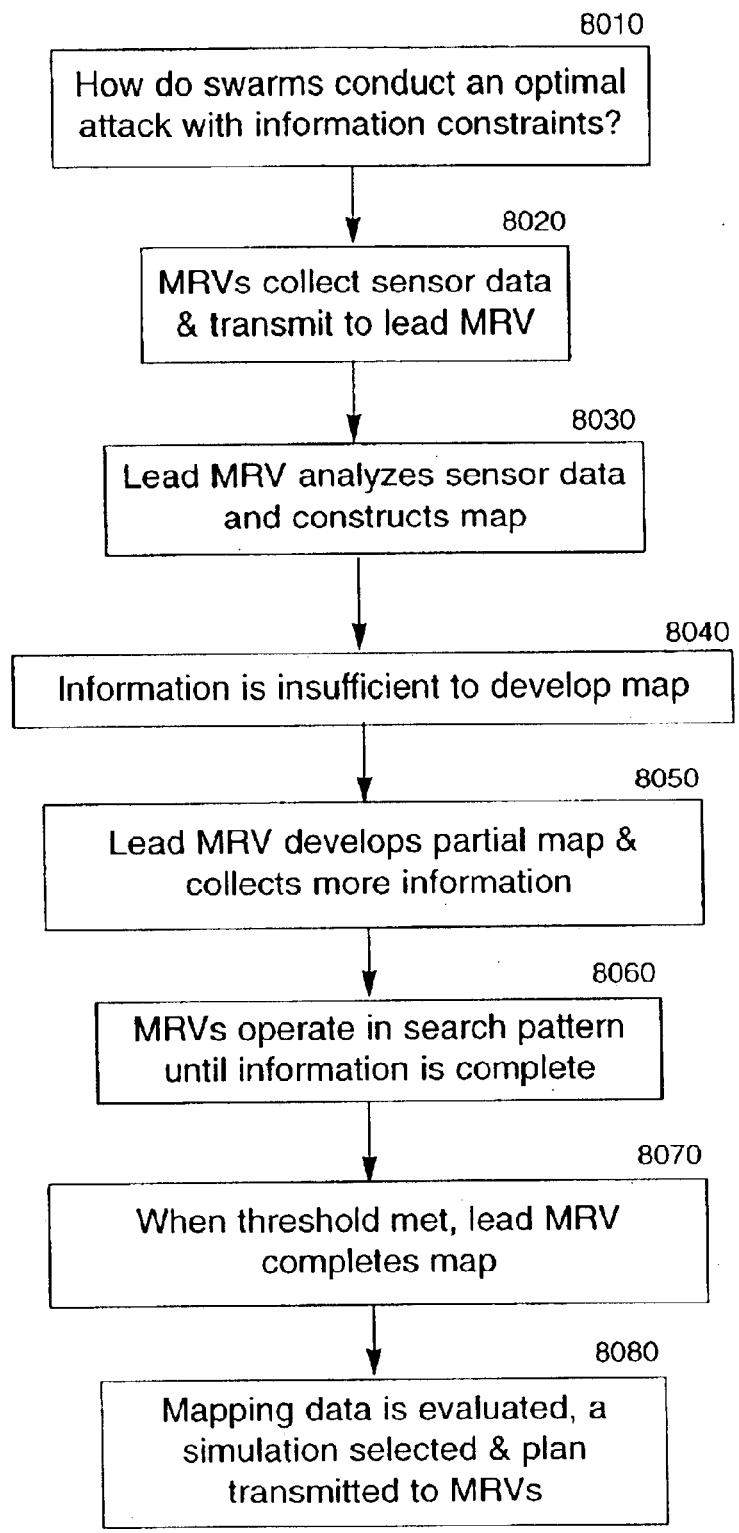

Fig 81: Inter-MRV Conflict Resolution
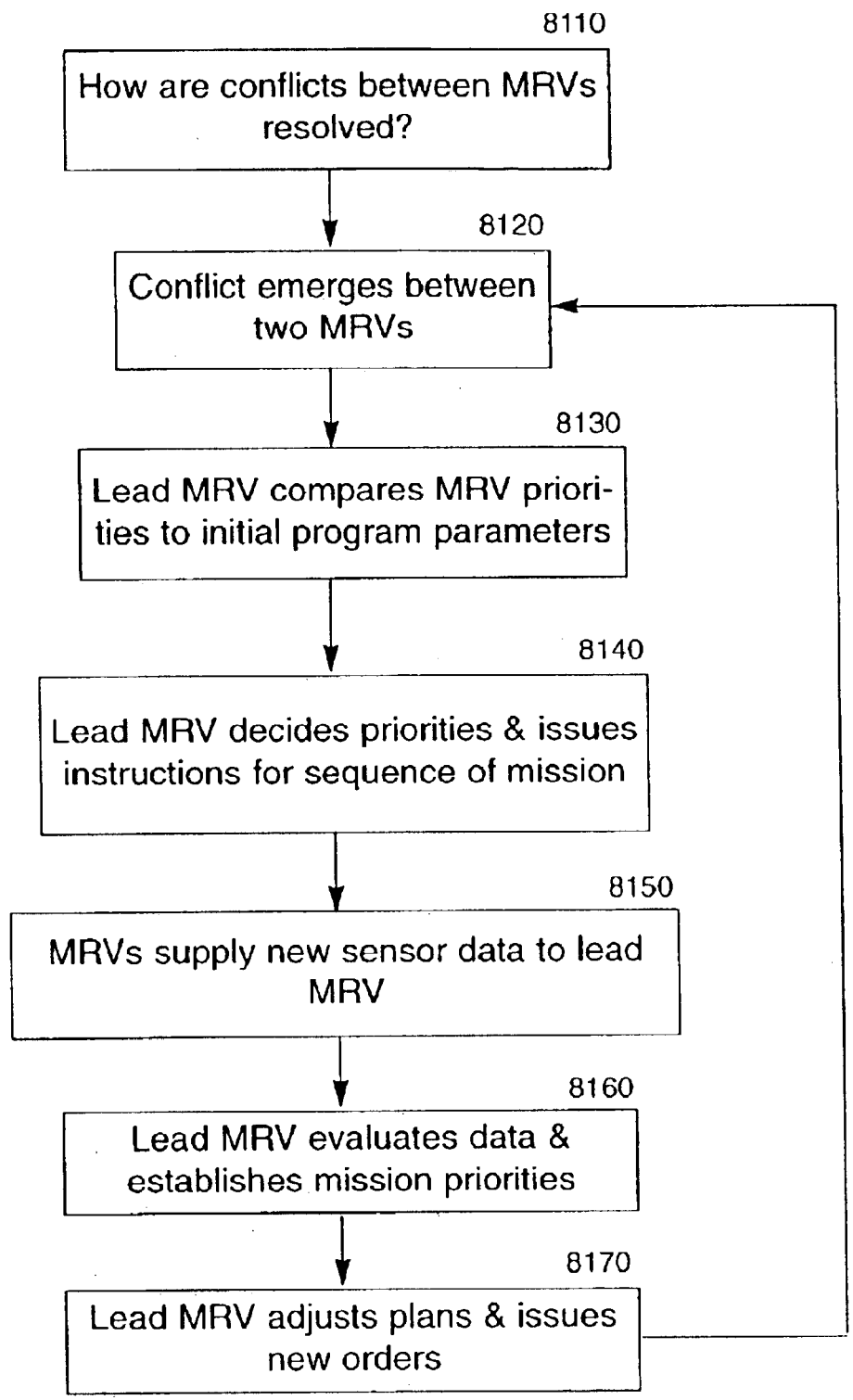

METHODS AND APPARATUS FOR DECISION MAKING OF SYSTEM OF MOBILE ROBOTIC VEHICLES

CROSS-REFERENCES TO RELATED APPLICATIONS

The present application claims the benefit of priority under 35 U.S.C. § 119 from U.S. Provisional Patent Application Ser. Nos. 60/374,421, filed Apr. 22, 2002, 60/404,945 and 60/404,946, both filed Aug. 21, 2002 the disclosures of which are hereby incorporated by reference in their entirety for all purposes.

BACKGROUND OF THE INVENTION

The U.S. Military has several fundamental strategic problems. First, the Army, Navy, Marines and Air Force have very large tactical systems and very small arms systems, on either extreme of the tactical spectrum, but hardly any weapon system in the middle sphere. Second, there is a great need to figure out how to develop automated tactical weapons systems that are powerful, effective, cost-effective and minimize casualties to our military personnel and to friendly noncombatants. Finally, the problem exists of how to organize and coordinate automated weapons to work in a coherent integrated systems structure. The swarm weapon system is intended to address these important challenges.

One of the most extraordinary revolutions in advanced warfare in the last generation consists in the increasing automation of weapons systems. From Vietnam to the Gulf War and from Kosovo to Afghanistan and Iraq, the U.S. military has continued to enhance and rely on automated systems. Such systems include pilotless drones, unmanned surveillance planes and robots as well as remotely launched missiles. The U.S. military is developing pilotless aircraft as well as micro air vehicles for surveillance. Such weapons and unmanned aircraft, which typically require high bandwidth satellite linkage, integrate well with current weapon systems to minimize casualties to our armed forces personnel at reduced cost relative to manned weapon systems and aircraft.

There is, however, a need for sophisticated, networked automated weapon systems that can be adaptive, self-organizing, cost-effective and high performance. Earlier weapons are relatively primitive and stand-alone. What is needed is a network systems approach to automated weapon systems that is both adaptive and interactive in real time.

The next generation of electronic warfare will be unmanned, network oriented and adaptive to the environment. The existence of self-organizing network systems of automated weapons will leverage a more limited group of military personnel and thereby immeasurably increase their warfare productivity. The use of groups of automated weapons in networks of varied weapon systems will provide a substantial force multiplier that will yield a clear sustainable competitive advantage on the battlefield. The use of such advanced technologies will provide "rapid decisive operations" for military forces that use them and defeat for those that do not. The use and implementation of these technologies give clear tactical advantages in the effects-based and collaborative military force of the future. Clearly, then, there is a need for unmanned automated weapon systems.

The U.S. military has developed several categories of unmanned vehicles for land, sea and air. The unmanned air vehicle (UAV), the unmanned ground vehicle (UGV) and the unmanned underwater vehicle (UUV) are used by the Air Force, Army and Navy, respectively, for reconnaissance and attack missions. The UAV is perhaps the most well-known type of automated weapon because of its excellent tactical effectiveness in the battlefield. The two main UAVs used by the U.S. Air Force include the Predator and the Global Hawk. Operated by video satellite feed from a remote human pilot, these drone aircraft have been used successfully in battlefield theatres. The Berkeley UAV project has attempted to construct an automated small helicopter that has added the capability of hovering as well as movement in several directions; such a device would further enhance drone aircraft capabilities. Now in the early stages of development and use, these unmanned vehicles are not generally used in groups that can work together for optimized collective effectiveness.

There are several government and private robotics research projects that use different methods to organize groups of automated vehicles into a coordinated collective. First, the U.S. Air Force has developed a group of four UAVs that can work together as a collective; if one drone is shot down, its program code, including targeting information, is shifted to the other drones so that the mission will continue uninterrupted. Second, Oerlikon Contraves, a Swiss company, has developed a system (U.S. Pat. No. 6,467,388 B1, Oct. 22, 2002) to coordinate the behavior of several automated (space-based) fire control units; such a system is useful in an antiballistic missile context. Third, iRobot, a Cambridge, Mass., company, has developed a system of networked line-of-sight wireless automated robots for industrial applications. Fourth, Sandia Lab has developed a system of automated robots for use by the U.S. Army. This system utilizes UGVs with video feeds that link into a larger system for coordinated missions. Fifth, the U.S. Navy has experimented with UUVs for mine or submarine detection and attack. Combinations of the Remus small submarine work together to form a "Sculpin" team for a common, if not fully coordinated, antimine mission. The Navy also has developed a larger Battlespace Preparation Automated Underwater Vehicle (BPAUV) for detecting and attacking enemy submarines in hostile waters. Finally, NASA has developed exploration systems comprised of multiple robotic vehicles that network together for a common exploratory interplanetary mission utilizing AI and complex expert systems. Each of these systems provides an attempt at self-organized collectives of robotic systems by using limited technologies.

On the academic research side, there are several projects involving the coordination of groups of automated robots. Theoretical research performed at the Santa Fe Institute, a think tank focused on complexity theory for mathematical, biological, computational and economic applications, has been a leader in intelligent systems. Their interdisciplinary research has sought to develop models for collective robotics. A Santa Fe researcher, Bonabeau, developed research into complex behavior-based artificial systems by using a combination of rules that emulate self-organizing natural systems such as ant, bee or wasp organizational collectives. These complex natural systems, developed from millions of years of evolution, represent a key model for artificial intelligence scholars to develop automated systems.

Researchers at MIT and at Georgia Tech have also been active in the field of collective robotics. By using concepts from artificial intelligence that are applied to individual robotics, researchers have begun to build complex models for groups of robots. Some researchers have developed architectures for collective robotic systems that involve a combination of central control and behavior-based control. There are advantages and disadvantages of each main model. However, by developing unique hybrid control architectures, researchers seek to overcome the limits of each model.

Central control has some key advantages for robotics research. By using a central planner, the system can use logic to solve problems from the top down. Such a model produces deliberate and predictable results. A central control model can use hierarchy to organize a robotic system, which provides a clear command structure. Because it is predictable, a centralized control system can also use simulations to test various possible outcomes. Such a system is useful in order to achieve general strategic objectives without interference. Having a centralized control also provides a clear source for moral responsibility if a mission fails because the programmer is responsible for the results of a mission. The main problem, however, is that central systems cannot plan well in an uncertain or unpredictable environment in which there is change.

Behavior-based models of robotic systems, on the other hand, combine combinations of behaviors to achieve a specific outcome. By combining functions such as path creation and following, navigation, obstacle detection and avoidance and formation control, robots can construct reconnaissance activities. Such systems are ideal for interacting with complex environments in real time because they immediately react to specific inputs. In addition to their faster responses, such systems require less computation and communication resources than central control models. This approach to robotic control, however, lacks the planning needed for optimal coordination between groups of robots for a common objective.

There are several main hybrid models of robotic control systems in the academic world that are noteworthy. First, the AuRa system uses "selection" models in which the planning component determines the behavioral component. Second, the Atlantis model, developed by NASA, uses "advice" planning in which advice is provided but the reactor level actually decides. Third, the "adaptation" model continuously alters reaction by focusing on changing conditions. Finally, the "least commitment" model uses a postponement strategy in which the planner defers a decision until the last possible moment. These hybrid control models are used for individual robot actions. However, versions of these systems can be used for organizing groups of robots as well.

There are several systems that have sought to develop distinctive models for group robotic action by using unique combinations of hybrid control architectures. The Nerd Herd applies several behaviors in combination, specifically, homing, aggregation, dispersion, following and safe wandering, to achieve organized action. The Alliance model adds motivational behaviors to the subsumption approach with heterogeneous robot teams. The L-Alliance model evolves learning behaviors based on a statistical evaluation of the histories of other robots' performances. The Society Agency model develops team cooperation without any explicit inter-robot communications.

These systems use combinations of behaviors with a central control module to create social behaviors. For instance, the combination of behaviors for sensing and foraging can be added together in order to solve surveillance problems. If a number of coordinated robots can work together in organized patterns, surveillance problems can be solved faster and more completely using complex group behaviors. In another example, groups of robots can be organized into four two-dimensional formations (wedge, diamond, line and column) to perform tasks by using a hybrid control model that uses behaviors to adapt to the environment. Additional three-dimensional formations (geodesic sphere and geodesic arc) and four-dimensional formations (complex sequences and transformation of configurations) can be optimized for environmental interaction. Finally, the robot teams may include a heterogeneous colony of multifunctional robots that, in combination, may self-organize in order to perform more complex tasks than a number of specialist drones could accomplish.

Developing methods to organize collectives of automated robotic vehicles is one of the most challenging and complex problems in computer science, artificial intelligence and robotics research. These challenges involve the need to develop original technological approaches in computation, communications, networking, materials, energy supply and artificial intelligence.

The present invention develops a novel hybrid architecture for use with automated groups of mobile robotic vehicles in a multirobotic system. The swarm system has numerous applications.

BRIEF SUMMARY OF THE INVENTION

The present invention relates to a sophisticated integrated automated weapon system and the methods and apparatus thereof. By utilizing a distributed network of mobile robotic vehicles (MRVs) in a centralized way, a unique synthesis of methods creates a novel and powerful automated weapon system. The system involves several main logical, computational and mechanical technology categories, including aggregation and reaggregation processes, decision logics, environmental feedback and adaptation, computation resource limits and optimization, optimized distributed network communication processes, mobile software agent behavior, hybrid software operating systematization, collective biodynotics, automated distributed problem-solving processes and specific tactical game theoretic modelling.

In relation to practical weapon systems, the present invention has numerous applications. The invention involves ground-based, sea-based and air-based groups of automated MRVs that work together as a team. Distinctive tactical implementations of the present system reflect unique models of complexity theory, which articulates the behavior of dynamic self-organizing systems. Specific applications of the present invention include (1) an automated mobile sensor network for surveillance and reconnaissance, (2) groups of remote mines that become mobile, (3) active air, ground and sea MRVs that work either separately or together as a coordinated team for maximum tactical effectiveness, (4) integration of swarms with other weapon systems in a complex battlefield theatre, (5) evasive swarms and (6) models for dynamic tactical combat between MRV collectives.

Though the present invention involves a hardware component, it primarily involves a software component. The hardware component can be mobile robotic vehicles (MRVs) such as a UAV, a UGV, UHV and a UUV or other automated vehicles such as a microrobot. The core invention involves the software component. With the software system, groups of MRVs can work together in a collective system, which exhibits group behaviors and which interacts with and adapts to the environment by using distributed network communications, sensor and artificial intelligence technologies.

The main idea of a swarm is to create a large group of hundreds or thousands of MRVs that are launched from various locations into a battlefield theatre. When the main swarm encounters specific targets, the larger group divides into numerous much smaller squads for specific tactical attacks. The surviving squads regroup into subsequent attack sequences and will continuously adapt to the constantly changing battlefield environment. When the main targets are neutralized, the squad members rejoin the swarm and the mission ends as the MRVs return to a safe location.

In order to accomplish these tasks, the swarm uses a hybrid control system that fuses a centralized group organization system with a localized behavior-based reactive control system. Such hybrid control systems utilizing groups of automated coordinated mobile robotic vehicles are ideal for military applications. By separating into smaller squads, behavior-based control systems can emphasize the interaction with and adaptation to the changing local environment. However, the larger swarm has a more strategic mission to move into the general battlefield theatre and requires more centralized control.

In one embodiment of the present system, both the swarm level and the squad level involve hierarchical control in which a centralized leader controls the drone followers. This approach benefits from clear lines of authority and mission focus. This approach also sustains the moral responsibility necessary for combat interaction by carefully structuring the program parameters to strike specific kinds of targets.

Swarms utilize sensors in order to assess, map and interact with the environment. Sensor data are critical to properly inform the swarm and squad mission. The sensor data is supplied in real time to supply the most recent information of battlefield situations.

The sensor data is supplied to the squad or swarm lead MRVs (or retransmitted to external computation resources) in order to be analyzed in real time. If an intense amount of sensor data is supplied from a single source or if a number of MRVs' sensors supply clear information about a target, the information is analyzed and evaluated for an attack. If the information fits within the mission program parameters, the squad leader may decide to attack the target.

The squad leader has mission program parameters that specify particular goals and rules. Examples of mission program parameters are to defeat specific enemy positions, to deplete enemy resources, to deter enemy attacks, to minimize the risk of friendly fire, to distract the enemy, to contain an enemy or to target the enemy in a complex urban terrain so as to minimize collateral damage.

Squads engage in specific behaviors that utilize complex tactical maneuvers. For example, squads may surround an enemy and seek to outflank a specific position, even as the position remains mobile. By anticipating the enemy behavior, the squads may employ tactical advantages. In another example, swarms may employ air and land squads in combination for maximum effectiveness. In yet another example, squads may enter a building and find and detain a specific combatant using nonlethal approaches. In particular, the swarm system is characterized by the dynamic use of swarms that use adaptive behaviors to constantly interact with changing environments and mobile targets.

One of the main challenges of the U.S. military is to develop ways to integrate various weapon systems. In this context, swarms fit into the Future Combat System (FCS) extremely well. As a first line of offense, automated MRVs can work with ground troops. For instance, ground troops can launch a squad for a focused tactical attack. In addition, urban or jungle warfare, which tend to restrict safe movement for infantry soldiers, can utilize multiple squads as a front line to clear dangerous areas. The mobility of swarms is also useful as reconnaissance ahead of forward troops. Similarly, the use of swarms for sentry duty is useful because they can turn from defensive to offensive capabilities instantaneously.

Though ground and underwater swarms will be useful, it is primarily airborne swarms that will be prominent on the battlefield. Airborne swarms can be used in conjunction with infantry troops, marine beach landings and traditional air support. Air and ground swarms can work together with ground troops since swarms can clear the most dangerous areas for which human soldiers can provide back up. In a similar way, airborne and underwater swarms can be used by the Navy to support ships and marines. Swarms can be used as defensive (underwater) mines to protect mobile ships and then strike at enemy targets as they penetrate a specific hazardous zone. Finally, hovercraft (UHV) swarms can be useful in a number of battlefield contexts.

The most basic strategy for swarms is to (1) go to the battlefield theatre, (2) survey the terrain, (3) create a map, (4) secure the perimeter, (5) identify the objective, (6) compare the objective to mission program parameters, (7) have a lead MRV determine an attack objective, (8) create an initial assessment of the attack and update the map, (9) respond and adjust to the changing environment, (10) regroup, (11) re-attack with new approaches in order to more successfully achieve the objective of striking the target, (12) successfully complete the mission, (13) rejoin the swarm and (14) return home.

One of the main aspects of swarms is the ability to aggregate groups of MRVs into a self-organizing collection of individual robotic entities. While there are various methods to aggregate groups of agents, whether software or robotic agents, using increasingly complex applications of artificial intelligence, the present invention uses hybrid approaches rather than purely centralized or decentralized approaches. In this model, the lead MRV is the dominant player for decision-making. Group "decisions" are limited to the sensor data supplied by various MRVs. The mission program parameters themselves evolve in order to present very complex responses to environmental adaptation.

The geometric configuration and reconfiguration of groups of MRVs are determined by lead MRVs by comparing the sensor data with mission program parameters. The leader must calculate the most efficient way to organize the group for an effective mission. In order to do so, the leader uses computation resources that develop simulations of the optimal solution to the problem of how to best achieve the mission. By choosing the best simulation of how to best aggregate the MRV squad(s), the leader then activates the most efficient way for the MRVs to complete the selected program sequence.

Once a group of MRVs in a squad effectively attacks a target, it regroups, or reaggregates, for a continuation of the mission. The reaggregation approaches use methods similar to the original aggregation model, but have the advantage of experience by having interacted with the environment. By learning from these experiences, the squad may adapt to new geometric organizational structures for increasingly effective attack models. New simulations are developed and a new optimal simulation is selected for use in a newly aggregated grouping of the squad and another attack sequence is initiated until the target is effectively neutralized. Aggregation and reaggregation processes are crucial to the swarm system.

One of the main advantages of employing aggregation methods in the swarm system is to emulate biological systems. The use of aggregation approaches for groups of automated robotic agents effectively forms the new field of collective biodynotics (biological emulated dynamic robotics). Though it is important for robotic theorists to mimic the effective behaviors of individual animals or insects, such as emulating the functioning of an octopus for foraging activities, it is primarily in the area of group behavior that roboticists have sought to emulate biological group functions.

Animals and insects have for millions of years evolved systems of behavior that have proved very effective at limiting the group's casualties by working as a collective. Whether in the case of birds in large flocks, wildebeests in large herds or fish in large schools, the development of group behaviors have largely resisted predators and allowed the species to thrive, often in hostile environments. In the case of insects, the swarming behavior of some bees and ants have similar characteristics that protect and prolong survival of the group. By identifying these interesting characteristics, it is possible to develop robotic systems that emulate the biological collective behaviors.

In the case of ants, pheromones are used as a method to distribute information in the immediate environment. The use of pheromones by ants to communicate with each other to achieve a common purpose is applicable to robotic collective behavior research. The environment is "tagged" as an adaptive aspect of the system with which the ants interact. By developing an interaction with the environment, ants use pheromones to achieve coordinated activity. In this way, a kind of swarm intelligence is developed in agents that may have very limited individual computational resources. In addition, ants or bees may use specialists to perform specific functions that, in coordination, develop a division of labor for the efficient completion of complex tasks, such as foraging for food or fighting off invaders.

In the case of collective robotics research, though it is possible to emulate swarm intelligence of primitive biological systems, it is also possible to construct a system that goes substantially beyond this natural prototype of evolution and environmental adaptation. Group biodynotics develops increasingly complex and effective models over their natural counterparts. First, there is more information supplied by the swarm robotic system (via sensors) than the insect system. Second, the robotic group can work together to make decisions by using advanced artificial intelligence technologies. Consequently, the robotic collective can actually anticipate environmental feedback, which natural systems are not programmed to do. Finally, robotic teams can work together by using specialized functions in a more sophisticated way than insects in order to accomplish tasks, including shifting roles within a single robotic individual, with maximum effectiveness.

The combination of techniques and methods that are developed in order for automated mobile robotic agents to work together to achieve common goals are specific tactics used in the battlefield. These tactical approaches, in combination, allow military planners to have more robust strategic alternatives.

Though there are a range of possible objectives and prospective mission parameters, there are some general tactical models that swarms employ. Enemies may be limited to a single location or to multiple locations, may be stationary or mobile and may be ground based or airborne. Consequently, swarms need to be able to counter the various threats with a relatively broad range of tactical alternatives. Ultimately, however, swarms are designed to identify, engage and defeat an enemy. The various tactical approaches are therefore designed in order for swarms to analyze and act in the most effective way for each situation.

Swarms must identify enemy positions and the scope of possible attacks. After identifying the enemy threats, the swarm develops candidate solutions to achieve the main objective and also develops a way to select the optimal solution to achieve its objective according to mission program parameters.

There are a number of classes of optimization problems that the swarm system must deal with. The challenge for the system is to identify the optimal way to accomplish a specific goal in a specific problem category. The system must identify the best way to achieve a goal in a constantly changing environment; it must identify ways to solve the dynamic traveling salesman problem (TSP). Similarly, the system must identify the most efficient allocation of resources in a dynamic environment. In addition, the system must constantly reroute a dynamic network. In the context of recruiting the appropriate MRVs into squads for specific missions, the system must identify the optimal geometric grouping as well as a dynamic geometric configuration for regrouping in dynamic environments. The optimal attack sequence must be selected by each squad on a tactical level while the optimal overall strategy for using squads must be developed on the swarm level. Optimal attacks must be organized with varying resource constraints. Methods need to be developed in order to select the optimal simulation for attack. Finally, optimal search patterns need to be developed in order to organize maps. The present invention deals with each of these optimization problems in a novel way.

Such tactics are used as avoiding enemy strengths, identifying enemy weaknesses, adapting to changing enemy positioning, evolving sequential tactics to accommodate changing environments including targeting the enemy positions from different directions, anticipating various enemy reactions and developing dynamic attack patterns to neutralize an enemy position and achieve a mission objective.

By interacting with adaptive environments, by anticipating probable scenarios, by using real time sensor data that is constantly updated and by employing decision logics, swarms and squads of MRVs implement effective battlefield strategies and tactics that emulate, and go beyond, biological systems, and that develop into a formidable collective biodynotics model. In their actual implementation, swarms of MRVs can be disguised as biological entities, such as birds or fish, so as to maximize camouflage and enhance the effects of surprise in surveillance and in attack modes. Swarms of micro-MRVs (micro air vehicles) can also be used by front line infantry troops so as to contain an enemy by attacking a rear position or outflanking a position. Platforms may be used to launch and refuel swarms, whether sea based, land based, air based or space based: In fact, platforms may be mobile themselves. Finally, MRVs may launch other types of MRVs in various scenarios.

Swarms may also be used in a nonlethal context, for instance, in reconnaissance modes. Nonlethal offensive swarm approaches may be activated by applying a shock to enemy combatants or by administering a tranquilizing gas.

The present invention has several advantages. Previous offensive weapon systems include large automated drones or remote controlled aircraft that can fly like gliders and provide video images or that can launch a limited number of laser guided missiles; cluster bombs or bomblets; torpedoes or mines; tank or artillery fired projectiles; and independent or multiple warhead missiles. The swarm system is intended to work with these other weapon systems. The system of the present invention, however, is more mobile, accurate and adaptive than any other weapon system so far developed.

There are many advantages of the system of the present invention. Use of the swarm system presents a competitive advantage because it exploits rapid changes of battlefield environments. The system of the present invention also presents an increasingly efficient method of accomplishing a task in such complex environments because of its use of groups of automated mobile robotic agents when compared to individual agents. In addition, increased system efficiency is achieved by using specialization in groups of automated robotic vehicles.

Groups of robotic agents can attack an enemy position more efficiently and more quickly than a single weapon. This is similar to how a pack of wolves can typically defeat an enemy faster than a one-to-one dogfight. Further, since they use multiple sensor sources that assess changes in real time, groups of MRVs have the advantage of being able to identify and target enemy positions and coordinate attacks better when compared to a single sensor source. In fact, because they are mobile, groups of MRVs have advantages over a relatively stationary, single, satellite sensor source. Not only are single enemy positions targeted by multiple MRVs but multiple positions are more easily identified and targeted by MRVs than by single sources.

Swarms have the ability to pause, wait or stop in the process of completing a mission, unlike satellite guided bombs or missiles which operate continuously. This important feature allows them to change direction and to take the time to redirect attacks, particularly against dynamic and constantly moving targets or in formidable meteorological conditions. In the case of complex moving target categories such as mobile rocket launchers, swarms are well suited to tactical attacks. Moreover, in the constant changes of a battlefield environment, the continuous adaptation and variable adjustment of swarms provides an ideal weapon system.

Multiple MRVs provide a multiple mobile sentry capability to cover a broader surface area. Groups of MRVs can be converted from neutral or defensive sentry positions to active reconnaissance or offensive positions when an opportunistic enemy catalyzes such a change in mission character. Similarly, groups of MRVs can be used as passive mobile mines in land, sea or air that convert to active status; this is especially useful in a dangerous battlefield theatre. In addition, teams of MRVs can be used to locate and attack enemy mines or other stealthy or camouflaged weapons.

Swarms can be used defensively as well as offensively. By defending a specific area, swarms can be very useful in preserving the peace. Furthermore, swarms can be evasive. Because they are small, mobile and numerous, swarms can be both radar evasive and antiaircraft evasive. The combination of evasive and offensive capabilities presents a formidable tactical weapon configuration.

Swarms can target mobile enemy positions with greater precision than other systems. In particular, in urban environments in which the protection of innocents is paramount, swarms can be used with maximum precision. In a similar context, use of swarms in jungle terrain will present maximum strategic opportunities. By surgically attacking specific targets in a broad area, swarms can achieve a mission success better than any other single combat system and can operate where other weapon systems have limits. Such precision targeting is intended to minimize collateral damage of civilians as well as friendly fire. Because they are so accurate, swarms are also much more discriminating than other weapon systems. Groups of MRVs can be faster to act and yet can wait to the last moment to act, polar aspects that provide extreme system flexibility for maximum effectiveness.

Swarms can work in conjunction with other weapon systems. Whether launched by infantry soldiers or navy sailors, swarms can work with small weapon systems to enhance a mission. Additionally, swarms can work closely with other large weapon systems in a network. In such an example, swarms can provide early reconnaissance information in real time, as well as initial attack waves, which are then supplemented by and coordinated with larger weapon attacks on specific positions. Swarms supplement an advanced fighting force by increasing the productivity of personnel and thereby act as a force multiplier. Swarms integrate well into the rapid decisive operational architecture of the future combat system, which will provide the U.S. a competitive advantage for generations.

Because they are self-contained, swarms can take pressure off valuable satellite bandwidth particularly during a battle when bandwidth is an essential commodity for other advanced weapon systems. In addition, swarms can provide much needed communication retransmission in a busy battlefield theatre by intermediating signals.

Swarms can function in a broad range of resource constraints, including severe computation and communication limitations, by reverting to simpler reactive control models which focus on environmental interaction using local rules of behavior. The swarm model presents a complex robust system that is scalable and reconfigurable. Swarms are relatively cheap, yet are reusable, upgradeable—by changing chip sets and software programming—and reprogrammable. Because they can be implemented in various sizes and configurations, swarms are extremely flexible. Smaller swarms in particular can be used for various stealthy circumstances. The obsolescence of MRVs will occur only as the software becomes so sophisticated as to require new hardware.

There are numerous psychological advantages of automated warfare using swarms. For instance, simply seeing an incoming swarm or even threatening their use can spur a further negotiation or cease-fire. Their very use will be intimidating. While one swarm squadron can be ultra quiet in order to engender a surprise attack, other swarm squadrons can intentionally emulate a loud aircraft so as to increase fear levels of enemy troops. In short, one function of swarms is to facilitate the "rapid dominance" theory of military doctrine.

Swarms remove humans from harm's way by resuming the heavy lifting of dangerous combat. Moreover, swarms can exceed the limits of human abilities, such as the ability to go several times the speed of sound. In addition, because they are completely computer based, they can "think" quicker than humans in critical situations. Consequently, swarms, as automated mobile vehicles, can transcend the boundaries of human action, with greater speed and precision, thereby giving them a competitive advantage in the battlefield.

One major limit of existing cruise missiles and laser-guided bombs is that they are restricted in inclement weather. Yet swarms can behave in various weather conditions. In fact, swarms can use inclement weather to their advantage precisely because this is unexpected. Another limit of the larger bombs and missiles is that in many cases their use is similar to using a sledge hammer when a scalpel will do much better.

One of the chief advantages of the swarm system is its cost-effectiveness. Swarms allow the military to curtail the selection of expensive and relatively noncompetitive weapon systems and thus to save money which can be better used in other parts of the arsenal.

Weapon systems of the future will contain an increasing use of automation. Such advanced systems will complement advanced tactical battlefield weapons solutions. The swarm system will provide an invaluable role in the complex battlefield weapon systems of the future.

The present invention solves a number of problems. There are several important categories of problems that the swarm system solves. First, the swarm system presents a viable application of an automated weapon system that operates autonomously and collectively. Such a system solves a critical problem for the U.S. military because the swarm model can fit in the middle sphere of weapon systems between the very large weapon system and the very small arms system.

Swarm squads can work together for tactical advantage, which cannot be done without the coordination of collectives of automated mobile entities. By working as coordinated collectives, swarms possess strategic advantages because of the use of multi-phasal and multidirectional offensive tactics. Because the system so closely interacts with the environment, swarms can pinpoint attacks extremely efficiently.

The present invention solves a number of problems involving computational and communications resource constraints. By using elastic computation resources, it is possible to overcome the limits of resource constraints. Similarly with communications resources, the present invention uses distributed communications procedures to overcome the limits of bandwidth scarcity and elasticity, particularly in critical mission environments.

The present invention uses advanced artificial intelligence technologies in order to overcome prior system limits. The present invention uses a hybrid control system that overcomes the limits of a purely centralized or a purely decentralized model for collective robotics. Consequently, we realize the best of both worlds by maintaining some central control as we also achieve maximum local interaction.

The leader-follower model implemented in the present invention presents a limited centralized approach to behavior control but goes beyond other hybrid approaches.

Collective behaviors of automated mobile robots are most fully expressed in aggregation and reaggregation processes that are well implemented in the present invention. Combat applications of aggregation present an optimal venue for the geometric grouping and regrouping of automated mobile agents as they interact with the changing environment. This complex self-organizing system more optimally models battlefield activity so that it emulates, and transcends, biological models that have evolved over millions of years.

The present invention uses a broad range of hardware applications that provide a diversity of battlefield options from large to small. These solutions to key robotic, distributed artificial intelligence and weapon challenges are novel, nonobvious and important to the advancement of warfare.

BRIEF DESCRIPTION OF THE DRAWINGS

FIG. 1 is a schematic diagram of a synthetic hybrid control system for social dynamic behavior;

FIG. 2 is a flow diagram showing distributed network processing;

FIG. 3 is a flow diagram of a Swarm Operating System (OS);

FIG. 4 is an illustration describing system equilibria of a swarm squad;

FIG. 5 is a flow diagram showing the coordination and targeting by swarms;

FIG. 6 is a flow diagram of showing a sample of the calculus of groups of MRVs;

FIG. 7 is a flow diagram of the dynamic Traveling Salesman Problem (TSP);

FIG. 8 illustrates a diagram of the dynamic TSP;

FIG. 9 is a flow diagram of the hierarchical relationships of a leader and followers in a squad;

FIG. 10 is an illustration showing the leadership hierarchy architecture;

FIG. 11 is a flow diagram of asymmetric negotiation between MRVs;

FIG. 12 is a flow diagram of MRV leader substitution;

FIG. 13 is a flow diagram of a central blackboard;

FIG. 14 illustrates a diagram of a representation of swarms on a central blackboard;

FIG. 15 illustrates a map showing external computation resources;

FIG. 16 is a flow diagram of MRV database interrelations;

FIG. 17 is a flow diagram of a behavior-based control system;

FIG. 18 is a flow diagram showing local rules and meta-rules;

FIG. 19 illustrates a map and a flow diagram showing the self-correcting mechanism of a MRV squad;

FIG. 20 is a flow diagram showing the self-diagnostic process of MRVs needed to join squad;

FIG. 21 is a flow diagram showing the MRV power supply process;

FIG. 22 is a flow diagram describing computation resource limits;

FIG. 23 is a flow diagram showing MRV intercommunications;

FIG. 24 is a flow diagram illustrating the environmental interaction and adaptation of mobile networks;

FIG. 25 is an illustration and a flow diagram describing a squad's environmental feedback;

FIG. 26 is an illustration describing the integration of a satellite with external sensors;

FIG. 27 is a flow diagram showing swarms as a communication interface;

FIG. 28 is a flow diagram showing a mobile sensor network;

FIG. 29 is a flow diagram describing group dynamic navigation;

FIG. 30 shows a schematic diagram describing group mobility;

FIG. 31 is a flow diagram showing discontinuous and variable actions of MRVs;

FIG. 32 is a flow diagram showing the process of mapping, including the creation of partial maps, general maps and the continuous mapping process;

FIG. 33 is a flow diagram showing 3D map topology

FIG. 34 is a flow diagram showing the operation of mobile software agents;

FIG. 35 is a flow diagram illustrating the aggregation process of forming swarms into squads;

FIG. 36 is a flow diagram of squad organization and its response to the environment;

FIG. 37 is a flow diagram showing MRV decision making;

FIG. 38 is an illustration of the dynamics of an octopus with an analogy to wireless squad behavior;

FIG. 39 is a flow diagram revealing an example of collective biodynotics;

FIG. 40 is a flow diagram of squad regrouping processes;

FIG. 41 is an illustration of a diagram showing the process of squad reconstitution;

FIG. 42 is a flow diagram showing the problem solving process of MRV groups;

FIG. 43 is a flow diagram showing neutral swarm surveillance and reconnaissance functions;

FIG. 44 is a flow diagram showing defensive swarm functions;

FIG. 45 is a list of offensive swarm functions;

FIG. 46 is a flow diagram illustrating intelligent mines that convert to active status;

FIG. 47 is an illustration of a unilateral tactical assault using a swarm squad;

FIG. 48 is an illustration of a tactical assault in which the enemy is outflanked;

FIG. 49 is an illustration of a tactical assault using swarm squads to attack a beach in a littoral assault of fortified targets by using unmanned hovercraft vehicles (UHVs) and UAVs;

FIG. 50 is an illustration describing MRV dynamics by showing a squad's early wave sensor data transmitted to later MRV waves in a "gambit" process;

FIG. 51 is an illustration showing MRV dynamics by describing a multiple wave multi-MRV regrouping process;

FIG. 52 is an illustration showing MRV dynamics by describing how squads anticipate and strike a mobile enemy;

FIG. 53 is an illustration showing MRV complex dynamics by describing MRV squad reconstitution, multiple strikes and mobile enemy counterattacks;

FIG. 54 is an illustration showing MRVs that launch micro MRVs;

FIG. 55 is an illustration showing the recognition capability to identify and protect noncombatants;

FIG. 56 is an illustration of structure penetration of a house;

FIG. 57 is an illustration of structure penetration of a ship;

FIG. 58 is an illustration of structure penetration of an underground facility

FIG. 59 is an illustration of wolf pack dynamics showing packing behaviors of MRVs;

FIG. 60 is an illustration of an alternating attack sequence of MRVs;

FIG. 61 is an illustration describing the coordination of air, ground (hovercraft) and underwater swarms in a joint sea assault;

FIG. 62 is an illustration describing a joint land assault using combinations (UGVs, UAVs, UHVs) of swarms to set a trap;

FIG. 63 is an illustration describing a joint battle operation of MRV squads providing advance cover for infantry;

FIG. 64 is an illustration describing the joint interoperable integration of swarms and the Future Combat System (FCS);

FIG. 65 is an illustration of an initiation of the dynamic multilateral interaction of swarms in a tactical dogfight;

FIG. 66 is an illustration showing multilateral inter-MRV dynamic tactical combat between robotic systems;

FIG. 67 is a flow diagram showing evasive swarm maneuvers;

FIG. 68 is a map showing the taxonomy of weapon hardware system categories;

FIG. 69 is an illustration showing the swarm battle recirculation process;

FIG. 70 is a flow diagram describing a dynamic communications network rerouting to the most efficient route;

FIG. 71 is a flow diagram describing the efficient allocation of swarm resources;

FIG. 72 is a flow diagram describing the winner determination of simulations;

FIG. 73 is a flow diagram describing the optimal geometric configuration of groupings;

FIG. 74 is a flow diagram describing optimal dynamic regrouping geometric reconfigurations;

FIG. 75 is a flow diagram describing an optimal strategy for a swarm level attack;

FIG. 76 is a flow diagram describing an optimal tactical sequence for MRVs;

FIG. 77 is a chart illustrating an optimal tactical option typology;

FIG. 78 is a flow diagram describing an optimal search pattern for a group of MRVs;

FIG. 79 is a flow diagram describing optimal attacks with resource constraints;

FIG. 80 is a flow diagram describing an optimal attack with information constraints; and FIG. 81 is a flow diagram describing an inter-MRV conflict resolution approach.

DETAILED DESCRIPTION OF THE INVENTION

The present disclosures illustrate in detail the main ideas of the present system. The present invention having numerous embodiments, it is not intended to restrict the invention to a single embodiment.

The system and methods incorporated in the present invention are implemented by using software program code applied to networks of computers. Specifically, the present invention represents a multirobotic system (MRS) that includes at least two mobile robotic agents. These robotic agents, mobile robotic vehicles (MRVs), have various useful purposes in the context of specific military applications. The MRVs use complex software program code, including mobile software agents, to execute specific instructions involving robotic and computational operations. The software capabilities activate specific robotic functions within MRVs involving movement and decision-making.

The present invention focuses on how groups of MRVs operate in a MRS. As such, the invention, or cluster of methods, solves problems in the area of computation for groups of mobile robots in a distributed network. The system shows novel ways for groups of MRVs to work together to achieve specific military goals such as mapping the environment and coordinating the missions of groups of MRVs as well as identifying, targeting and efficiently attacking enemy targets. The system employs a hybrid model for collective robotic control that combines the best elements of central (hierarchical) control with behavior-based control mechanisms in order to overcome the limits of each main model. One key element of the present invention is the aggregation and reaggregation of groups of MRVs for use in dynamic environments. The ability to establish and automatically reorganize groups of robotic entities in dynamic combat environments is crucial to development of the next generation of advanced warfare capabilities. The present invention advances this knowledge.

In general, the system uses small groups of MRVs called squads to efficiently attack specific targets. The squads are formed by much larger swarms of MRVs that use the strategy of moving in to battlefield theatres. Once specific missions are developed, squads of MRVs are formed for specific tactical purposes of achieving specific goals. Squad configurations constantly change. The geometric composition of squads adapt continuously to the environment, while the membership of squads are constantly transformed as necessary for each mission, with some MRVs dropping out and others replacing or supplementing them.

The main model for decision making of swarms, on the strategic level, is hierarchical. Given this organizational approach, each squad has a leader and numerous followers or drones. The leader, or lead MRV, is used as the central decision maker, which collects sensor data from the drones, analyzes the data according to program parameters and issues orders to the follower MRVs. The lead MRV will use methods of testing various scenarios of simulation in order to select the best approach to achieve the mission goals. Once the mission is completed, the squad will return to the swarm.

Since the battlefield has many risks and much uncertainty, there is a high probability of reduced system capabilities such as restricted computation and communications. Consequently, on the squad level, the system may need to operate with less than optimal computation or communication resources in order to achieve its mission(s). Given this reduced capability, squads may default to sets of behavior that allow the MRVs to interact directly with their environment and with each other. In this way, they emulate the natural insect models of self-organization in which each bug has very limited computation and communication capacity, but together work as a complex system in productive ways in order to achieve common aims.

Though the present invention specifies a range of mechanical processes necessary to operate an MRS, it also specifies a number of detailed dynamic military applications, including reconnaissance, defensive and tactical operations. In addition, in order to operate as efficiently and productively as possible, the present invention specifies a range of optimization solutions. This detailed description is thus divided into three parts: general mechanical and computational structure and functions; military applications; and, optimization solutions.

General Mechanical and Computational Structure and Functions

FIG. 1 illustrates the levels of hybrid control architecture in the present multirobotic system. The first level shows specific central (0175) and reactive control (0180) systems. Level two shows the general level of central planning control (0165) and behavior-based reactive control (0170) types. These main types represent the two main poles in robotic control systems, with the central planning main approach employing increased abstraction and the behavior-based main approach allowing increased interaction with the environment. At level three, these two main model categories are intermediated (0150) with a middle layer that allows the fusion of the two.

Level four illustrates several main hybrid control systems that combine both central planning and behavior based control models: (1) planning driven, (2) advice mediation, (3) adaptation and (4) postponement. The planning-driven approach (0140) to combining the main control methods determines the behavioral component; it is primarily a top-down model. The advice mediation approach (0142) models the central planning function as advice giving, but allows the reactive model to decide; it is primarily a down-up model. The adaptation model (0144) uses the central planning control module to continuously alter reaction in changing conditions. Finally, the postponement model (0146) uses a least commitment approach to wait to the last moment to collect information from the reactive control module until it decides to act.

At level five, various combinations (0130) of these main hybrid control models are used. For instance, a robotic system may use a suite of hybrid control systems in order to optimize specific situations.

Level six shows the use of specific combinations of hybrid control models. First, the combination of the planning and adaptation models (0110) yields a distinctive approach that combines the best parts of the central planning approach with the need to continuously adapt to the environment. Second, this model is further mediated (0112) by the model that gives advice, based on analyses, to the central planning function that adapts robotic behavior based on the changing environment. Third, the adaptation hybrid model is combined with the postponement approach (0114) in order to achieve the best parts of continuously altering the reaction to environmental change but does so in a least commitment way so as to wait to the last moment. Finally, the third approach is supplemented by the planning approach, in the fourth model, which is mediated by the advice-giving model (0116); this model is used in the most complex environments.

The evolution of these hybrid control models, as represented in the layered structure of figure one, is increasingly suited to complex social behaviors of a mobile multirobotic system used in dynamic environments. The present invention uses a combination of all of these models in some mix in a suite of control models because of the need to have both central planning aspects combined with maximum interaction aspects for social behaviors in the most complex, interactive and dynamic environments.

Even though it is referred to as a centralized control model, this main component is also hierarchical. That is, the system is organized for central control between a leader and a number of followers in the MRS. Because it is a large social MRS, the current system employs a distributed network processing model, illustrated in FIG. 2. The sharing of computer resources in order to share sensor data (0220), computation resources (0230), database memory (0240) and computation analysis (0250) is made increasingly efficient for heterogeneous systems in a distributed structure.

The functioning of the main swarm operating system is illustrated in FIG. 3. After the hardware operation is checked (0310) and software loaded to the MRVs in the network (0320), the program parameters are initiated and the strategic goals and main mission is oriented (0330). Sensor data from the MRVs provides an initial map of the terrain in order to set up a path of action (0340) and the swarm proceeds on a mission along the specified path (0350). Targets are identified by swarm sensors or by external sensors or by a combination of both (0360). Groups of MRVs are selected (0370) to attack targets and the squads are actually configured (0375) in order to perform attack sequences, which are then performed (0380). Squad MRV sensors report effects (0385) of attacks, which reveal the need to continue the mission (0395) until the target is knocked out or until the end (0390) of the mission, after which the squad returns to the swarm and heads home.

FIG. 4 illustrates different equilibria states from the first stable state A for a squad formation (0410) to a position of disequilibrium B (0420) in which an external shock, such as a weapon fired on the squad at arrow and blackened circle, disrupts the squad, thereby eliminating the three far right MRVs. At the final stable state C the remaining squad members reorganize to a new equilibrium state (0430). In each case, a double circle designates the leader. System equilibria and multiple configurations and reconfigurations of MRV squads will be discussed in later figures as well. This general view shows the dynamic aspects of mobile robotic agents in a coordinated system with external interaction.

Though MRVs employ various approaches to coordination and targeting, including the use of external sensor data to build maps and plans in order to move towards and strike a target, FIG. 5 illustrates the coordination and targeting by MRV swarms. MRV sensors work as a network to track moving targets (0510) with lasers or infrared sensor capabilities. The MRVs continually refocus on the targets (0520), typically enemy positions, as they move. Friendly combatants and innocent parties are excluded from the targeting process by cross referencing the sensor data with a database of known information.

MRVs collect a range of data about the targets (0530), including information about the distance to the targets and target velocities and vectors. This information is sent to the lead MRV (0540) from the multiple MRVs' sensors in the swarm or squad network. The lead MRV identifies the specific target positions and orders MRVs to attack (0550) the targets. MRVs receive instructions from the lead MRV, organize into squads (0560) and proceed to the targets (0570). Since the MRVs are programmed with distance information, they may detonate at the location (0580) of the targets (after anticipating the targets' positions by calculating their trajectories and velocities) or upon impact with the targets (0590), whichever method is chosen to be most effective by the lead MRV. The targets are then destroyed (0595).

Squads of MRVs work together by having drones supply information to the lead MRV, with the lead MRV calculating the course of action and then supplying programming to the MRVs in order to accomplish a specific mission. In FIG. 6, the calculus of MRV groups is illustrated. After reporting MRV data on their own positions (0610) to the lead MRV, MRV sensor data about the enemy target(s) (0620) is supplied to the lead MRV. The lead MRVs environmental map is constantly updated to account for dynamic changes (0630). Specifically, the leading edge of the first wave of MRVs supplies sensor data to the lead MRV in the squad (0640) because they are most accessible to the environment. The closest MRV to the target(s) measures the target(s) distance, velocity and vector and supplies the data to the lead MRV (0650). The lead MRV orders the closest specialized MRVs to attack the target(s) (0660).

The problem of how to establish the order of attacking targets is closely related to the optimization problem called the traveling salesman problem. Consider that a traveling salesman has a number of customers in a field distribution and must determine the most efficient route in order to visit them. One route may be the best in the morning because of high traffic, whereas another may be better for specific customers. The problem is how to develop a route that optimizes the benefits to the salesman and to other relevant considerations. This general optimization problem is shared by the swarm system as well. What is the best route to use to accomplish a specific mission? The answer depends on the construction of the mission, because there are different priorities, which determine different outcomes. FIGS. 7 and 8 address this general problem. Both figures address solutions to this type of problem as dynamic because both the MRVs and the targets are mobile and are thus both dynamic and interactive. The last dozen figures also represent solutions to optimization problems.

In FIG. 7, different MRV squads are assumed to have different priorities (0710). As MRV squads engage targets, specific prospective targets present varied feedback (0720), which is adduced by the MRV sensors. MRV squads attack the most essential target in the order of priority for each squad (0730), according to either (1) first one at the site (0740), (2) the highest priority target (0760) or (3) a specialized target (0780). In the first case, the MRV at the leading edge of the MRV squad immediately attacks the target (0750). In the second case, the prime target is attacked (0770) first and in the final case, a priority is established whereby specialized MRVs are used against a specific target type (0790). There are numerous possible configurations of swarms (and squads) with various possible optimal scenarios contingent on a variety of preferences and environmental situations. The examples listed here are simply preferred embodiments.

FIG. 8 shows how, while moving from right to left in formation, MRVs A (0810) and B (0820) attack different targets in alternating sequence by seeking to use their resources as efficiently, and complementarily, as possible by striking (0830) one and three, and two and four, in the order of one to four, by maximizing the use of their positions and trajectories.

There are various reasons to have a combination of central control and reactive control in an MRS. Tactically, a centralization of the information-gathering and decision-making capacities of a group of mobile robotic agents are important to extend the range of knowledge between the machines in real time beyond the limits of any particular robot and to increase the effects of collective actions. The use of shared communications and computing resources is also increasingly efficient. Finally, the advantages of having a centralized component involve the need to have a consolidated role for moral responsibility of the outcomes of the robotic group actions. FIGS. 9 through 14 describe some elements of the centralized hierarchical model used in the present invention.

In FIG. 9, the hierarchy model of a leader with follower drones is described. The leader is capable of performing complex computational analysis and has decision-making abilities (0910). Since the squad level is a subset of the swarm level, a leader is available in each squad. Squad leaders exist in a hierarchy below swarm leaders (0920). Much as squad followers receive their programming parameters from the squad leaders (0940), leaders in each squad receive advice from the swarm leaders (0930). This leadership hierarchical architecture is illustrated in FIG. 10 as a tree, with the highest-level swarm leader (1010) above the second highest level swarm leaders (1020 and 1030) and providing the highest level of analysis and advice. Similarly, the second highest level of swarm leaders provides orders to the third highest squad leaders (1040 and 1050), which, in turn, supply orders to the lower level leaders (1060 and 1070). These lowest level leaders may result from breaking the squads into smaller groups for specific missions.

Because the lead MRV of a squad interacts with numerous follower MRVs on a specific mission, the system of interaction used involves asymmetric inter-MRV negotiation. In FIG. 11, this asymmetric negotiation approach is articulated. After the lead MRV assesses the squad configuration for spatial positioning and specialization composition (1110), the follower MRV drones request instructions from the leader (1120). The lead MRV makes decisions about the configuration of a tactical attack (1130) on specific targets and provides specific instructions to specific MRVs contingent on their spatial position and specialization (1140). The follower MRVs receive the specific instructions from the lead MRV (1150) and proceed to implement the instructions (1160) by processing the program code, effecting their actuators and performing the actions necessary to achieve their mission.

From time to time, the leader MRV is removed from the combat field, e.g., because of an external shock or because of equipment failure. In this case, a follower MRV must be able to convert to the status of a lead MRV, in a sort of battlefield promotion, in order to lead the team. In FIG. 12, the MRV leader substitution process is described. If the leader is struck down or if drones receive no leader signal (1210), the next-in-line MRV is marked as the substitute leader (1220). Upon detecting imminent failure of the leader, the software program code of the first lead MRV containing the latest information available is transferred to an external database depository by way of a mobile software agent (1230). (Mobile software agents are further discussed at FIG. 34 below.) After a substitute MRV leader is designated, the first MRV leader's program code, which has been stored as described, is transferred to the new leader (1240) and the substitute lead MRV analyzes data, makes decisions and sends commands (1250). It is interesting to note that a number of computationally sophisticated MRVs are available in the swarm to sufficiently enable a number of MRVs to be leaders even though only a few are activated as leaders.

From a computation viewpoint, a central blackboard that can facilitate the most efficient computation implements the centralization and hierarchy aspects of a central control model. FIG. 13 describes the central blackboard architecture. Sensor data is input into the lead MRV central database from MRV drones (1310). The squad leader organizes the data in a central repository (1320) and analyzes the data (1330) according to initial program parameters. A problem is established and a number of solutions are offered. The central database of the lead MRV computes an optimal solution to a problem and constructs instructions to send to the drones (1340). The squad leader transmits instructions to the drones (1350) and the drones attack specified targets (1360).

FIG. 14 is a representation of swarms on a central blackboard. The movement of each MRV is tracked in real time (1430) while altitude information (1440) and velocity information (1450) is available in different representation categories. The targets are represented (1460) as being mobile as well. In this way, a four-dimensional battle space that includes temporal data can be represented in a two-dimensional way. The central computer of a lead MRV can easily track the positions of targets and its own squad members. In addition, simulations can be performed for selection of an optimal method in a similar way simply by animating the organization of MRVs and targets.

As referenced earlier in the context of leader substitution, there are occasionally times when it is necessary to have external computation capabilities. There are additional opportunities in which external computation resources are needed beyond the limits of a swarm's own internal network processing capabilities. FIG. 15 describes the process of external computation resource interaction with a swarm. From the swarm (1540), signals containing program code are sent to a ground relay station (1520) for retransmission to a satellite or sent directly to a satellite (1510). The latest sensor data from the swarms is sent, via the satellite, is sent to the computer laboratory at a central command facility (1530). Mission parameters are continually refined by computer analyses based on the latest data. New programming parameters are transmitted to the satellite for retransmission to the swarm in the field for a new set of analyses or actions. In this way, substantial computation resources are available to the swarm that may be far beyond the limited scope of mobile microprocessors; this extension of resources offers a dramatic leap in intelligent capabilities.

Databases store, search for and organize data sets or "objects" in object-relational databases. FIG. 16 illustrates relations between MRV databases. MRVs receive sensor data (1610) in real time and transmit the data to the lead MRV (1615), which creates and stores a map (1620) using the data. A duplicate copy of the map is sent to the central command database via program code transmitted by satellite (1625). The sensor data is sorted in the lead MRV database (1630) and analyzed by comparing the database data with program mission parameters (1635). Enemy targets are identified by comparing sensor data with a database image set (1640). If the sensor data matches the database image set, the lead MRV identifies the enemy (1645). Once the enemy target is identified, the lead MRV selects a mission tactic (or combination of tactics) to attack the enemy (1650). The lead MRV continues to update central command by sending a copy of its latest program code via satellite (1655). The lead MRV then transmits its mission tactic selection to MRVs by using mobile software agents (1660). The MRV drones accept the signal of the software agents and process this program code to memory (1665). The MRVs activate the software program code and activate actuators that enable them to move to the optimum route to attack the target (1670). The MRVs engage in a sequence of operations (1675) that leads to successfully attacking the target (1677). If the MRVs are lost in the mission, their program code is automatically erased from the computer's database memory (1680).

There are advantages to having a degree of autonomy in MRVs. By enabling the MRVs to operate with a limited autonomy, they may shorten the time between gathering sensor information and acting against an object, particularly a mobile object with a rapidly changing position. The advent of behavior-based robotic models facilitates an increasingly interactive and robust framework for collective robotic mobility in dynamic environments. Behavior-based models employ rule-based or goal-based strategies as well as the use of intentions to develop effective action in interactive or uncertain environments. The use of behavior-based robotic architectures with groups of mobile agents is important because it allows various robotic entities to efficiently interact with each other and with the environment in real time. The closer technology gets to the real time interaction of a changing battlefield, the more relevant the application of behavior-based models becomes. Thus, squads of MRVs will use behaviors that, in combination, produce systematic action toward achieving goals.

Examples of behaviors used by robotic systems include coordinating actions between MRVs, avoiding obstacles (and other MRVs) and developing organized formations of MRVs for attacking enemy positions. Ethological examples include the coordination of ants in foraging for food, the flocking of birds and the herding behavior of wildebeests and the schooling behaviors of fish in order to avoid a predator. FIGS. 17 and 18 describe the behavior-based model used in the present invention.

In FIG. 17, swarming behavior of squads is organized by using behavior-based coordination (1710). Each squad is decentralized to pure behavior-based methods of interaction between MRVs (1720). Since these behaviors are relatively straightforward, there is no need to use computer or communication resources as much as sensor data and simple interaction procedures. Environmental feedback stimulates MRV interactions according to rules of behavior (1730) specified in FIG. 18. Each MRV responds to the environmental stimulus by activating actuators that cause each robot to move in a certain direction relative to other MRVs and to the environment (1740). By using various rules of behavior, MRVs react to an environmental stimulus (1750) and behave in a specific way that, when combined with other MRV similar behaviors, appears coordinated.

It is well established that multirobotic systems use various levels of artificial intelligence (AI). AI takes several main forms, including genetic algorithms, genetic programming and other evolutionary programming techniques that test and select the best candidate solution to problems by using crossover, mutation and random breeding mechanisms similar to biological evolution. By using AI, robotic systems can emulate intelligent processes. One way for such MRS's to emulate intelligence is to create, test and select rules of behavior. By so developing meta-rules of behavior, multi-robotic systems are able to develop first level behavioral rules that operate robot collectives.

FIG. 18 specifies some local rules and meta-rules of a behavior-based approach to robotic automation. After sensor data is transmitted from MRVs to the lead MRV (1810), the lead MRV uses "metarules" that identify situations in the environment and constructs specific rules based on initial program parameters (1820) such as the primary mission. The lead MRV then transmits the simple rules to the MRV drones (1830), which use the local rules to interact with each other and with the environment (1840). Examples of such simple rules (1850) include "move towards the center of the pack", "avoid collisions with neighbors" and "follow the leader", which are basic "flocking" principles the combination of which exhibit flocking behaviors. In another example, the use of simple "rules of the road" can be applied in order for a number of independent drivers to coordinate the driving process in a major city without error. In this way, AI can be applied to the solution of practical collective problems. Nevertheless, behavior-based approaches may require relatively little "intelligence" in order to develop and apply simple rules of behavior.

In addition to simple "flocking" rules of behavior, MRVs follow rules similar to "driving rules" in order to coordinate their actions. The combination of these rules produces a complex of behaviors that requires the constant prioritization of actions. In the following example of the application of rules for an attack, a number of contingencies exist which require environmental feedback in order to assess the use of the rules. Controllers translate behaviors to actions and answer the questions of what to do, in what order to do them and how to coordinate groups to do it.

(1) Attack target A first;
(2) Attack target A unless target B is available;
(3) Attack targets A and B, in order, unless friendly entities are detected;
(4) Attack target B only after A is completely neutralized;
(5) Attack target A only if specialist MRV is available for the strike, and;
(6) Attack targets only with two or more MRVs to accompany together for a strike.

The combined application of these rules, and other rules for planning, coordination, postponement, obstacle avoidance, interaction and formation configuration and reconfiguration of MRVs, presents a coherent model for applying rational behaviors to a changing environment. Further, the system may generate rules of operation and interaction in order to achieve a task. To do so, the lead MRV identifies a task and works backwards to create clear rules that will allow a squad to achieve this goal. This approach maximizes the flexibility and efficiency of the swarm system.

FIG. 19 illustrates the self-correcting mechanism of a squad. As the image (1910) shows, an MRV leader (1912) evaluates data from MRV sensors that detect an anomaly (1915) that conforms to an enemy target. The MRV leader initiates actions by forming a squad of nearby MRVs (1920). The entire swarm supplies data about the foreign object and the lead MRV initiates an attack sequence (1930). Since the squad created to attack the target moves away from the swarm, the swarm MRVs redistribute to accommodate the lack of this squad (1940). Though the squad attacks the target, the target not only is mobile but it fights back. The squad's MRVs evade the enemy fire, but the enemy fire is increasingly intense (1950). The swarm calls in more reinforcements to the firefight (1960), replacing the MRVs that are shot down. The squad that is attacking the enemy positions uses tactics to efficiently redistribute its configuration in the best way to achieve the objective of eliminating the target(s) (1970). This process continues (by repeating the steps 1930 to 1970) until the targets are neutralized. The self-correcting squad mechanism is a form of adaptation to the environment by reordering resources according to the intensity or breadth of interaction. In this way, a squad operates as an integrated unit.

MRVs must be fully operational in order to be qualified to participate in a squad. FIG. 20 describes this self-diagnostic process. The MRV is asked if it is capable of participating in a squad (2010). If not, the MRV ceases readiness and returns to its home base (2020). On the other hand, if, after completing a systematic check list of operational activity (2030), the MRV is fully operational, it may participate in continued missions. Once the MRV has completed a mission, the self-diagnostic function is activated (2040) again. If the MRV continues to be fully operational, it may continue on a mission (2050). If the MRV is not fully operational, new MRVs will be called upon (2060) to replace it.

The need for operational sufficiency is similar to the need for a suitable power supply. When MRV power is low (2110), the MRV either runs out of power (2120), "drops" (2150) and either self-destructs (2170) or waits for collection after erasing its memory (2160). There is also a power resupply option in which the MRV leaves the swarm to move to a power station (2130) to "get gas" or a fuel cell (recharge or replacement). In this way, the MRV can return to the swarm and continue its mission (2140). FIG. 69 illustrates the refueling process in the context of battle. Because MRVs are automated mechanical machines, and are used for tactical missions, they have only a finite power supply. It is occasionally necessary, in order for them to be involved with complex missions, for MRVs to be refueled or repowered in the field. Though MRVs are designed to be reusable, establishing a repowering system is important to a swarm's overall tactical performance.

Much as power supplies are limited, computation and communications resources are also restricted. Although the MRS behavior-based model requires more limited computation and communications capabilities than a control model, computation resources are a key constraint to the swarm system. In FIG. 22, the process for MRV behavior when computation resource limits exist is described. If episodes of restricted computation occur (2210), resource constraints create a limitation of communications between MRVs (2220). In this case, MRVs default to simple behavior-based rules to interact with each other and with the environment (2230) because the behavior-based approach requires substantially less computation. The swarm system defaults to a simpler operational mode when presented with resource constraints. With minimal computation and communication resources, squads of MRVs can operate in a behavior-based mode, particularly as they interact with their environment. Nevertheless, if internal swarm computation resources are restricted, the swarm may default to external computation resources for particularly complex analysis and decision-making by using off-site computer centers and communications. (External computation resources are described in FIG. 15, while FIGS. 70 and 71 describe the process of rerouting communication and reallocating resources, respectively, and FIGS. 79 and 80 describe the process of efficiently maximizing resource and information constraints.)

FIG. 23 illustrates the process of MRV intercommunication. Every MRV tracks the location and movements of all other MRVs in the swarm in real time (2310) by using a coded multichannel wireless communication model. The lead MRV communicates with other MRVs by sending signals specifically coded to each MRV (2320). When MRVs encounter objects in their environment, they send sensor data to the lead MRV (2330). Since MRVs are added and removed from the swarm, reinforcement MRV codes are transmitted to the lead MRV so that the new MRVs can be added to the system (2340). As the squads are created from the main swarm, select intrasquad communications are sent to other squad members via the lead MRV by using specific codes to contact the MRVs directly (2350). One of the main methods of communicating between MRVs is the use of mobile software agent computer program code (2360). By using mobile software agents, the MRV initial program parameters are continually supplemented. By implementing the use of mobile software agents that travel wirelessly between MRVs, the swarm system can use not only communications devices in a distributed network but also sophisticated computer resources. The reprogrammability capability of using mobile software agents also allows the system to reconfigure itself automatically using the communication system.

FIG. 24 shows the process of environmental interaction and adaptation of mobile networks of MRVs. Hybrid control represents a synthesis of the central and behavior-based control system aspects (2410) used in the swarm system. On the swarm level, the central control architecture is primary because of the general strategic level on which the swarm operates (2420). On this level, the coordination of a swarm's overall planning is made (2430) as well as central organization of the various squads and the hierarchy between a leader MRV and its drones. On the other hand, on the squad level, the behavior-based architecture is primary (2440) because of resource constraints (2450) and because of an emphasis on tactics and on the interaction with the environment (2460). Increasingly heavy environmental interaction (2480) requires maximum real time feedback that benefits from a behavior-based model. Similarly, immediate environmental interaction (2470) benefits from a behavior-based approach. With the behavior-based model, MRVs adapt faster to environmental dynamics (2490). Please see FIG. 1 for a clear overall view of the application of a synthetic hybrid control system.

Environmental feedback is further illustrated in FIG. 25. As the figure shows, mobile targets are moving from the left to the right (2510) while squad MRVs interact (2520) with the moving targets. Though MRV 1 has some interaction, MRV 3 has increased firepower (2530). The squad detects MRV 3's intense interactions (2540) and the MRVs then identify and attack the enemy target with proportionate intensity (2550). Later stage MRVs assess the effects of earlier attacks (2560) and increase firepower to the enemy target as needed (2570).

Given the use of artificial intelligence mechanisms in swarms, it is possible to develop a strategy at the swarm level that actually anticipates environmental feedback at the squad level and develops scenarios for interaction that improves the speed and flexibility of MRVs to respond to environmental stimuli. The automation of this stimuli-action-anticipation process leads to the development of simulations at the swarm level that squads may use for improved performance. In order to develop this anticipation process, it is necessary for the squads to learn from experience and to develop a database of scenarios that may be applied in specific similar instances. Use of these complex processes that combine both central control and behavior-based control aspects give the swarm system an advantage over purely behavior based models or purely central control based models.

Sensors internal to the swarm network are not the only sensors available to the swarm in the battlefield theatre. FIG. 26 illustrates how satellite sensor information can be provided to swarms. Since a satellite (2610) can optically map (2630) a terrain, in this case a battlefield (2650), from a high altitude, the satellite transmits (2620) maps to MRVs in the swarm (2640). In this way, MRVs can themselves be tracked by a global position system (2670) and this information can be transmitted to central command. The lead MRV can transmit data directly to central command (2675), which in turn analyzes the maps (2680). External mapping information is very useful particularly for stationary map data. This kind of information is typically a good starting point for swarm sensor data, which further enhances details of the map which tend to change rapidly in real time; the inherently mobile and distributed characteristics of the swarm network provide an increasingly accurate map of the dynamic environment, beyond what the fixed imagery of a satellite can provide. The combination of external sensor data with swarm sensor data provides a more complete, and thus useful, picture of the environment in real time. In addition, satellites can synchronize microprocessor clocks with an atomic clock at specified times for maximum precision in inter-MRV coordination processes.

The swarm network can also be used as a communication interface as illustrated in FIG. 27. Because of limited bandwidth on the battlefield at crucial times, it may be necessary for swarms to behave as a repeater. In this case, ground troops (2715) send a communication signal to a (lead MRV in a) swarm (2720) that then resends the signal to a satellite (2710), which resends the signal to central command (2730). A signal can, contrarily, be sent from central command to a swarm, via a satellite, for retransmission to ground troops. There may be emergency circumstances, such as limited range, or obstructions of damaged communications equipment, that may require a swarm's communications to be used in this way.

FIG. 28 shows the process of operation of a swarm as a mobile sensor network. As observed above, in FIG. 26, there may be multiple sensor sources for swarms, including external satellite data inputs. Thus, there are multiple sensor sources for a swarm (2810), including a swarm's linked mobile sensors (2820) and external sensors (2830). Since the swarm is a distributed network that is constantly mobile, its geometric network configurations change (2840) based on both program parameters and environmental interactions. MRVs transmit data in real time, as they are in motion in various configurations (2850), to the lead MRV, which resends the data to central command. Sensor data is analyzed by both the lead MRV and by central command (2860). Because swarms may be part of a more complex combat system, central command can use the information from the swarm, as a mobile sensor network, to synchronize the MRVs with other weapons systems (2870).

However, since the swarm is mobile, and thus data is constantly changing and updated, the collective MRV sensor data is continually transmitted to the lead MRV for analysis and to central command for analysis and review. Precisely because the swarm is mobile, the frontiers of the network configuration of MRVs access a limited environment. The swarm focuses its sensors on the most interactive parts of the environment and reconfigures its geometric contours to focus on the environment. The swarm, as a multisensor network, responds to feedback and adapts by adjusting to the most intense parts of the environment. New sensor information about the changing environment may bring new set of program parameters that will lead to a new swarm mission as the central planners construct it. The use of a swarm as a mobile sensor network is related to the mapping process described below at FIGS. 32 and 33 and to navigation and network mobility described in FIGS. 29 through 31. Use of the swarm system as a mobile sensor network is applied to reconnaissance and surveillance functions.

FIG. 29 describes the process of dynamic navigation for groups of MRVs. After satellites initially guide a swarm into the battle theatre (2910), a squad is formed (2915) for a specific mission. Up to this point, a central planning control model is used to guide the MRVs to the location of the battle. The MRV leader receives the squad MRV sensor data stream into its database memory (2920). How does the leader track the MRVs and guide them to the targets? The MRV leader takes the data sets from the MRVs and analyzes the data in its database. It then constructs a 3D optic flow map that recognizes closer objects as faster moving (2930), much as a bee uses near and far images, with light fall off, to gain perspective in order to navigate. By having a range of data sets from multiple MRVs, the lead MRV can "see" a broader range of objects than only one MRV can provide and develops a map that accommodates the group's movements. Because the MRVs are in a state of constant movement, the lead MRV constructs a map in full motion, a four-dimensional map that includes the time factor, to animate the movement of the group as it progresses to its goal (2940).

The use of multiple MRV sensor data streams provides a multipoint reference in the development of a complex and detailed spatial map that illustrates the coordination and movement of the squad through difficult terrain (2950) that may require the avoidance of obstacles and continuous course corrections. The lead MRV sends signals to the MRVs to correct their courses to correspond with its latest analysis and animation; the MRVs receive the signals and effect their actuators to move to the new course coordinates.

The squad then proceeds with its mission to attack a specific target (2960) or to provide surveillance information. As the squad progresses on its mission, the emergence of new information creates a feedback loop in which the lead MRV constantly processes the most recent data in order to construct the animation of the process of group navigation. The overall use of this process of using optic flow information to create 3D and 4D mapping is important in creating simulations to represent actual movement and to show the testing of scenarios for the best course of action. These processes are performed in the central blackboard of the lead MRV described above in FIGS. 13 and 14.

In another embodiment of the system, UAV lead MRVs can be used to guide other forms of MRVs as part of a combined MRV mission. This model, in which the lead UAV operates as an AWACS aircraft overseeing and coordinating the complex joint combat operation in the battlespace, provides strategic advantages.

There is a variety of search patterns that are employed by MRVs to efficiently map the terrain. Whether the MRVs use a number of columns, a spiral, or a wedge (leading edge of flock) formation, the search pattern used will vary depending on the terrain and the mission. The squad will use probability (fuzzy) logic in order to assess the relative completeness of the search mission. Nevertheless, it is clear that the use of a group of MRVs produces a more efficient and complete mapping process with a broader range than can be done by using only a single robot alone. The search approach determines where the squad will be guided, whereas the optic flow map and simulation approaches determine how the squad will navigate. Both of these approaches are useful to the targeting process, particularly because the MRVs can be used directly as weapons that can be themselves directed at a target. See FIG. 78 for a description of search optimization.

Though the use of simulations, hierarchy and centralization involves a priority of central control logic in the MRS, behavior-based approaches are also used at the squad level. In some cases, such as in the need to change course in order to avoid obstructions, behavior-based approaches are useful, particularly in rapid-paced real time situations. FIG. 29 describes a top-down approach that is extremely useful for plotting the organization of the mobile robotic vehicles, and FIG. 30 describes a process of group mobility that synthesizes with the centralized approach.

After MRVs receive mission parameters and are sent to a location (3010) in a series of sequences (3020) reflecting the motion of objects, MRVs anticipate contingencies such as impediments (3030). By using the MRVs sensor data inputs about the immediate range of space (3040) on their quest and analyzing the limited sensor data about obstructing objects (3050), the MRVs avoid the object and change course (3060) to randomly veer around it and to minimize the course correction so that the MRVs can continue on their trajectory. By analogy, when a herd of wildebeests or a school of fish encounters a predator, the group moves around the interloper to avoid confrontation, as the group continues on its course; the group has seen these predators before and therefore anticipates their possible interaction. The collective of MRVs can work together to avoid antiaircraft fire simply by evading it on its way to complete a mission. FIG. 4 also illustrates the changed equilibria states of this regrouping process.

One way for MRVs to move in order to maximize flexibility of operation is to use variable actions. FIG. 31 shows the use of discontinuous and variable actions of MRVs over time. After the squad initially moves into position (3110) at a staging area, the squad may wait for an hour or so (3120) until it is needed in an attack (3130). At some later time, the squad may reconfigure (3140) and reattack. The significance of these discontinuous actions is that the swarms benefit from the flexibility of change and unpredictability. Although the MRVs may move faster in open space and slower in urban or jungle areas, the use of variable speeds of operation provides a clear tactical advantage. It is also useful in evading or avoiding enemy fire to change speed and reorient until the target is neutralized. The use of swarms in constantly configuring modes requires the use of variable speeds of action. For instance, MRVs may need to wait for more information, or may need to take time to analyze information, before they act. Since they operate in highly dynamic and rapidly changing environments, this time delay is particularly suited. The flexibility available to not move directly to targets, but to linger, perhaps to operate using deceptive tactics, may be critical to a specific mission. MRVs may stop, wait, adjust speed or change directions in order to accomplish goals. The use of variable actions and discontinuous behaviors may thus be critical for the successful completion of missions.

MRVs are typically divided into four classes of UAVs, UUVs, UGVs and UHVs (please see FIG. 68 for a description) of these MRV types. The UAVs (such as a helicopter) and UUVs (such as a submarine) are omnidirectional, while the UHVs (hovercraft) are multidirectional. These MRV types can vary their speed and direction according to tactical mission requirements. In combination, the movement of groups of multidirectional MRVs that use variable actions presents an increasingly formidable force over those that travel in consistent and predictable ways.

FIGS. 32 and 33 illustrate the mapping process used by MRVs in an MRS hybrid control architecture. FIG. 32 shows how partial maps and continuous mapping processes operate. MRVs move to within sensor range of specific hostile territory (3210) and send sensor data to the lead MRV (3215), which develops an initial map of the immediate terrain (3220). The temporal process for the leading edge of the swarm (or squad) to interface with the environment occurs over a sequence of moments. As this sequence of time progresses, more information is made available as more MRV sensors acquire access to the environment and as existing leading edge MRV sensors obtain increased information. At the early stages of the progression of obtaining information about the environment, only a partial map is possible to organize given the restricted data sets (3230) after the initial parameters of the map are defined by the lead MRV mapping system (3220). However, as increasing amounts of data, with increasing accuracy, are made available, particularly by the continual repositioning around the affected region of space, increasingly complete maps are emergent and updated from newer data (3250). In addition to sensor data internal to the MRV network, external sensor data and satellite data are also integrated into the swarm's maps to provide increasingly accurate and current mapping (3260). Maps are continuously updated and refreshed by new data from all sources (3270). This mapping data is critical to the ability of swarms to move with intelligence in complex dynamic environments. Precisely because the battlefield environment is changing, there is a strong need for updated mapping information available from swarms that satellites are consistently not able to provide.

Nevertheless, satellite data is often a crucial first step in the mapping process. However, the satellite data sets are restricted by the inability to provide continuous imaging as well as the limits of a single, top-down perspective that can curb crucial information. Therefore, it is necessary to identify methods to obtain accurate, timely and sophisticated imagery that goes beyond the limits of the satellite feed. FIG. 33 illustrates a process of using swarms to obtain three-dimensional mapping topology. The MRVs' sensor data is synchronized with satellite data mapping information (3310). The MRV sensor data is superimposed with the satellite sensor data (3320) and a new map is created with the superimposed sensor data (3330). MRVs use one of a variety of search patterns (described in FIG. 29) to obtain information, which is then used to produce efficient three-dimensional mapping (3340).

Since the MRVs operate in a geodesic spatial configuration, their distance from each other provides different perspectives; these varying perspectives can be synchronized and merged into a coherent view that goes beyond the limited two-dimensional view of any single MRV. By using specific search patterns that optimize the MRVs' capacity to obtain collective sensor data, it is possible to coordinate their actions and their sensor data sets in order to obtain three-dimensional mapping information that is useful for developing simulations for the swarm's performance. (Please see FIG. 78 for a description of optimal search patterns as well as FIGS. 73 and 74 for a description of various geometric configurations.) In addition, MRVs adapt search patterns in order to maximize time-sensitive 3D maps (3350), particularly for time-sensitive missions in dynamic environments. As the MRVs' physical geometric configurations are altered, new maps are created which superimpose new sensor data and so on. The net result is that continuously updated sensor data that benefits from a postponement approach and builds complex maps with detailed contours (3360) that are more robust and useful than simple satellite images. In order for swarms to be effective, they must be able to see and organize information in a timely manner as much as possible.

Software agents are software program code that transfers autonomously from computer to computer in order to perform specific functions. Mobile software agents are useful in swarms because they allow initial program parameters to be updated as the MRVs progress into complex missions. Mobile software agents are transmitted wirelessly from central command to MRVs (and satellites) and back again, and from lead MRVs to drones and back again, in order to supply critical programming information and decisions that will affect collective behaviors and mission outcomes.

The use of mobile software agents is described in FIG. 34. Mission parameters are sent to a satellite from central control in the form of software agents (3410), which are then resent to the lead MRV (3420). Software agents then transfer data and code from the lead MRV to the drones (3430). Swarm program parameters are updated by the most recent program code presented by the mobile software agents (3440). The effect of incoming software agents is that the autonomous agents reorganize the MRV program code (3450). By transforming the software code configuration in the MRVs, the mission parameters are shifted and the MRVs adopt new behaviors by performing new functions and organizing into new configurations that are better suited to accomplish the mission. Once the new software code is activated, specific hardware functions are performed (3460). This process of accepting new mobile software agent code and data repeats as often as necessary. By using software agents that are transmitted with mobility, the MRVs are able to adapt on the fly.

One of the key aspects of swarms is the ability for MRVs to aggregate into unique configurations and then to reconfigure these formations as necessary in response to the environment in order to accomplish their mission. FIGS. 35 through 42 describe the important aggregation (and reaggregation) process(es). (See also FIGS. 73 and 74 for a review of solutions to geometric aggregation optimization problems.)

FIG. 35 shows how swarms are aggregated by initially forming MRVs into squads. After the forward MRVs forage for data (3510), sensor data is sent to the lead MRV from drones (3515) where the data is analyzed and decisions made for an attack. The lead MRV then issues specific orders for the attack to specific MRVs. The lead MRV "invites" MRVs to a specific mission (3520). The MRV drones that participate in the mission share common goals with overlapping interests. The MRVs form a squad with a common interest (3525). The squad may be formed based on the MRVs' unique spatial position or on their distinctive specialty (3530). The squad is aggregated into a collective of MRVs by constructing a specific geometric configuration, though the precise spatial configuration is contingent on squad priorities (3535), such as the target order and the intensity of environmental interaction, as well as the squad's size and the specialization of the MRVs.

The response to the environment precipitates MRV actions and reactions (3540) since the squad, though spatially organized, is also temporally active. As specific enemy targets attack the swarm, particular squads are formed from common interest MRVs to attack the target (3545). As sensor inputs change reflecting a changing environment and as mission goals change, the lead MRV analyzes the data and makes decisions about the configuration of the squads (3550). The squad attacks specific targets (3555) while surviving MRVs rejoin the squad for further attack sequences (3560). Once the mission is completed, the surviving squad members rejoin the swarm (3565). FIG. 73 also describes the optimal geometric configuration for groupings of MRVs.

The initial phase of the aggregation process involves organizing MRVs into one of a variety of main squad formation configurations. These formations include the column, the line, the wedge, the diamond, the geodesic sphere and the geodesic wedge, which are optimized for different primary uses. Variations and combinations of these main formation structures may also be used.

In FIG. 36 the squad organization is further elaborated in the context of the swarm response to the environment. As the environment provides increased feedback, for instance, in the intensity or quantity of MRV sensor inputs (3610), sensor data is provided to the lead MRV (3620). The lead MRV waits for a specific threshold to be reached in the sum of environmental feedback before it triggers the formation of a squad (3630). The smallest number of MRVs is organized into a squad in order to achieve the mission of successfully attacking the target(s) (3640). The closest or most specialized MRVs are selected to join the squad (3650). The selected MRVs transition to the process of actually forming the squad into a specified configuration (3660). The squad is led by the designated squad MRV leader (3670) and the squad progresses to complete the mission (3680).

The MRV decision-making process is described in FIG. 37. Initial mission program parameters are first transmitted to MRVs (3710) in order to initialize the swarm system. The relative environmental intensity, composition and quantity of feedback are input into the MRV sensor system, which is then transmitted to the lead MRV (3720). The sensor data is weighted by the lead MRV and ranked by priority of importance according to the intensity of feedback (3730). The sensor data is further interpreted by the lead MRV by comparing the data sets with mission parameters (3740) and then the lead MRV calculates various possible simulations to meet mission goals (3750). Candidate simulations are tested using the available information by representing the data in a range of possible scenarios as the most efficient way to achieve the mission (3760). The optimal simulation is selected by a comparison between the tested simulations with the initial parameters (3770). If new methods of selecting the optimal simulation, from among the candidate simulations, are sent to the lead MRV (via satellite) from central command using mobile software agents (3775), then the optimal simulation selection process is refined by the new information or program parameters. The lead MRV transmits selected instructions to the MRVs (3780) and squads are formed in an optimal geometric configuration for each mission according to the winning simulation (3785). See also FIG. 72 for a description of the construction of optimal simulations.

Once a decision is made, one way for the lead MRV to determine how to actually accomplish a task is to identify a goal and then to work backwards to develop a specific plan. The mission is broken apart into a series of tasks, each with specific instructions. The analogy for a single robot to determine this goal and related tasks needed to achieve them is the pastry chef. The general goal of completing a batch of pastries includes figuring out how to complete the parts in order to complete the task at a specific time. However, the model extends to a group of MRVs because the head chef (lead MRV) orchestrates the construction of meals by organizing the various chefs to complete their parts of the overall job of feeding a restaurant full of patrons in a specific order in real time. The lead MRV must use the logistics process in order to calculate the best way to achieve specific actions by organizing the MRVs. The lead MRV must plot locations of other MRVs, enemy targets and the overall terrain, calculate the positions and timing of MRVs for an attack and coordinate the process of the attack on targets.

FIG. 38 shows the dynamics of squad behavior by analogy to an octopus. Since the octopus has a number of legs and one central processing center (brain), it can move its legs in various configurations. When hunting for food, it behaves as a predator by attacking its prey. In illustration A (3810), the lead MRV is designated by the double circle, which directs the other MRVs. But in illustration B (3830), the MRVs' geometric configuration has changed. In the case of the analogy of the octopus, the legs are extending in order to trap its quarry to prevent it from escaping. The MRV squad behaves like a wireless octopus by interacting with its environment in a coordinated fashion. Finally, in illustration C (3850), the legs of the octopus reposition again. Similarly, the squad of MRVs reorganizes in order to better attack its target.

The use of biological and ethological analogies abound in robotic research, particularly in order to draw analogies with animal behaviors, an example of which we just described with reference to a single animal. Ants, bees, fish, birds, wolves and wildebeests are all used to show examples of behaviors that are similar to robotic behaviors that may be very useful in a variety of applications. Whereas some biological analogies have focused on a single animal, such as the behavior of a multilegged octopus as it coordinates the operation of its legs for hunting, another important biological category focuses on collective behaviors. For instance, the systematic operation of a group of ants is a fascinating study in how computationally restricted insects can work together as a sophisticated collective. The same can be said for a hive of bees. The robotics literature has developed a segment that seeks to understand, and to emulate, the behaviors of insects and animals, which have evolved over millions of years to develop complex self-organizing systems which can evade predators and survive in hostile environments.

Biodynotics means biologically inspired dynamic robotics. It was developed by the U.S. military in order to develop specific robot entities that may emulate animals or insects in order to survive in hostile conditions such as high sea currents or high winds with minimal effects. Since many examples of biological or ethological systems involve groups of insects or animals working together as a collective, it is important to design an MRS that describes the dynamics of biologically inspired models of behavior in the context of groups rather than isolated robots.

FIG. 39 illustrates an example of swarms used as collective biodynotics. In a sense, the entire swarm system, and its methods thereof, embody this approach. Swarms may be disguised as flocks of birds, schools of fishes or herds of animals (3910) in order to blend into an environment with camouflage (3920). Because they are disguised, a number of MRVs in a swarm, such as in specific squads, perform an active function (3930) compared to their camouflaged brethren. These groups of MRVs use collective behaviors to emulate biological groups (3940) in the field. Various behaviors can be used by swarms to emulate collective biologically inspired behaviors. An example of this is illustrated in FIG. 59, which describes wolf pack dynamics. Though this example is most applicable to tactical situations, there are other examples of strategic as well as tactical advantages of using swarms by emulating collective biological behaviors.

FIGS. 35 through 37 the general aggregation process, the regrouping, or reaggregation, process is described in FIG. 40. After swarms break into squads for specific missions (4010), squad formations are in stable equilibrium (4015). However, because environmental interaction changes the original squad configuration (4020), the swarm fans out in various patterns corresponding to changing patterns (4025). Specialist MRVs are drawn into a specific new squad corresponding to original and adapted mission parameters (4030) and the squad reconfigures into new groupings (4035). Reinforcement, straggler (leftover) or specialist MRVs are accepted into the new squad (4040). By this time, however, the first squad configuration has changed markedly by earlier attacks and their effects and has reduced the ranks of MRVs. The new squad configurations conform to the new mission (4045) of attacking new or changing targets and reaggregating MRV drones enable a specific new mission to be performed (4050). The squad recomposes to new geometric configurations in order to accommodate updated mission parameters (4055). The squad then anticipates further environmental changes based on analysis and interpolation of the data (4060), which precipitates the squad to constantly reconfigure into dynamic geometric positions in order to complete the new mission (4065); this process continues as specialist MRVs are drawn into newly organized squads to complete newly organized missions. Once the mission is completed, the squad may be reunited with the swarm (4070). FIG. 74 describes optimization for the dynamic geometric reconfiguration process.

One of the advantages of using a synthetic hybrid control system in the present system is that the synthetic approach combines behavior-based approaches for rapid environmental interaction capabilities with anticipation of the enemy's next move in order to create an extremely efficient and flexible model. However, in order to be able to anticipate the enemy's actions, it is necessary to have experience with the enemy primarily through interaction. Consequently, the reaggregation process of restructuring the squad configuration for additional attacks involves the combination of central control with behavior based control approaches. Since the mission is rarely completed after a first strike, the reaggregation process is critical to the swarm system.

In addition, multiple squads can be coordinated at the swarm level by using lead MRVs that organize different kinds of squads (or different specialist MRVs) for common missions. The coordination of squads that work together in this way is a key aspect of the reaggregation process since it is primarily through regrouping, even of mixed types of MRVs, that complex missions are completed.

FIG. 41 illustrates how a squad (4110) has two MRVs knocked out and is diluted (4120). However, reinforcements are provided (4130) to reconstitute the squad for a further mission. Many MRVs may be added if necessary in order to overcome a particularly intransigent target. See also FIG. 4 for a similar description of the changing configuration of a squad in the context of changing equilibria over time.

FIG. 42 describes the process of problem solving of MRV groups. The squad has a problem of a need to find the best way to interact with its environment and seeks a solution (4210). Sensor data from MRVs are collected, compared, weighted and ranked for evaluation by the lead MRV (4220). The lead MRV generates candidate algorithms to solve the problem (4230) and thereby generates candidate solutions by comparing the ranked information distilled from analyzing the environmental sensor data with its program parameters (4240), much as simulations are tested for an optimal selection. The lead MRV selects priorities of solution candidates and selects an optimal solution (4250). But as the environmental inputs change, candidate and optimal solutions change (4260) as well, and so a feedback loop emerges that continues to obtain and interpret new information, which, in turn, affects the selection of optimal solutions, until the mission is finished. This process illustrates the postponement control architecture application inherent in the swarm hybrid control system. FIG. 37 also describes decision making and FIG. 72 describes the winner determination of simulations.

Military Applications

Whereas the previous figures represent general swarm methods and techniques of organization in a complex system, many of the following figures represent specific applications. FIGS. 43 through 46 show specific swarm functions, FIGS. 47 through 53 show specific examples of swarm tactics and dynamic behaviors, FIGS. 56 through 58 show how swarms can be used in structure penetration and FIGS. 61 through 66 show complex behaviors involving swarm integration or interaction with other weapon systems.

There are several main types of function of swarms, including offensive, defensive and neutral. FIG. 43 describes the neutral swarm functions of surveillance and reconnaissance. After the swarm creates a squad (4310), the squad operates as a distributed mobile sensor network (4320). (See FIG. 28 for a description of a mobile sensor network.) The squad's MRVs collect sensor data (4330) and then map terrain (4340) according to an efficient mapping pattern of movement (4350). (The mapping process is described in FIGS. 32 and 33 whereas the optimal search pattern is described in FIG. 78.) Mapping data of the terrain is transmitted to the lead MRV and duplicate information is transmitted to central command (4360). The process continues as MRVs continue to collect sensor data. By repeating these general steps, MRV squads may perform reconnaissance missions and surveillance missions. Most active swarm functions involve the need to collect, analyze, interpret, judge and act upon information that is collected in this passive way.

FIG. 44 describes the operation of defensive swarm functions. In the defensive context, a squad initially operates in a neutral mode to guard the perimeters of a specific location (4410). The squad interacts with the environment (4420) and the MRVs identify the enemy position(s) for targeting (4430). MRVs in the squad examine and detect high frequency enemy opposition (4440), analyze enemy behavior (4445) and anticipate enemy behavior (4450). The enemy attacks MRV (or other friendly) positions (4455). After evading the enemy attack(s) (4460), MRVs transform from a defensive (or neutral) mode to an offensive mode (4470). MRVs attack specific enemy position(s) (4480). Since the enemy is continuing to attack the squad as it responds, the squad's MRVs continue to evade enemy fire even as they attack the enemy position(s). The firefight continues until the enemy is neutralized.

FIG. 45 is a list of offensive swarm functions. These offensive functions include clearing, targeting, carrying and exploding munitions, firing external munitions (such as a rocket, missile, torpedo or bomb) and refueling. In addition, MRVs are capable of being used for nonlethal warfare by using tranquilizer gas, electric shock, sound disabler and electromagnetic pulse to disable electronic equipment. These applications are used in a variety of tactical scenarios described below in FIGS. 47 through 53, 56 though 58 and 61 through 66.

One fascinating application of the swarm system uses MRVs as intelligent mines that convert from a neutral state to an active status, described in FIG. 46. This important function can be very useful in air and land as well as underwater venues. MRVs in a squad patrol a specific area (4610) such as the waters around a port. The MRVs may be immobile or may move in a concerted way to maximize coverage of a limited area. The MRVs detect an enemy moving into their field of sensor range (4620), convert to active status and configure into an active squad (4630). The MRVs attack the enemy (4640). After a successful attack, the MRVs may return to patrol status (4650) and proceed back to their neutral status at the start of the process or the MRVs rejoin the swarm after the mission is completed (4660). Despite the common use of mines (or depth charges) in sea environments against ships or submarines, this model can also be used for land mines by using camouflaged UHVs as well as for air mines that hover in a specific spatial configuration for use in attacking air borne targets. See also the discussion of UUVs below at FIG. 61.

FIG. 47 illustrates a simple unilateral tactical assault on a target (4740) by a squad (4710).

FIG. 48 illustrates a swarm (4810) that creates squads A (4830) and B (4850), which in turn outflank and attack the target (4870).

FIG. 49 illustrates how swarms attack a beach in a littoral assault of fortified targets using UHVs and UAVs. In this tactical model, three ships (4970) launch swarms (4950) of MRVs in twelve squads which move across the beach (4930) to attack fortified enemy targets X, Y and Z (4910).

FIG. 50 illustrates an example of the dynamics of using the swarm system. This example describes a gambit in which two MRVs, A (5030) and B (5020) are sacrificed by attacking the target X (5010) in order to obtain information crucial to the swarm (5060). The sacrificed MRVs transmit sensor data wirelessly to other MRVs (5040 and 5050, respectively), which then provide the information to the swarm for evaluation by the lead MRV. Information that is transmitted to the swarm from the sacrificed MRVs may be precise enemy positions, armament and preparedness status, which may be necessary for the swarm to analyze the enemy's strengths and weaknesses so that it may launch an effective attack. Accurately interpreting enemy dynamics, tactics and strategies are key to strength assessment. The sacrifice in the MRVs results in the swarm achieving a tactical advantage.

FIG. 51 illustrates a swarm in the process of multiple waves of regrouping. In this example, a first wave of attacks by squad A (5120) and squad B (5130) against the enemy target X (5110) results in damages to some MRVs in the squads. The squads regroup for a second wave of attacks on the target (5140 and 5150 respectively) and, finally, regroup again for a third wave of attacks on the target (5160 and 5170 respectively). Squad behaviors are coordinated at the swarm level.

FIG. 52 illustrates how squads of MRVs anticipate, and strike, a mobile enemy. Three squads of MRVs, shown here as A, B and C (5210, 5260 and 5280 respectively), anticipate the trajectories of mobile enemy targets X, Y and Z (5220, 5250 and 5290 respectively). As the mobile enemy targets move to new positions (5230, 5240 and 5270, respectively), the squads attack the enemy targets at their latest locations because they have anticipated the most likely locations and efficiently calculated the fastest route to meet them. The anticipation of specific actions involves an analysis by lead MRVs of probable scenarios that the mobile enemy can most likely be expected to perform. These expectations and scenario options are integrated into the logic of simulations used by lead MRVs to guide squads.

Though it would be utopian to hope to fight an enemy that does not fight back, FIG. 53 shows that MRV dynamics involve a complex interaction with an evasive and attacking enemy that requires swarms to attack, reconstitute and strike multiple times by using anticipatory intelligence. Enemy targets X (5330), Y (5355) and Z (5370) move to new positions X2 (5345), Y2 (5350) and Z2 (5365) while attacking squads A (5310), B (5340) and C (5360). Though the squads lose some members, they move to new positions in order to evade the enemy attacks. In the case of squads B and C, the main swarm reinforces the squads with supplemental MRVs for the continuing attack on the mobile enemy targets. In their new positions and new configurations, squads A, B and C attack the mobile targets in their most recent positions. Y2 (5350) and Z2 (5265) are attacked by the squads B and C from their most recent positions at B2 and C2. In the case of Y2, the B squad moves again to position B3 and completes the attack. However, X moves to position X3 (5320) where it is attacked first by A squad in position A2 and, finally, in position A3. Z moves again to position Z3 where it is finally neutralized by squad C at position C3. This example closely resembles the realities of warfare in which swarms will be used.

FIG. 54 shows how MRVs may launch micro-MRVs. A larger MRV (5410) releases (5440) the smaller MRVs (5470). This maneuver is useful in order to preserve the power supply of the micro-MRVs. Micro-MRVs are very useful for reconnaissance and surveillance missions.

FIG. 55 illustrates the recognition capability to identify noncombatants and friendly troops. In this diagram, the battle theatre (5550) is clearly marked as the boundary of area that coincides with the maximum possible range of the trajectories of weapons. Outside this range of space lie innocent civilians (5510) and friendly troops (5520). Two methods are used by swarms to distinguish friendly parties on the battlefield. First, the physical space may be marked as off limits. For instance, as this illustration shows, the MRVs (5530) enter the battle from an angle that is parallel to the friendly troops and is clearly delineated by a line to prevent attack of civilians. The second approach provides a microprocessor with a specific code to innocent players that mark them as noncombatants or as friendly troops. The MRVs avoid an entity that has the coded chip.

FIGS. 56 through 58 show examples of structure penetration by swarms. In the case of FIG. 56, a squad penetrates a house. UAVs are used to enter a window (5620) or to blow a hole in the building (5650) to allow squad members to attack the enemy (5630). This is a clear application of the gambit. Once they have penetrated the house, the squad proceeds to neutralize the target.

A similar approach is used to penetrate a ship. In this case, several MRVs are used. FIG. 57 illustrates how UAV squads X and Y (5710) and T and M (5720) and UHV squads Z, R and S (5725) are used in combination with UUV squads A, B and C (5740) to attack a ship (5730). Once the MRVs are on board, they will open holes in the ship by detonating explosive MRVs in order to allow further MRVs to neutralize targets. This is another application of the gambit.

In FIG. 58, an underground facility is penetrated. Squads of UAVs (5820) and UGVs (5830) work together to penetrate an elevator shaft (5850) and air vent (5860) in order to attack targets (5870 and 5880).

FIG. 59 illustrates the use of wolf pack dynamics by squads. This is an important example of collective biodynotics because it shows how swarms of MRVs may emulate an attack by a group of automated robots on a single target X (5940). In this case, the MRV A (5920) and the MRV B (5960) attack the target from different positions, first at position 1. But the MRVs withdraw after the initial attack and move to position 2. The MRVs withdraw again and move to position 3. This process may continue until the target is neutralized. In most cases, the target is itself mobile, so the wolf pack analogy provides that the MRVs track the quarry until it is disabled or neutralized. In FIG. 60, another example is provided of an alternating attack sequence similar to a wolf pack attack. In this example, the MRVs attack the target X (6010) from the positions (6030 and 6050) in the order of sequence illustrated, moving from one position to another in an alternating sequence. One of the distinctive aspects of the "packing" tactic is the "switching" from position to position, as illustrated in FIGS. 59 and 60.

The alternating attack positioning process accommodates the continual movement and evasion of the enemy target, which the wolf pack dominates with its speed and multiposition attack sequence. By transmitting the most recent data to all pack members, MRVs that are lost in the attack can be replaced without losing information gained in the attack (demonstrating a form of a successful gambit tactic). MRVs may also use different strategies for dynamic wolf attacks. On the one hand, a squad lead MRV may send in two or more MRVs for a continual attack process. In effect, the MRVs are set up to compete with each other in order to successfully attack the target, much as two wolves compete in order to attack their prey. On the other hand, a squad lead MRV may send in at least two MRVs to hit the target once and move on to the next target while later MRVs will hit the target again, and so on, thereby utilizing the squad resources most efficiently in the larger context of striking multiple targets in the mission. The application of the logic of packing behavior presents swarms with an optimization problem that lead MRVs must solve for each mission type.

One of the advantages of using wolf pack dynamics in practice is that swarms may identify the strengths and weaknesses of an enemy target and strike the weakest places. As the enemy adapts to respond to the attack(s), the squad adapts as well. The squad may anticipate the enemy response to its attack or it may simply attack another place in the enemy target so as to achieve its method of efficiently neutralizing the target. By using multiple simultaneous attacks in a wolf pack type attack, the squad maximizes the effects of its tactics by alternating strikes in multiple locations for optimal effect.

The specific tactical maneuvers, procedures and techniques described above in FIGS. 43 through 58 are useful in joint attacks illustrated in FIGS. 61 through 64.

In FIG. 61, combinations of MRV types, including squads of UAVs (6120), UHVs (6130) and UUVs (6140, 6145 and 6170) are illustrated as attacking several ships (6110) and a submarine (6160). An additional squad of UUVs (6150) is used in a defensive mobile mine mode.

Hydrodynamics provides unique constraints for UUVs that are not applicable for other MRV types. The limits of operating under water present problems of visibility and communications that constrain the operation of swarms. But swarms are designed to overcome these problems precisely by working together.

In order to overcome the limits of communications when operating under water, UUVs work together in tighter patterns and use UUVs as "repeaters" to reach other UUVs at a longer range. In addition, lead UUVs may rise to the surface in order to intermediate signals between UUV drones and central command or to perform other functions such as launching micro air vehicles or UHVs.

Underwater domains not only possess communication constraints, but they also have a particular problem with obstacles. There is a need to identify and avoid obstacles, including the sea bottom (on which they may get stuck and immobilized). Consequently, UUVs have a higher priority to identify and avoid the sea bottom and other junk. In order to be able to avoid the sea bottom, the UUV needs to know the depth range from sea level to the bottom, and must increasingly be able to interact only within this limited range.

UUVs have a slower movement under water than other MRVs have in air because of the higher density of the hydro medium. The far more limited visibility of underwater environments also limits the speed of movement of UUVs. Note that schools of fish accomplish this task by moving relatively closer together than, say, flocking birds. In a similar way, UUVs must generally work in squads by operating closer together. As a consequence of these limits of movement, there may be a more limited coordination with other MRVs except when UUVs are surfacing.

UUVs require special sensors in order to operate under water. Targets are difficult to distinguish and are hard to differentiate from junk. Increasingly detailed detection and data acquisition processes are needed in this difficult environment. Though UUVs may use lights to supplement their sensors in nonstealthy situations, sophisticated sonars—such as (forward firing) synthetic aperture sonar that focuses sound waves on the same spot up to a kilometer away exposing greater details—are necessary to detect targets accurately. Object recognition is performed in these environments by comparing sensor data with database information in order to identify targets.

Because of the mobility and sensor constraints, UUVs must use increased efficiencies in order to accomplish time-sensitive missions. Consequently, UUVs tend to be multifunctional, operating super-efficiently with multiple specializations. Groups of multispecialized UUVs will more completely and quickly achieve mission goals than previous underwater weapon systems thereby providing the U.S. Navy with competitive advantages.

Specifically, groups of UUVs are used to identify and attack enemy submarines, torpedoes, depth charges, mines and divers. Teams of UUVs may be used as intelligent torpedoes or mines (see FIG. 46) and used to throw off (trick or deceive) enemy depth charges or torpedoes and thereby protect submarines. UUV squads can be used as sea sentries in order to patrol ships as well as docks in harbors. Finally, UUVs can themselves fire intelligent torpedoes or mines. Used in these ways, a collective of UUVs on attack missions emulate a pod of hunting whales with great effectiveness. Teams of UUVs will increasingly achieve mission goals more completely, efficiently and flexibly than any other weapon system in this venue.

FIG. 62 shows a joint land assault in which a trap is set by using a combination of swarms. In the first phase (from the right side), two marine UHV squads (6210 and 6245) are launched from ships (6240) on target X at position X1 (6225). Seeking to evade the squads, the enemy target moves to position X2 (6230), where, in phase II, a UAV squad A (6215) and a UGV squad A (6250) attack the target. Again, the target moves back to position X3 (6235) and is attacked, in the third phase by UAV squads B and C (6220) and UGV squads B and C (6255). The trap is set and the enemy has fallen back to be neutralized by the joint operation. One way for traps to work well, as illustrated in this figure, is for swarms to maintain the ability to push the enemy into ever-smaller zones. By assessing and attacking enemy weakness, and by maintaining overwhelming force and speed, traps provide sustainable combat advantages.

FIG. 63 illustrates the use of MRV squads providing advance cover for infantry in joint battle operations. The targets X (6347), Y (6343) and Z (6340) are attacked by squads, first, of UAVs and then UGVs (6330, 6333 and 6337), followed by infantry tanks (6320, 6323 and 6327) and, finally, by infantry artillery (6310, 6313, 6317). The tanks and artillery may be used in a various tactical ways, for example, by the artillery pinning down the enemy while the tanks move to cut off the enemy in a trap. In any scenario, however, the use of swarms is similar to the use of close air cover in combined operations. This approach is ideally suited to the urban environment.

Swarms fit in well with the Future Combat System (FCS) developed by the U.S. military. FIG. 64 illustrates an example of the joint interoperable integration of swarms with the FCS. Ships, aircraft, tanks and ground troops are linked in a network with central command via satellite communications. Targets are attacked by various sources, which supply data to central command about the targets. In this case, Target 1 (6450) is attacked by a UAV squad (6440) and by a J-DAM bomb dropped from a jet (6420). Information about the location of the target may be provided by UAVs and by ground troops. In the case of Target 2 (6460), a UAV squad (6440) and a UGV squad (6430) attack the target along with infantry (6470). Ground troops (6480) can move to take the area around the targets after the strikes are completed. Central command (6475) can coordinate the joint strike teams.

FIGS. 65 and 66 show the interaction between automated swarms. In FIG. 65, the Alpha squad (6520) initiates an attack on the Beta squad (6540), which in turn responds to the attack. The attack is both multilateral, including the interaction between multiple MRVs, and dynamic. FIG. 66 illustrates how the dynamic tactical combat between robotic groups occurs, with each MRV attacking the opponent team's MRV while leaving its own squad members intact. After identifying the opponent MRV, multilateral mobile combat results in both sides being worn down. Both swarm teams employ complex tactics and strategy to seek a competitive advantage.

Game theory presents complex models for two-player games. As the number of players increases, the complexity generally increases. The interaction between MRVs in an inter-MRV combat presents very complex dynamics that can be illustrated by using game theoretic modeling. By simulating the interactions between MRVs, the lead MRVs organize complex tactical behaviors into efficient geometric formations and reformations. Multiparty inter-MRV interactions are modeled by using game theoretic simulations that seek to provide optimum scenarios that give MRV squads competitive advantages on the battlefield. By utilizing the advantages of speed, flexibility and team organization, the MRVs seek to optimize their capabilities in order to complete their tactical mission against other MRV squads.

One of the techniques employed by swarms is the use of evasive maneuvers, described in FIG. 67. After a mobile object is fired at MRVs (6710), MRVs assess sensor data to detect the trajectory and velocity of the object as well as its source (6720). The MRVs anticipate the hostile mobile object's trajectory going forward in real time (6730) and change their velocity and position to avoid interception with the mobile object (6740) by using random evasion patterns (6750). MRVs may intercept or fire on the hostile mobile object to destroy it (6760) and continue on the mission (6770). The MRVs use random evasion patterns that only use the minimum rate of change needed in order to avoid an obstacle and to continue with the mission. In addition, by utilizing variable rates of speed, MRVs may simply wait for the hostile object to pass before accelerating on the mission. Finally, MRVs may actually activate a shielding apparatus when defensively necessary in order to allow them to withstand an enemy hostile weapon.

FIG. 68 shows a taxonomy of weapon hardware systems, including UAVs, UGVs, UUVs, UHVs and other devices of various sizes, from medium- to nano-sized. Though MRVs can be much larger, for instance the size of a large bomber or submarine, the main idea is that collectives of MRVs are used to accomplish complex multi-agent tasks with mid-sized and small-sized vehicles that are far more flexible, inexpensive and reusable that current large drones or manned weapons. The prototypical MRV type is the automated helicopter, which may come in various sizes, because it is omnidirectional. Though the UHV hovercrafts and UUV submarines, which come in various sizes, are multidirectional, the omnidirectional capabilities of the helicopter are well suited to the variable requirements of MRVs. By using collectives of moderately sized MRVs, the opportunity exists to develop a much more effective fighting force than any other class of weapon system. The following is a discussion of the computation, communications, sensor, power, materials, weapons and specialty capabilities of MRVs.

There are limits to computation capacity individual MRVs and collections of networked MRVs. Nevertheless, with increasing microprocessor power, it is possible for individual MRVs to process multiple giga-ops (billion operations per second) of program code. By using external computing capability, the limits of processing are overcome, on the higher end. On the lower end, it is possible to network thousands of tiny robots by using a new generation of extremely small RF chips (less than a half of a millimeter square) from manufacturers such as Hitachi (mu), Philips, and IBM. These tiny chips are useful in ant-sized MRVs, which can be used in combination for surveillance missions MRVs have a narrow communication range specifically in order to communicate with others in the squad, but not so broad that they will be unduly influenced by noise. MRVs use specific coded bandwidth that may be changed from channel to channel in order to maintain security and overcome the limits of constrained bandwidth. Lead-MRVs also have satellite and higher bandwidth range communication capability. It is, however, possible to use off-the-shelf components for most communication and computation resources. Refer to FIGS. 23, 26 and 27 for a description of communications aspects of MRV operation.

MRVs use a number of different sensors. For UAVs, radars, infra-red sensors and heat-seeking sensors are used. Synthetic aperture radar is useful to focus a narrow signal on the same location for greater resolution. For UUVs, sophisticated sonars may be used, including side scanning sonar, forward looking sonar and synthetic aperture sonar (described above at FIG. 61). Sensors may be used in complex arrays in order to increase the collection of sensor data. Other types of sensors will also be used with the aim of providing maximum information to MRVs. MRV sensor operation is described in FIGS. 24, 25 and 28.

MRVs may obtain power in various ways. MRVs may use engines, turbines or motors, which use different kinds of fuels, fuel cells and batteries. The main challenge is to develop ways to maximize the power source for increased range of use. Because all power sources are limited, it is necessary to develop repowering capabilities in the field in order to extend mission effectiveness. Repower capability is described in FIG. 21 and illustrated in FIG. 69. In addition to repowering MRVs in the field, some MRVs may be used to resupply specialist MRVs automatically in the Battlespace while others may recover MRVs that are disabled.

Some MRVs are intended to be radar evading by allowing them to fly below radar. Others, however, may be radar evading by the use of materials. Since most radar is not sufficiently sensitive to detect birds, bird-sized UAVs can be used to evade radar as well. If they cannot evade detection, some MRVs will employ shielding material in order to protect them against attacks.

MRVs are weapons or may be weaponized. Some MRVs will contain high explosives (C4, symtex, etc.) and steel balls. Other MRVs will merely fire weapons such as rockets, grenades and automated rifles. In addition to lethal weapons, some MRV weapon systems will have nonlethal capabilities such as sound waves, electric shock, tranquilizers and electromagnetic pulse (EMP) shockwave capabilities. (Swarms are designed to reboot to defeat some of these electrical weapon types.) The larger the MRV type, the more likely it will fire weapons and be reusable, while the smaller the MRV, the more likely it will itself be a weapon that is nonreusable. Finally, most reconnaissance and surveillance MRVs will be relatively smaller and will work in groups in larger networks.

Different types of MRVs may work together for increasing mission effectiveness. UAVs may work with UGVs and UHVs, for example. These mixtures of groups of MRVs, also known as joint combat resources, will be used in sophisticated strategic missions. FIGS. 61 through 64 illustrate these joint assault models.

UHVs have the distinct advantage of being able to operate on both land and sea, which gives this MRV class properties that are useful in littoral (beach) missions. FIGS. 49 and 62 shows beach assaults.

Different types of MRVs will possess different specializations or combinations of specializations. These specialized differences include sensor differences, armament differences, communication differences, computation resource differences and other hardware and operational differences that make them useful on specific missions. The combination of a variety of specialized MRVs in a swarm collective provides distinctive capabilities and competitive advantages on the battlefield.

Different types of MRVs can launch other MRV types. UAVs can launch UUVs, UHVs and UGVs. UGVs can launch UUVs, UAVs and UHVs. UUVs can launch UAVs and UHVs. UHVs can launch UGVs, UAVs and UUVs. This capability is extremely useful for stealthy missions.

FIG. 69 illustrates a swarm battle recirculation process. In this example, a swarm enters the upper far right side of the battlefield and operates by making a loop around the area. As the swarm moves in an oval pattern, it sends squads to fire on targets marked by X's. As it continues around the battle theatre, the swarm is resupplied at different points. As MRVs lose power, they depart the battlefield for a pit stop and refuel for a return to the battle. The process continues until the enemy is neutralized. At the end of the battle, the swarm returns home.

Optimization Solutions

Optimization problems figure prominently in multirobotic systems. Matters regarding how to decide which path to take in the context of such important issues as the best use of resources, the method of selecting the best simulation, the way to choose the optimal geometric configuration or the most efficient way to attack an enemy target are critical to organizing an effective group of automated robots. FIGS. 70 through 76 and 78 through 81 describe solutions to several key optimization problems.

FIG. 70 shows how to reroute the network to the most efficient route. After encountering an enemy force (7015), the swarm analyzes the most intense enemy concentrations (7020). The closest MRVs to engage the enemy force are the most active, while those that are as yet unengaged are the most passive (7025); this is determined by accessing MRV sensor data (7030). The most active MRVs are given a higher priority of communication so that they have the capacity to maintain their increased activity on the frontiers of the environment (7035). The most active MRV sensor data is input into the swarm lead MRV (7040). The MRV leader analyzes the data and makes decisions (7045) about strategy and tactics. The MRV leader transmits orders to the MRV drones in order of priority (7050). As new data streams are constantly inputted into the swarm sensor network as the environment changes (7055), the swarm reroutes the communication network resources to benefit the most active MRVs in real time (7060). As MRVs are removed and added, they are integrated into the network (7065) and the swarm continues to reroute the communication network resources to the most active regions as needed (7070). The optimum communication range of a swarm (and squad) must also be calculated by the lead MRV in order to maximize communications effectiveness.

The most efficient allocation of resources is described in FIG. 71. After the swarm assesses the environment with sensors (7115), the swarm encounters enemy targets (7120). Sensor data is forwarded to the MRV leader (7125), which analyzes the data streams (7130). After assessing the program parameter priorities (7135), the MRV leader makes a decision on action contingent on the facts of the environmental situation (7140). The lead MRV creates a plan and issues orders for MRVs to behave according to specific tactical approaches (7145) and then transmits the orders to the MRV drones (7150). The MRVs initiate the mission (7155), form squads, proceed to the mission objective (7160), engage the enemy (7165) and transmit sensor data to the lead MRV (7170). As MRVs are lost in the battle, new MRVs are reallocated (7175) and the process of the lead MRV receiving and analyzing data, deciding on the mission and organizing an assault continues until the mission is completed (7180).

How does a lead MRV decide to select the best simulation? FIG. 72 addresses this problem. After the lead MRV receives sensor data from MRVs (7215), assesses the data streams (7220) and the trajectory of the (mobile) enemy targets (7225) and accesses the original program parameters (7230), the lead MRV identifies MRV positions and makes three-dimensional maps of both the swarm and the environment (7235). The lead MRV develops test simulations based on an analysis of the collected information (7240) and develops methods to test the simulation of possible actions and outcomes (7245). The lead MRV selects the best method for testing simulations based on the swarms' competitive advantages and the enemy weaknesses (7250) and tests various candidate simulations for preferred outcomes by comparing them with program parameters (7255). The lead MRV selects the optimal simulation candidate based on an application of the best-selected method (7260). The winning simulation becomes the tactical plan for the operation of the swarm (7265) and the plan is transmitted to the MRVs for implementation (7270). As new sensor data is received (or if mission program parameters are changed (7257)), plans of action are updated (7275) until the mission is accomplished (7280).

FIGS. 73 and 74 describe the process of determining optimal configurations and reconfigurations, respectively, of swarm groupings. In FIG. 73, dynamic geometric configurations for the aggregation of swarms are described. After MRV sensor data is transmitted to the lead MRV (7320) and assessed by the lead MRV (7330), the lead MRV evaluates the sensor data according to program parameters (7340). The lead MRV identifies positions of special MRVs (7350), selects a simulation and develops a tactical plan for MRVs to follow (7360). The lead MRV transmits directions to MRVs to organize the geometric structure of MRVs according to the selected configuration (7370). MRVs organize according to the selected configuration with specific specialists in specific positions (7380). In addition to the geometric spatial configuration of a swarm, the composition of a swarm with various specialists and the appropriate team size of each squad are factors that must also be made in the process of organizing the initial composition of swarm groupings. This figure describes the process of the initial configuration of the group, and FIG. 74 describes the regrouping process.

After a first wave of attack, the swarm collects sensor data and transmits it to the lead MRV (7415). The lead MRV assesses and evaluates the data according to program parameters (7420). The MRVs' specialist positions are input into the lead MRV data set (7425). The lead MRV assesses the enemy targets' mobile trajectories and develops simulations based on anticipated scenarios (7430). The lead MRV selects a swarm simulation based on priorities and sensor data evaluation (7435) and transmits instructions to swarm MRVs (7440). MRVs hit targets according to the mission plan (7445) and transmit sensor data of the most recent attack back to the lead MRV (7450), which continually evaluates the newest data (7455). The lead MRV continually develops updated action plans based on the best simulation (7460) and transmits the latest plan to MRVs (7465). The MRVs reposition according to the latest plan and attack enemy targets in the latest configuration (7470). A feedback loop continues with the latest sensor data updating the plans of continually updated simulations until the mission is completed (7475).

FIG. 75 describes the operation of an optimal strategy for a swarm attack. After the lead MRV is programmed with mission parameters (7520) and multiple MRV sensor data is input into the lead MRV (7530), the lead MRV assesses the data and constructs a plan based on the selection of a simulation (7540). The lead MRV organizes the logistics of the plan, including the staging and deployment of squads (7550) by establishing an animation of the selected simulation (7550). The squads interact with mobile enemy positions (7560) and make constant adjustments (7570). When the mission is completed, the squads rejoin the main swarm and return home (7580).

The use of the hybrid control architecture makes possible the combination of the central control features of hierarchy (leader-follower) and simulations, with behavior-based control features of environmental interaction. It is particularly on the swarm level that this hybrid control model is optimized since the further one gets to the squad level, the more the behavior-based approach is suited to the dynamic changes of environmental interaction in real time.

In FIG. 76, an approach is described to determine an optimal tactical sequence. The swarm first loads the inventory of tactical options (7620) [specified in FIG. 77]. The swarm MRV sensor data is transmitted to the lead MRV (7630), which analyses the data (7640). The lead MRV uses weighted values and probabilities to rank tactical options for each environmental situation (7650). For example, when a swarm confronts a number of enemies, the swarm analyzes the enemies' weaknesses and prioritizes an attack first on these weaknesses; it then selects a tactic to attack this weakness such as an flanking maneuver. The lead MRV transmits the tactical option selection to the MRVs (7660). MRVs implement the tactical option, configure into the optimal tactical maneuver and attack the enemy by interacting with the environment (7670).

FIG. 77 is a list of tactical options.

FIG. 78 describes a method for a swarm to operate according to an optimal search pattern. After the initial program parameters are input into the swarms (7820), swarms move to a staging area (7830). The lead MRV receives mapping data from external sources, such as satellites or ground based sensors (7840) and the swarms initiate a search pattern (7850). Two or more MRVs work together to synchronize the collection of data (7860) by organizing their movements according to specific patterns. The MRVs move in specific patterns, such as opposing concentric circles, spirals or various other formations, to enhance maps with the most recent data (7870). MRV patterns of movement correspond to the terrain in each environment (7875). The MRV sensor data is sent to the lead MRV (7880) and the lead MRV develops a three-dimensional map of the environment (7885). FIGS. 32 and 33 also describe some aspects of this search process in the context of mapping.

FIG. 79 describes how swarms perform an optimal attack with limited resources. After the swarm develops a strategy for deploying MRVs (7920), the lead MRV calculates the simplest resource requirement to complete a task (7930). As the swarm of MRVs lose power, computation and communications, the MRVs default to the minimum resources available (7940). The MRVs take only the actions necessary to complete (7950) the mission (7960) as efficiently as possible.

FIG. 80 shows how swarms conduct an optimal attack with information constraints. After the MRVs collect sensor data and transmit the data to the lead MRV (8020), the lead MRV analyzes the sensor data and constructs a map (8030). But the information obtained is insufficient to develop a complete map (8040). The lead MRV develops a partial map and collects more information (8050). The MRVs move in a search pattern until information is complete (8060). When a threshold is met, the lead MRV completes the map (8070). Mapping data is evaluated, a simulation is selected and plans transmitted to MRVs (8080).

FIG. 81 shows how inter-MRV conflicts are resolved. After a conflict emerges between two MRVs (8120), the lead MRV compares MRV priorities to the initial program parameters (8130). The lead MRV decides priorities and issues instructions for the sequence of a mission (8140). MRVs supply new sensor data to the lead MRV (8150), which evaluates the data and establishes mission priorities (8160). The lead MRV adjusts plans and issues new orders (8170). A feedback loop continues to resolve conflicts between MRVs.

Because the present system uses limited autonomy, the resolution of conflict is made in a centralized way by a lead-MRV intermediation process. The use of the hybrid control system allows the use of central control with decentralized behavior-based control in the resolution of conflict as well as in the coordination of various mobile robotic entities.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for rendering decisions for mobile robotic vehicles, comprising:

a plurality of mobile robotic vehicles (MRVs); and a plurality of squads, each squad having a lead MRV and member MRVs;

wherein initial mission parameters are transmitted to the lead MRV and the member MRVs;

wherein sensor data from the member MRVs is transmitted to the lead MRV;

wherein the sensor data is weighted by the lead MRV and ranked by priority of importance;

wherein the sensor data is further interpreted by the lead MRV by comparing it with mission parameters;

wherein the lead MRV calculates a plurality of possible simulations to meet mission goals;

wherein the lead MRV uses a plurality of methods to test the plurality of possible simulations using the sensor data and the initial mission parameters to determine the best simulation to meet the mission goals; and wherein the lead MRV generates instructions and transmits the instructions to the member MRVs to allow the member MRVs to form an optimal geometric configuration according to the best simulation.

2. The system of claim 1 wherein the plurality of methods are sent to the lead MRV from a central command via a satellite by using a plurality of mobile software agents.

3. The system of claim 1 wherein the lead MRV resolves a conflict between two member MRVs.

4. The system of claim 3 wherein the lead MRV resolves the conflict by comparing MRV priorities with initial program parameters.

5. The system of claim 3 wherein the two member MRVs provide sensor data to allow the lead MRV to resolve the conflict.

* * * * *